(12) United States Patent
Knoblauch et al.

(10) Patent No.: US 12,528,869 B2
(45) Date of Patent: Jan. 20, 2026

(54) TREATMENT OF NON-SMALL CELL LUNG CANCER WITH EGFR MUTATIONS

(71) Applicant: Janssen Biotech, Inc., Horsham, PA (US)

(72) Inventors: Roland Knoblauch, Doylestown, PA (US); Sheri Moores, Wayne, PA (US)

(73) Assignee: Janssen Biotech, Inc., Horsham, PA (US)

( * ) Notice: Subject to any disclaimer, the term of this patent is extended or adjusted under 35 U.S.C. 154(b) by 0 days.

(21) Appl. No.: 17/411,158

(22) Filed: Aug. 25, 2021

(65) Prior Publication Data

US 2022/0064306 A1    Mar. 3, 2022

Related U.S. Application Data

(60) Provisional application No. 63/069,748, filed on Aug. 25, 2020.

(51) Int. Cl.
| | |
|---|---|
| C07K 16/28 | (2006.01) |
| A61K 39/00 | (2006.01) |
| A61K 45/06 | (2006.01) |
| A61P 35/00 | (2006.01) |

(52) U.S. Cl.
CPC .......... *C07K 16/2863* (2013.01); *A61K 45/06* (2013.01); *A61P 35/00* (2018.01); *A61K 2039/505* (2013.01)

(58) Field of Classification Search
None
See application file for complete search history.

(56) References Cited

U.S. PATENT DOCUMENTS

| | | | |
|---|---|---|---|
| 5,837,242 A | 11/1998 | Holliger et al. | |
| 8,242,247 B2 | 8/2012 | Klein et al. | |
| 9,242,247 B2 | 1/2016 | Lafond et al. | |
| 9,593,164 B2 | 3/2017 | Chiu et al. | |
| 11,459,391 B2 | 10/2022 | Moores et al. | |
| 2002/0018749 A1 | 2/2002 | Hudson et al. | |
| 2005/0272083 A1 | 12/2005 | Seshagiri | |
| 2007/0148774 A1 | 6/2007 | McCafferty et al. | |
| 2007/0287170 A1 | 12/2007 | Davis et al. | |
| 2009/0182127 A1 | 7/2009 | Naergaard et al. | |
| 2010/0015133 A1 | 1/2010 | Igawa et al. | |
| 2010/0028637 A1 | 2/2010 | Tavsanli et al. | |
| 2011/0123532 A1 | 5/2011 | Gurney et al. | |
| 2012/0149876 A1 | 6/2012 | Von et al. | |
| 2013/0195849 A1 | 8/2013 | Spreter et al. | |
| 2013/0216548 A1 | 8/2013 | Neijssen et al. | |
| 2014/0141000 A1* | 5/2014 | Chiu | A61K 31/517 435/375 |
| 2017/0362325 A1 | 12/2017 | Jung et al. | |
| 2019/0153115 A1 | 5/2019 | Schellenberger et al. | |
| 2020/0087407 A1 | 3/2020 | Chiu et al. | |
| 2021/0017285 A1 | 1/2021 | Laquerre et al. | |
| 2022/0298248 A1 | 9/2022 | Henley et al. | |

FOREIGN PATENT DOCUMENTS

| | | |
|---|---|---|
| EP | 0281604 B1 | 3/1993 |
| WO | 88/01649 A1 | 3/1988 |
| WO | 92/01047 A1 | 1/1992 |
| WO | 94/13804 A1 | 6/1994 |
| WO | 98/44001 A1 | 10/1998 |
| WO | 2006/028936 A2 | 3/2006 |
| WO | 2009/018386 A1 | 2/2009 |
| WO | 2009/080251 A1 | 7/2009 |
| WO | 2009/080252 A1 | 7/2009 |
| WO | 2009/080254 A1 | 7/2009 |
| WO | 2011/131746 A2 | 10/2011 |
| WO | 2018/094225 A1 | 5/2018 |
| WO | 2020/102647 A1 | 5/2020 |

OTHER PUBLICATIONS

Cho et al (JNJ-61186372 (JNJ-372), an EGFR-cMET bispecific antibody, in advanced non-small cell lung cancer (NSCLC): An update on phase I results, Abstracts | NSCLC, metastatic| vol. 29, supplement 8, viii542, Oct. 2018). (Year: 2018).*
Murphy et al ("Erlotinib or gefitinib for the treatment of relapsed platinum pretreated non-small cell lung cancer and ovarian cancer: a systematic review." Drug resistance updates : reviews and commentaries in antimicrobial and anticancer chemotherapy vol. 14,3 (2011) (Year: 2011).*
Goździk-Spychalska et al. ("C-MET inhibitors in the treatment of lung cancer." Current treatment options in oncology vol. 15,4 (2014): 670-82. doi:10.1007/s11864-014-0313-5). (Year: 2014).*
NCT02609776 (Year: 2019).*
Ahn, et al., "Lazertinib in patients with EGFR mutation-positive advanced non-small-cell lung cancer: results from the dose escalation and dose expansion parts of a first-in-human, openlabel, multicentre, phase 1-2 study", Clinical Trial Lancet Oncol., 2019, vol. 20, No. 12, 1681-1690.
Cappuzzo et al., "Epidermal Growth Factor Receptor Gene and Protein and Gefi tinib Sensitivity in Non-Small-Cell Lung Cancer", J. Natl. Cancer Inst., 2005, 97, 643-655.
Chothia et al., "Canonical Structures for the Hypervariable Regions of Immunoglobulins", J. Mol. Biol., 1987, 196, 901-917.
ClinicalTrails.gov, "Study of JNJ-61186372, a Human Bispecific EGFR and cMet Antibody, in Participants With Advanced Non-Small Cell Lung Cancer (Chrysalis)", NCT02609776, Aug. 14, 2020 pp. 1-13.
Ferrara et al., "Modulation of Therapeutic Antibody Effector Functions by Glycosylation Engineering: Influence of Golgi Enzyme Localization Domain and Co-Expression of Heterologous b1, 4-N-acetylglucosaminyltransferase III and Golgi a-mannosidase II", Biotechnology, Bioeng., 2006, 3, 851-861.
Ferrara et al., "The Carbohydrate at FcRIIIa Asn-162 an Element Required for High Affinity Binding to non-fucosylated IgG Glycoforms", J. Biol. Chem, 2006, 281, 5032-5036.

(Continued)

*Primary Examiner* — Zachariah Lucas
*Assistant Examiner* — Sarah A Alsomairy
(74) *Attorney, Agent, or Firm* — BakerHostetler

(57) ABSTRACT

The present invention relates to treatment of subjects having EGFR exon 20 insertion and other uncommon EGFR mutations.

19 Claims, 41 Drawing Sheets
Specification includes a Sequence Listing.

(56) References Cited

OTHER PUBLICATIONS

Gazdar, "Activating and resistance mutations of EGFR in non-small-cell lung cancer: role in clinical response to EGFR tyrosine kinase inhibitors", Oncogene, 2009, 28 Suppl., S24-S31.

Haura, et al., "JNJ-61186372 (JNJ-372), an EGFR-cMet bispecific antibody, in EGFR-driven advanced non-small cell lung cancer (NSCLC)", Journal of Clinical Oncology, vol. 37, No. 15, 2019, Supplement, p. 9009.

Honegger et al., "Yet Another Numbering Scheme for Immunoglobulin Variable Domains: An Automatic Modeling and Analysis Tool", J. Mol. Biol., 2001, 309, 657-670.

Hong et al., "P3.02b-119 YH25448, a highly selective 3rd generation EGFR TKI, exhibits superior survival over osimertinib in animal model with brain meta-stases from NSCLC: topic: EGFR RES", J. Thorac. Oncol., 2017, vol. 12, No. 1, supplement, S1265-S1266.

Hynes et al., "ERBB receptors and cancer: The Complexity of Targeted Inhibitors", Nature Reviews Cancer, 2005, 5, 341-354.

Janne et al., "Antitumor activity of TAK-788 in NSCLC with EGFR exon 20 insertions", J. Clin. Oncol., 2019, 37(15), 1 page.

Janne et al.,, "Effect of Epidermal Growth Factor Receptor Tyrosine Kinase Domain Mutations on the Outcome of Patients with Non-Small Cell Lung Cancer Treated with Epidermal Growth Factor Receptor Tyrosine Kinase Inhibitors", Clin. Cancer Res., 2006, 12(14 Suppl): 4416s-4420s.

Kabat et al., "Sequences of proteins of immunological interest, 5th Ed., Public Health Service", National Institutes of Health, Bethesda, MD, 1991.

Konno et al., "Fucose content of monoclonal antibodies can be controlled by culture medium osmolality for high antibody-dependent cellular cytotoxicity", Cytotechnology, 2012, 64, 249-265.

Kris et al., "Using Multiplexed Assays of oncogenic drivers in lung cancers to select targeted drugs", Jama-J Am Med Assoc., 2014, 311(19), 1998-2006.

Lefranc et al., "IMGT unique numbering for immunoglobulin and T cell receptor variable domains and Ig superfamily V-like domains", Dev. Comp. Immunol., 2003, 27, 55-77.

Li, et al., "Efficacy and long-term survival of advanced lung adenocarcinoma patients with uncommon EGFR mutations treated with 1st generation EGFR-TKIs compared with chemotherapy as first-line therapy", Lung cancer (Amsterdam, Netherlands) vol. 130, 2010, pp. 42-49.

Li, et al., "Four generations of EGFR TKIs associated withdifferent pathogenic mutations in non-small cell lung carcinoma", J. Drug. Target. Epub., vol. 28, No. 9, Mar. 12, 2020, p. 861-872.

Martin et al., "Structural Families in Loops of Homologous Proteins: Automatic Classification, Modeling and Application to Antibodies", J. Bmol. Biol., 1996, 263, 800-815.

Mori et al., "Engineering Chinese Hamster Ovary Cells to Maximize Effector Function of Produced Antibodies Using FUT8 siRNA", Biotechnol Bioeng., 2004, 88, 901-908.

Nakata et al., "Recent understanding of the molecular mechanisms for the efficacy and resistance of EGF receptor-specific tyrosine kinase inhibitors in non-small cell lung cancer", Expert Opinion on Therapeutic Targets, 2012, 16:8, 771-781.

Olivier et al., "EB66 cell line, a duck embryonic stem cellderived substrate for the industrial production of therapeutic monoclonal antibodies with enhanced ADCC activity", MAbs, 2010, 2(4), 405-415.

Oxnard et al., "Natural history and molecular characteristics of lung cancers harboring EGFR Exon 20 Insertions", Journal of thoracic oncology, 2013, 8(2), 179-184.

Riess et al., "Diverse EGFR Exon 20 insertions and co-occurring molecular alterations identified by comprehensive genomic profiling of NSCLC", Journal of Thoracic Oncology, 2018, 13(10), 1560-1568.

Russo et al., "Heterogeneous responses to epidermal growth factor receptor (EGFR) tyrosine kinase inhibitors (TKIs) in patients with uncommon EGFR mutations, New insights and future perspectives in this complex clinical scenario", Int. J. Mol. Sci., 2019, 20(6), 20 pages.

Shields et al., "Lack of Fucose on Human IgG1 N-Linked Oligosaccharide Improves Binding to Human FcyRIII and Antibody-dependent Cellular Toxicity*", J. Biol. Chem., 2002, 277, 26733-26740.

Shinkawa et al., "The Absence of Fucose but Not the Presence of Galactose or Bisecting N-Acetylglucosamine of Human IgG1 Complex-type Oligosaccharides Shows the Critical Role of Enhancing Antibody-dependent Cellular Cytotoxicity*", J. Biol. Chem., 2003, 278, 3466-3473.

Sousa, et al., "Detection of rare and novel EGFR mutations in NSCLC patients: Implications for treatment-decision", Lung Cancer, Jan. 2020, vol. 139, 35-40.

Travis, "2015 WHO classification of the Pathology and Genetics of Tumors of the Lung", Journal of Thoracic Oncology, 2015, 10(9), S68-S.

Tsigelny et al., "Molecular determinants of drug-specific sensitivity for epidermal growth factor receptor (EGFR) exon 19 and 20 mutants in non-small cell lung cancer", Oncotarget, 2015, 6(8), 6029-6039.

Turke et al., "Preexistence and Clonal Selection of MET Amplification in EGFR Mutant NSCLC", Cancer Cell, 2010, 17, 77-88.

Ullrich et al., "Human epidermal growth factor receptor cDNA sequence and aberrant expression of the amplified gene in A431 epidermoid carcinoma cells", Nature, 1984, 309, 418-425.

Vyse et al., "Targeting EGFR exon 20 insertion mutations in non-small cell lung cancer", Signal transduction and targeted therapy, 2019, 4:5, 10 pages.

Wu et al., "An analysis of the sequences of the variable regions of Bence Jones Proteins and myeloma light chains and their implications for anti-body complementarity", J. Exp.. Med., 1970, 132, 211-250.

Yang et al., "A phase 2 study of poziotinib in patients with EGFR or HER2 exon 20 mutation-positive non-small cell lung cancer", J. Clin. Oncol., 2018, 36(15).

Yasuda et al., "Structural biochemical and clinical characterization of epidermal growth factor receptor (EGFR) exon 20 insertion mutations in lung cancer", Science translational medicine, 2013, 5(216), 216ral77.

Zang et al., "Treatment of uncommon EGFR mutations in non-small cell lung cancer: new evidence and treatment", Transl. Lung Cancer Res., Jun. 2019, 8(3), 302-316.

Zhong et al., "The resistance mechanisms and treatment strategies for EGFR-mutant advanced non-small-cell lung cancer", Oncotarget, 2017, 8(41), 71358-71370.

Zhou et al., "Development of a Simple and Rapid Method for Producing Non-Fucosylated Oligomannose Containing Antibodies With Increased Effector Function", Biotechnol Bioeng., 2008, 99, 652-665.

Baraibar et al., "Novel drugs targeting EGFR and HER2 exon 20 mutations in metastatic NSCLC", Critical Reviews in Oncology/Hematology, vol. 148, Feb. 7, 2020, 102906, pp. 1-13.

Moores et al., "A Novel Bispecific Antibody Targeting EGFR and cMet Is Effective against EGFR Inhibitor-Resistant Lung Tumors", Cancer Research, Jul. 1, 2016, vol. 76, No. 13, pp. 3942-3953.

Wu et al., "Effectiveness of tyrosine kinase inhibitors on "uncommon" epidermal growth factor receptor mutations of unknown clinical significance in non-small cell lung cancer", Clin Cancer Reserach, Jun. 1, 2011, vol. 17, No. 11, pp. 3812-3821.

Yun et al., "Antitumor Activity of Amivantamab (JNJ-61186372), an EGFR-MET Bispecific Antibody, in Diverse Models of EGFR Exon 20 Insertion-Driven NSCLC", Cancer Discovery, May 15, 2020, vol. 10, No. 8, 1194-1209.

Aggarwal et al., "Influence of TP53 mutation on survival in patients with advanced EGFR-mutant non-small-cell lung cancer", JCO Precision Oncology, 2018, vol. 2, pp. 1-28.

Alam et al., "DNA damage-induced ephrin-B2 reverse signaling promotes chemoresistance and drives EMT in colorectal carcinoma harboring mutant p53", Cell Death & Differentiation, 2016, vol. 23, No. 4, pp. 707-722.

(56) References Cited

OTHER PUBLICATIONS

Anonymous, "Poziotinib shows promise for rare lung cancer", Cancer Discovery, 2018, vol. 8, pp. 1-6.
Anonymous, "Spectrum's Poziotinib Failed to Meet Primary Phase II Trial Endpoint" Precision Oncology News Dec. 27, 2019, 2pp.
Calabresi et al., "Basic Principles And Clinical Management Of Cancer", Medical oncology, 1985, Chapter 10, 1352 pages.
Canale et al., "Impact of TP53 mutations on outcome in EGFR-mutated patients treated with first-line tyrosine kinase inhibitors", Clinical Cancer Research, 2017, vol. 23, No. 9, pp. 2195-2202.
Cha et al., "Antitumor activity of HM781-36B, a highly effective pan-HER inhibitor in erlotinib-resistant NSCLC and other EGFR-dependent cancer models", International Journal of Cancer, 2012, vol. 130, No. 10, pp. 2445-2454.
Commins et al., "Immunologic messenger molecules: cytokines, interferons, and chemokines", Immunology, 2010, vol. 125, No. 2, pp. S53-S72.
Conde et al., "Molecular context of the EGFR mutations: evidence for the activation of mTOR/S6K signaling", Clinical Cancer Research, 2006, vol. 12, No. 3, pp. 710-717.
Costa et al., "BIM mediates EGFR tyrosine kinase inhibitor-induced apoptosis in lung cancers with oncogenic EGFR mutations", PLOS Medicine, 2007, vol. 4, No. 10, pp. 1669-1680.
Cragg et al., "Gefitinib-induced killing of NSCLC cell lines expressing mutant EGFR requires BIM and can be enhanced by BH3 mimetics", PLOS Medicine, 2007, vol. 4, No. 10, pp. 1681-1690.
Fang et al., "EGFR exon 20 insertion mutations and response to osimertinib in non-small-cell lung cancer", BMC Cancer, 2019, vol. 19, Article 595, pp. 1-9.
Fauriat et al., "Regulation of human NK-cell cytokine and chemokine production by target cell recognition", Blood, 2010, vol. 115, No. 11, pp. 2167-2176.
Frega et al., "Clinical features and treatment outcome of non-small cell lung cancer (NSCLC) patients with uncommon or complex epidermal growth factor receptor (EGFR) mutations", Oncotarget, 2017, vol. 8, No. 20, p. 32626-32638.
Grugan et al., "Fc-mediated activity of EGFR x c-Met bispecific antibody JNJ-61186372 enhanced killing of lung cancer cells", mAbs, 2017, vol. 9, No. 1, pp. 114-126.
Heymach et al., "A phase II trial of poziotinib in EGFR and HER2 exon 20 mutant non-small cell lung cancer (NSCLC)", Journal of Thoracic Oncology, 2018, vol. 13, No. 10, pp. S323-S324.
Jarantow et al., "Impact of cell-surface antigen expression on target engagement and function of an epidermal growth factor receptor x c-MET bispecific antibody", Journal of Biological Chemistry, 2015, vol. 290, No. 41, p. 24689-24704.
Kosaka et al., "Response heterogeneity of EGFR and HER2 exon 20 insertions to covalent EGFR and HER2 inhibitors", Cancer Research, 2017, vol. 77, No. 10, pp. 2712-2721.
Lin et al., "R280T mutation of p53 gene promotes proliferation of human glioma cells through GSK3β/PTEN pathway", Neuroscience Letters, 2012, vol. 529, No. 1, pp. 60-65.
Mantovani et al., "Mutant p53 as a guardian of the cancer cell", Cell Death & Differentiation, 2019, vol. 26, No. 2, pp. 199-212.
Melnikova et al., "Mutant p53 is constitutively phosphorylated at serine 15 in UV-induced mouse skin tumors: involvement of ERK1/2 Map kinase", Oncogene, 2003, vol. 22, No. 38, pp. 5958-5966.
Nagano et al., "Mechanism of resistance to epidermal growth factor receptor-tyrosine kinase inhibitors and a potential treatment strategy", Cells, 2018, vol. 7, No. 11, Article 212, pp. 1-16.
National Center for Biotechnology Information, "Epidermal growth factor receptor isoform a precursor [Homo sapiens]", GenBank Accession No. NP_005219.2, 2022, pp. 1-7.

National Center for Biotechnology Information, "Hepatocyte growth factor receptor isoform a preproprotein [Homo sapiens]", GenBank Accession No. NP_001120972.1, 2022, pp. 1-4.
Okada et al., "Application of highly immunocompromised mice for the establishment of patient-derived xenograft (PDX) models", Cells, 2019, vol. 8, No. 8, Article 889, pp. 1-18.
Okada et al., "EGFR downregulation after anti-EGFR therapy predicts the antitumor effect in colorectal cancer", Molecular Cancer Research, 2017, vol. 15, No. 10, pp. 1445-1454.
Puchalapalli et al., "NSG mice provide a better spontaneous model of breast cancer metastasis than athymic (nude) mice", PLOS One, 2016, vol. 11, No. 9, Article e0163521, pp. 1-15.
Ramalingam et al., "Dual inhibition of the epidermal growth factor receptor with cetuximab, an IgG1 monoclonal antibody, and gefitinib, a tyrosine kinase inhibitor, in patients with refractory non-small cell lung cancer (NSCLC): a phase I study", Journal of Thoracic Oncology, 2008, vol. 3, No. 3, pp. 258-264.
Reefman et al., "Cytokine secretion is distinct from secretion of cytotoxic granules in NK cells", The Journal of Immunology, 2010, vol. 184, No. 9, pp. 4852-4862.
Robichaux et al., "Mechanisms and clinical activity of an EGFR and HER2 exon 20-selective kinase inhibitor in non-small cell lung cancer", Nature Medicine, 2018, vol. 24, No. 5, pp. 638-646.
Roerink et al., "Intra-tumour diversification in colorectal cancer at the single-cell level", Nature, 2018, vol. 556, No. 7702, pp. 457-462.
Sachs et al., "Long-term expanding human airway organoids for disease modeling", The EMBO Journal, 2019, vol. 38, No. 4, p. e100300.
Satoh et al., "Non-fucosylated therapeutic antibodies as next-generation therapeutic antibodies", Expert Opinion on Biological Therapy, 2006, vol. 6, No. 11, pp. 1161-1173.
Sauer et al., "Mutant p53 initiates a feedback loop that involves Egr-1/EGF receptor/ERK in prostate cancer cells", Oncogene, 2010, vol. 29, No. 18, pp. 2628-2637.
Sellmann et al., "Balancing selectivity and efficacy of bispecific epidermal growth factor receptor (EGFR) x c-MET antibodies and antibody-drug conjugates", Journal of Biological Chemistry, 2016, vol. 291, No. 48, p. 25106-25119.
Shi et al., "Overcoming acquired resistance to AZD9291, a third-generation EGFR inhibitor, through modulation of MEK/ERK-dependent Bim and Mcl-1 degradation", Clinical Cancer Research, 2017, vol. 23, No. 21, pp. 6567-6579.
Sunada et al., "Monoclonal antibody against epidermal growth factor receptor is internalized without stimulating receptor phosphorylation", Proceedings of the National Academy of Sciences of the United States of America, 1986, vol. 83, No. 11, pp. 3825-3829.
Troy, "Remington: the science and practice of pharmacy", Lippincott Williams & Wilkins, 2006, 21st Edition, pp. 691-1092.
Wang et al., "Natural killer cell-produced IFN -? and TNF-a induce target cell cytolysis through upregulation of ICAM-1", Journal of Leukocyte Biology, 2012, vol. 91, No. 2, pp. 299-309.
Wang et al., "NK cell-mediated antibody-dependent cellular cytotoxicity in cancer immunotherapy", Frontiers in Immunology, 2015, vol. 6, pp. 1-15.
Wong et al., "Cetuximab: an epidermal growth factor receptor monoclonal antibody for the treatment of colorectal cancer", Clinical Therapeutics, 2005, vol. 27, No. 6, pp. 684-694.
Zhu et al., "Silencing of mutant p53 by siRNA induces cell cycle arrest and apoptosis in human bladder cancer cells", World Journal of Surgical Oncology, 2013, vol. 11, Article 22, pp. 1-11.

* cited by examiner

DFCI-127 (P772_H773insPNP)

DFCI-58 (H773_V774insNPH)

YU-1163 (S768_D770dup)

DFCI-127 (P772_H773insPNP)

DFCI-58 (H773_V774insNPH)

YU-1163 (S768_D770dup)

SEQUENCE LISTING

<160> NUMBER OF SEQ ID NOS: 21

<210> SEQ ID NO 1
<211> LENGTH: 5
<212> TYPE: PRT
<213> ORGANISM: Artificial Sequence
<220> FEATURE:
<223> OTHER INFORMATION: HCDR1, EGFR binding arm

<400> SEQUENCE: 1

Thr Tyr Gly Met His
1               5

<210> SEQ ID NO 2
<211> LENGTH: 17
<212> TYPE: PRT
<213> ORGANISM: Artificial Sequence
<220> FEATURE:
<223> OTHER INFORMATION: HCDR2, EGFR binding arm

<400> SEQUENCE: 2

```
Val Ile Trp Asp Asp Gly Ser Tyr Lys Tyr Tyr Gly Asp Ser Val Lys
1               5                   10                  15

Gly
```

<210> SEQ ID NO 3
<211> LENGTH: 16
<212> TYPE: PRT
<213> ORGANISM: Artificial Sequence
<220> FEATURE:
<223> OTHER INFORMATION: HCDR3, EGFR binding arm

<400> SEQUENCE: 3

```
Asp Gly Ile Thr Met Val Arg Gly Val Met Lys Asp Tyr Phe Asp Tyr
1               5                   10                  15
```

<210> SEQ ID NO 4
<211> LENGTH: 11
<212> TYPE: PRT
<213> ORGANISM: Artificial Sequence
<220> FEATURE:
<223> OTHER INFORMATION: LCDR1, EGFR binding arm

<400> SEQUENCE: 4

```
Arg Ala Ser Gln Asp Ile Ser Ser Ala Leu Val
1               5                   10
```

<210> SEQ ID NO 5
<211> LENGTH: 7
<212> TYPE: PRT
<213> ORGANISM: Artificial Sequence
<220> FEATURE:
<223> OTHER INFORMATION: LCDR2, EGFR binding arm

<400> SEQUENCE: 5

```
Asp Ala Ser Ser Leu Glu Ser
1               5
```

<210> SEQ ID NO 6
<211> LENGTH: 9
<212> TYPE: PRT
<213> ORGANISM: Artificial Sequence
<220> FEATURE:
<223> OTHER INFORMATION: LCDR3, EGFR binding arm

<400> SEQUENCE: 6

```
Gln Gln Phe Asn Ser Tyr Pro Leu Thr
1               5
```

<210> SEQ ID NO 7
<211> LENGTH: 5
<212> TYPE: PRT
<213> ORGANISM: Artificial Sequence
<220> FEATURE:
<223> OTHER INFORMATION: HCDR1, c-Met binding arm

<400> SEQUENCE: 7

```
Ser Tyr Gly Ile Ser
```

```
<210> SEQ ID NO 8
<211> LENGTH: 17
<212> TYPE: PRT
<213> ORGANISM: Artificial Sequence
<220> FEATURE:
<223> OTHER INFORMATION: HCDR2, c-Met binding arm

<400> SEQUENCE: 8

Trp Ile Ser Ala Tyr Asn Gly Tyr Thr Asn Tyr Ala Gln Lys Leu Gln
1               5                   10                  15
Gly

<210> SEQ ID NO 9
<211> LENGTH: 10
<212> TYPE: PRT
<213> ORGANISM: Artificial Sequence
<220> FEATURE:
<223> OTHER INFORMATION: HCDR3, c-Met binding arm

<400> SEQUENCE: 9

Asp Leu Arg Gly Thr Asn Tyr Phe Asp Tyr
1               5                   10

<210> SEQ ID NO 10
<211> LENGTH: 11
<212> TYPE: PRT
<213> ORGANISM: Artificial Sequence
<220> FEATURE:
<223> OTHER INFORMATION: LCDR1, c-Met binding arm

<400> SEQUENCE: 10

Arg Ala Ser Gln Gly Ile Ser Asn Trp Leu Ala
1               5                   10

<210> SEQ ID NO 11
<211> LENGTH: 7
<212> TYPE: PRT
<213> ORGANISM: Artificial Sequence
<220> FEATURE:
<223> OTHER INFORMATION: LCDR2, c-Met binding arm

<400> SEQUENCE: 11

Ala Ala Ser Ser Leu Leu Ser
1               5

<210> SEQ ID NO 12
<211> LENGTH: 9
<212> TYPE: PRT
<213> ORGANISM: Artificial Sequence
<220> FEATURE:
<223> OTHER INFORMATION: LCDR3, c-Met binding arm

<400> SEQUENCE: 12

Gln Gln Ala Asn Ser Phe Pro Ile Thr
1               5

<210> SEQ ID NO 13
<211> LENGTH: 125
<212> TYPE: PRT
<213> ORGANISM: Artificial Sequence
<220> FEATURE:
<223> OTHER INFORMATION: VH, EGFR binding arm

<400> SEQUENCE: 13
```

```
Gln Val Gln Leu Val Glu Ser Gly Gly Val Val Gln Pro Gly Arg
  1               5                  10                  15

Ser Leu Arg Leu Ser Cys Ala Ala Ser Gly Phe Thr Phe Ser Thr Tyr
             20                  25                  30

Gly Met His Trp Val Arg Gln Ala Pro Gly Lys Gly Leu Glu Trp Val
         35                  40                  45

Ala Val Ile Trp Asp Asp Gly Ser Tyr Lys Tyr Tyr Gly Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asp Gly Ile Thr Met Val Arg Gly Val Met Lys Asp Tyr Phe
                100                 105                 110

Asp Tyr Trp Gly Gln Gly Thr Leu Val Thr Val Ser Ser
             115                 120                 125

<210> SEQ ID NO 14
<211> LENGTH: 107
<212> TYPE: PRT
<213> ORGANISM: Artificial Sequence
<220> FEATURE:
<223> OTHER INFORMATION: VL, EGFR binding arm

<400> SEQUENCE: 14

Ala Ile Gln Leu Thr Gln Ser Pro Ser Ser Leu Ser Ala Ser Val Gly
  1               5                  10                  15

Asp Arg Val Thr Ile Thr Cys Arg Ala Ser Gln Asp Ile Ser Ser Ala
             20                  25                  30

Leu Val Trp Tyr Gln Gln Lys Pro Gly Lys Ala Pro Lys Leu Leu Ile
         35                  40                  45

Tyr Asp Ala Ser Ser Leu Glu Ser Gly Val Pro Ser Arg Phe Ser Gly
     50                  55                  60

Ser Glu Ser Gly Thr Asp Phe Thr Leu Thr Ile Ser Ser Leu Gln Pro
 65                  70                  75                  80

Glu Asp Phe Ala Thr Tyr Tyr Cys Gln Gln Phe Asn Ser Tyr Pro Leu
                 85                  90                  95

Thr Phe Gly Gly Gly Thr Lys Val Glu Ile Lys
                100                 105

<210> SEQ ID NO 15
<211> LENGTH: 119
<212> TYPE: PRT
<213> ORGANISM: Artificial Sequence
<220> FEATURE:
<223> OTHER INFORMATION: VH, c-Met binding arm

<400> SEQUENCE: 15

Gln Val Gln Leu Val Gln Ser Gly Ala Glu Val Lys Lys Pro Gly Ala
  1               5                  10                  15

Ser Val Lys Val Ser Cys Glu Thr Ser Gly Tyr Thr Phe Thr Ser Tyr
             20                  25                  30

Gly Ile Ser Trp Val Arg Gln Ala Pro Gly His Gly Leu Glu Trp Met
         35                  40                  45

Gly Trp Ile Ser Ala Tyr Asn Gly Tyr Thr Asn Tyr Ala Gln Lys Leu
     50                  55                  60

Gln Gly Arg Val Thr Met Thr Thr Asp Thr Ser Thr Ser Thr Ala Tyr
 65                  70                  75                  80
```

```
Met Glu Leu Arg Ser Leu Arg Ser Asp Asp Thr Ala Val Tyr Tyr Cys
                85                  90                  95

Ala Arg Asp Leu Arg Gly Thr Asn Tyr Phe Asp Tyr Trp Gly Gln Gly
            100                 105                 110

Thr Leu Val Thr Val Ser Ser
        115

<210> SEQ ID NO 16
<211> LENGTH: 107
<212> TYPE: PRT
<213> ORGANISM: Artificial Sequence
<220> FEATURE:
<223> OTHER INFORMATION: VL, c-Met binding arm

<400> SEQUENCE: 16

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Asn Trp
            20                  25                  30

Leu Ala Trp Phe Gln His Lys Pro Gly Lys Ala Pro Lys Leu Leu Ile
        35                  40                  45

Tyr Ala Ala Ser Ser Leu Leu Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Ile
                85                  90                  95

Thr Phe Gly Gln Gly Thr Arg Leu Glu Ile Lys
            100                 105

<210> SEQ ID NO 17
<211> LENGTH: 455
<212> TYPE: PRT
<213> ORGANISM: Artificial Sequence
<220> FEATURE:
<223> OTHER INFORMATION: Heavy chain 1

<400> SEQUENCE: 17

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Thr Tyr
            20                  25                  30

Gly Met His Trp Val Arg Gln Ala Pro Gly Lys Gly Leu Glu Trp Val
        35                  40                  45

Ala Val Ile Trp Asp Asp Gly Ser Tyr Lys Tyr Tyr Gly Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Gly Ile Thr Met Val Arg Gly Val Met Lys Asp Tyr Phe
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
```

```
            145                 150                 155                 160
    Pro Val Thr Val Ser Trp Asn Ser Gly Ala Leu Thr Ser Gly Val His
                    165                 170                 175

Thr Phe Pro Ala Val Leu Gln Ser Ser Gly Leu Tyr Ser Leu Ser Ser
                    180                 185                 190

Val Val Thr Val Pro Ser Ser Leu Gly Thr Gln Thr Tyr Ile Cys
                    195                 200                 205

Asn Val Asn His Lys Pro Ser Asn Thr Lys Val Asp Lys Arg Val Glu
                    210                 215                 220

Pro Lys Ser Cys Asp Lys Thr His Thr Cys Pro Pro Cys Pro Ala Pro
    225                 230                 235                 240

Glu Leu Leu Gly Gly Pro Ser Val Phe Leu Phe Pro Pro Lys Pro Lys
                    245                 250                 255

Asp Thr Leu Met Ile Ser Arg Thr Pro Glu Val Thr Cys Val Val Val
                    260                 265                 270

Asp Val Ser His Glu Asp Pro Glu Val Lys Phe Asn Trp Tyr Val Asp
                    275                 280                 285

Gly Val Glu Val His Asn Ala Lys Thr Lys Pro Arg Glu Glu Gln Tyr
                    290                 295                 300

Asn Ser Thr Tyr Arg Val Val Ser Val Leu Thr Val Leu His Gln Asp
    305                 310                 315                 320

Trp Leu Asn Gly Lys Glu Tyr Lys Cys Lys Val Ser Asn Lys Ala Leu
                    325                 330                 335

Pro Ala Pro Ile Glu Lys Thr Ile Ser Lys Ala Lys Gly Gln Pro Arg
                    340                 345                 350

Glu Pro Gln Val Tyr Thr Leu Pro Pro Ser Arg Glu Glu Met Thr Lys
                    355                 360                 365

Asn Gln Val Ser Leu Thr Cys Leu Val Lys Gly Phe Tyr Pro Ser Asp
                    370                 375                 380

Ile Ala Val Glu Trp Glu Ser Asn Gly Gln Pro Glu Asn Asn Tyr Lys
    385                 390                 395                 400

Thr Thr Pro Pro Val Leu Asp Ser Asp Gly Ser Phe Leu Leu Tyr Ser
                    405                 410                 415

Lys Leu Thr Val Asp Lys Ser Arg Trp Gln Gln Gly Asn Val Phe Ser
                    420                 425                 430

Cys Ser Val Met His Glu Ala Leu His Asn His Tyr Thr Gln Lys Ser
                    435                 440                 445

Leu Ser Leu Ser Pro Gly Lys
        450                 455

<210> SEQ ID NO 18
<211> LENGTH: 214
<212> TYPE: PRT
<213> ORGANISM: Artificial Sequence
<220> FEATURE:
<223> OTHER INFORMATION: Light chain 1

<400> SEQUENCE: 18

Ala Ile Gln Leu Thr Gln Ser Pro Ser Ser Leu Ser Ala Ser Val Gly
    1               5                   10                  15

Asp Arg Val Thr Ile Thr Cys Arg Ala Ser Gln Asp Ile Ser Ser Ala
                    20                  25                  30

Leu Val Trp Tyr Gln Gln Lys Pro Gly Lys Ala Pro Lys Leu Leu Ile
                    35                  40                  45

Tyr Asp Ala Ser Ser Leu Glu Ser Gly Val Pro Ser Arg Phe Ser Gly
```

```
                50                  55                  60
Ser Glu Ser Gly Thr Asp Phe Thr Leu Thr Ile Ser Ser Leu Gln Pro
 65                  70                  75                  80

Glu Asp Phe Ala Thr Tyr Tyr Cys Gln Gln Phe Asn Ser Tyr Pro Leu
                 85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
            195                 200                 205

Phe Asn Arg Gly Glu Cys
            210
```

<210> SEQ ID NO 19
<211> LENGTH: 449
<212> TYPE: PRT
<213> ORGANISM: Artificial Sequence
<220> FEATURE:
<223> OTHER INFORMATION: Heavy chain 2

<400> SEQUENCE: 19

```
Gln Val Gln Leu Val Gln Ser Gly Ala Glu Val Lys Lys Pro Gly Ala
  1               5                  10                  15

Ser Val Lys Val Ser Cys Glu Thr Ser Gly Tyr Thr Phe Thr Ser Tyr
                 20                  25                  30

Gly Ile Ser Trp Val Arg Gln Ala Pro Gly His Gly Leu Glu Trp Met
             35                  40                  45

Gly Trp Ile Ser Ala Tyr Asn Gly Tyr Thr Asn Tyr Ala Gln Lys Leu
 50                  55                  60

Gln Gly Arg Val Thr Met Thr Thr Asp Thr Ser Thr Ser Thr Ala Tyr
 65                  70                  75                  80

Met Glu Leu Arg Ser Leu Arg Ser Asp Asp Thr Ala Val Tyr Tyr Cys
                 85                  90                  95

Ala Arg Asp Leu Arg Gly Thr Asn Tyr Phe Asp Tyr Trp Gly Gln Gly
            100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
            130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
```

```
                195                 200                 205
Ser Asn Thr Lys Val Asp Lys Arg Val Glu Pro Lys Ser Cys Asp Lys
    210                 215                 220
Thr His Thr Cys Pro Pro Cys Pro Ala Pro Glu Leu Leu Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Val Asp Val Ser His Glu Asp
                260                 265                 270
Pro Glu Val Lys Phe Asn Trp Tyr Val Asp Gly Val Glu Val His Asn
            275                 280                 285
Ala Lys Thr Lys Pro Arg Glu Glu Gln Tyr Asn Ser Thr Tyr Arg Val
    290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
                325                 330                 335
Thr Ile Ser Lys Ala Lys Gly Gln Pro Arg Glu Pro Gln Val Tyr Thr
                340                 345                 350
Leu Pro Pro Ser Arg Glu Glu Met Thr Lys Asn Gln Val Ser Leu Thr
            355                 360                 365
Cys Leu Val Lys Gly Phe Tyr Pro Ser Asp Ile Ala Val Glu Trp Glu
    370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Arg Leu Thr Val Asp Lys
                405                 410                 415
Ser Arg Trp Gln Gln Gly Asn Val Phe Ser Cys Ser Val Met His Glu
            420                 425                 430
Ala Leu His Asn His Tyr Thr Gln Lys Ser Leu Ser Leu Ser Pro Gly
    435                 440                 445
Lys

<210> SEQ ID NO 20
<211> LENGTH: 214
<212> TYPE: PRT
<213> ORGANISM: Artificial Sequence
<220> FEATURE:
<223> OTHER INFORMATION: Light chain 2

<400> SEQUENCE: 20

Asp Ile Gln Met Thr Gln Ser Pro Ser Ser Val Ser Ala Ser Val Gly
1               5                   10                  15
Asp Arg Val Thr Ile Thr Cys Arg Ala Ser Gln Gly Ile Ser Asn Trp
                20                  25                  30
Leu Ala Trp Phe Gln His Lys Pro Gly Lys Ala Pro Lys Leu Leu Ile
            35                  40                  45
Tyr Ala Ala Ser Ser Leu Leu Ser Gly Val Pro Ser Arg Phe Ser Gly
    50                  55                  60
Ser Gly Ser Gly Thr Asp Phe Thr Leu Thr Ile Ser Ser Leu Gln Pro
65                  70                  75                  80
Glu Asp Phe Ala Thr Tyr Tyr Cys Gln Gln Ala Asn Ser Phe Pro Ile
                85                  90                  95
Thr Phe Gly Gln Gly Thr Arg Leu Glu Ile Lys Arg Thr Val Ala Ala
                100                 105                 110
```

```
Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 21
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 21
gtggacggga acccc                                                      15
```

TREATMENT OF NON-SMALL CELL LUNG CANCER WITH EGFR MUTATIONS

CROSS-REFERENCE TO RELATED APPLICATIONS

This application claims the benefit of U.S. Provisional Application Ser. No. 63/069,748, filed Aug. 25, 2020. The entire contents of the aforementioned application is incorporated herein by reference in its entirety.

REFERENCE TO SEQUENCE LISTING SUBMITTED ELECTRONICALLY

This application contains a sequence listing, which is submitted electronically via the USPTO patent electronic filing system as an ASCII formatted sequence listing with a file name "JBI6371USNP1-103693_7145_SL.txt", creation date of Jun. 5, 2025, and having a size of 19,197 bytes. The sequence listing submitted via the USPTO patent electronic filing system is part of the specification and is herein incorporated by reference in its entirety.

FIELD

The present invention relates to treatment of subjects having EGFR exon 20 insertion and other uncommon EGFR mutations.

BACKGROUND

The individual roles of both epidermal growth factor receptor (EGFR) and receptor tyrosine kinase mesenchymal-epithelial transition factor (c-Met) in cancer is well established, making these targets attractive for combination therapy. Both receptors signal through the same survival and anti-apoptotic pathways (ERK and AKT); thus, inhibiting the pair in combination may limit the potential for compensatory pathway activation thereby improving overall efficacy.

Molecular segmentation of advanced non-small cell lung cancer (NSCLC) based on oncogenic driver mutations has improved the overall survival and quality of life for patients with actionable driver mutations and solidified solid tumor targeted therapy. Mutations in the EGFR (1,2) gene constitutively activate downstream growth and survival signaling pathways leading to dependency on the EGFR pathway for tumor growth. Nearly 20% of Caucasians and up to 50% of Asians with lung adenocarcinomas harbor mutations in EGFR (Kris M G, Johnson B E, Berry L D, et al. Using Multiplexed Assays of Oncogenic Drivers in Lung Cancers to Select Targeted Drugs. Jama-J Am Med Assoc 2014; 311(19):1998-2006; Travis W D. 2015 WHO Classification of the Pathology and Genetics of Tumors of the Lung. Journal of Thoracic Oncology 2015; 10(9):568-S).

EGFR activating mutations have been reported in the first four exons (18 through 21) which result in changes to its tyrosine kinase domain. NSCLCs that harbor "classical" EGFR mutations in exons 18, 19 and 21, e.g. Exon 19 deletions or L858R, are sensitive to treatment with first-, second- and third-generation EGFR tyrosine kinase inhibitors (TKIs) such as erlotinib, afatinib and osimertinib (Gazdar A F. Activating and resistance mutations of EGFR in non-small-cell lung cancer: role in clinical response to EGFR tyrosine kinase inhibitors. Oncogene 2009; 28 Suppl 1; Tsigelny I F et al. Molecular determinants of drug-specific sensitivity for epidermal growth factor receptor (EGFR) exon 19 and 20 mutants in non-small cell lung cancer. Oncotarget 2015; 6(8):6029-39; Vyse S, Huang P H. Targeting EGFR exon 20 insertion mutations in non-small cell lung cancer. Signal transduction and targeted therapy 2019; 4:5; Zhong W Z, Zhou Q, Wu Y L. The resistance mechanisms and treatment strategies for EGFR-mutant advanced non-small-cell lung cancer. Oncotarget 2017; 8(41):71358-70). In contrast, the EGFR exon 20 mutations encompass nucleotides that translate into amino acids at positions 762-823, and include a C-helix (762-766) followed by a loop (767-775) (Yasuda H, et al. Structural, biochemical, and clinical characterization of epidermal growth factor receptor (EGFR) exon 20 insertion mutations in lung cancer. Science translational medicine 2013; 5(216):216ra177). The insertion mutations of one to seven amino acids in exon 20 form a wedge at the end of the C-helix in EGFR that promotes active kinase conformation. EGFR Exon20 insertion driver mutations (Exon20ins), a distinct and highly heterogeneous subset of NSCLCs, represent 4%-12% of all EGFR mutations (Yasuda H, et al. Sci Transl Med 2013; 5(216); Russo A, et al. Heterogeneous Responses to Epidermal Growth Factor Receptor (EGFR) Tyrosine Kinase Inhibitors (TKIs) in Patients with Uncommon EGFR Mutations: New Insights and Future Perspectives in this Complex Clinical Scenario. Int J Mol Sci 2019; 20(6); Riess J W, et al. Diverse EGFR Exon 20 Insertions and Co-Occurring Molecular Alterations Identified by Comprehensive Genomic Profiling of NSCLC. Journal of Thoracic Oncology 2018; 13(10):1560-8). These Exon20ins mutations are generally insensitive to approved EGFR-TKIs and are associated with poor prognosis; thus represent an area of high unmet medical need (Vyse S, Huang P H. Targeting EGFR exon 20 insertion mutations in non-small cell lung cancer. Signal Transduct Tar 2019; 4; Oxnard G R, et al. Natural History and Molecular Characteristics of Lung Cancers Harboring EGFR Exon 20 Insertions. Journal of Thoracic Oncology 2013; 8(2):179-84). Further, other uncommon EGFR activating mutations such as S768I, L861Q and G719X have been reported in NSCLC patients. Uncommon EGFR mutations show variable efficacy to EGFR-targeted drugs depending on the molecular alterations within exons 18-21, which are still not completely understood. The substitution mutations of G719X in exon 18 (wherein X can be ani amino acid other than G), L861Q in exon 21, and S768I in exon 20 are the most frequent mutations among the uncommon mutations. There is no clear consensus on a treatment strategy for this population (Zhang T et al. Treatment of uncommon EGFR mutations in non-small cell lung cancer: new evidence and treatment. Transl Lung Cancer Res. 2019 June; 8(3):302-316).

Recently, poziotinib and TAK-788 have been undergoing clinical evaluation in patients whose tumors carry EGFR Exon20ins mutations (Yang Z D, et al. A phase 2 study of poziotinib in patients with EGFR or HER2 exon 20 mutation-positive non-small cell lung cancer. J Clin Oncol 2018; 36(15); Janne P A, et al. Antitumor activity of TAK-788 in NSCLC with EGFR exon 20 insertions. J Clin Oncol 2019; 37(15)). Despite initial promising efficacy, the U.S. FDA denied breakthrough therapy designation for poziotinib due to the low response rate (~14%) in NSCLC patients with EGFR Exon20ins mutations. Furthermore, both poziotinib and TAK-788 led to high rates of EGFR wild-type associated toxicity due to the lack of selectivity for EGFR Exon20ins as compared to EGFR wild-type, limiting their clinical utility (Vyse S, Huang P H. Targeting EGFR exon 20 insertion mutations in non-small cell lung cancer. Signal Transduct Tar 2019; 4).

Hence, there is a need for improved therapeutics or combination of therapeutics to develop more effective treatment of EGFR or c-Met positive cancers having Exon20ins and other uncommon mutations.

SUMMARY

The disclosure provides a method of treating a subject having cancer that is positive for an EGFR exon 20 mutation, comprising administering a therapeutically effective amount of an isolated bispecific anti-epidermal growth factor receptor (EGFR)/hepatocyte growth factor receptor (c-Met) antibody to the subject having cancer that is positive for the EGFR exon 20 mutation.

The disclosure provides a method of treating a subject having cancer that is positive for an EGFR 57681, L861Q and/or G719X mutation, comprising administering a therapeutically effective amount of an isolated bispecific anti-epidermal growth factor receptor (EGFR)/hepatocyte growth factor receptor (c-Met) antibody to the subject having cancer that is positive for the mutation.

The disclosure also provides a method of treating a subject having cancer with a bispecific anti-EGFR/c-Met antibody, comprising:
a) providing a biological sample from the subject;
b) determining presence or absence of an EGFR exon 20 mutation in the sample; and
c) administering or providing for administration the bispecific anti-EGFR/c-Met antibody to the subject determined to have the EGFR exon 20 mutation.

The disclosure also provides a method of treating a subject having cancer with a bispecific anti-EGFR/c-Met antibody, comprising:
a) providing a biological sample from the subject;
b) determining presence or absence of an EGFR S768I, L861Q and/or G719X mutation mutation in the sample; and
c) administering or providing for administration the bispecific anti-EGFR/c-Met antibody to the subject determined to have the mutation.

In one embodiment, the bispecific anti-EGFR/c-Met antibody comprises a first domain that specifically binds EGFR and a second domain that specifically binds c-Met, wherein the first domain comprises a heavy chain complementarity determining region 1 (HCDR1) of SEQ ID NO: 1, a HCDR2 of SEQ ID NO: 2, a HCDR3 of SEQ ID NO: 3, a light chain complementarity determining region 1 (LCDR1) of SEQ ID NO: 4, a LCDR2 of SEQ ID NO: 5 and a LCDR3 of SEQ ID NO: 6, and wherein the second domain that binds c-Met comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

In one embodiment, the first domain that specifically binds EGFR comprises a heavy chain variable region (VH) of SEQ ID NO: 13 and a light chain variable region (VL) of SEQ ID NO: 14, and the second domain that specifically binds c-Met comprises the VH of SEQ ID NO: 15 and the VL of SEQ ID NO: 16.

In one embodiment, the bispecific anti-EGFR/c-Met antibody is an IgG1 isotype.

In one embodiment, the bispecific anti-EGFR/c-Met antibody comprises a first heavy chain (HC1) of SEQ ID NO: 17, a first light chain (LC1) of SEQ ID NO: 18, a second heavy chain (HC2) of SEQ ID NO: 19 and a second light chain (LC2) of SEQ ID NO: 20.

In one embodiment, the bispecific anti-EGFR/c-Met antibody comprises a biantennary glycan structure with a fucose content of between about 1% to about 15%.

In one embodiment, the subject is relapsed or resistant to treatment with one or more prior anti-cancer therapies.

In one embodiment, the one or more prior anti-cancer therapies comprises one or more chemotherapeutic agents, checkpoint inhibitors, targeted anti-cancer therapies or kinase inhibitors, or any combination thereof.

In one embodiment, the one or more prior anti-cancer therapies comprises carboplatin, paclitaxel, gemcitabine, cisplatin, vinorelbine, docetaxel, palbociclib, crizotinib, PD-(L)1 axis inhibitor, an inhibitor of EGFR, an inhibitor of c-Met, an inhibitor of HER2, an inhibitor of HER3, an inhibitor of HER4, an inhibitor of VEGFR, an inhibitor of AXL, erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib, or any combination thereof.

In one embodiment, the subject is treatment naïve.

EGFR activating-mutations comprise L718Q, G719A, G719X (X being any amino acid), L861X (X being any amino acid), L858R, E746K, L747S, E749Q, A750P, A755V, V765M, C797S, L858P or T790M substitution, deletion of E746-A750, deletion of R748-P753, insertion of Ala (A) between M766 and A767, insertion of Ser, Val and Ala (SVA) between 5768 and V769, insertion of Asn and Ser (NS) between P772 and H773, insertion of one or more amino acids between D761 and E762, A763 and Y764, Y764 and Y765, M766 and A767, A767 and V768, S768 and V769, V769 and D770, D770 and N771, N771 and P772, P772 and H773, H773 and V774, V774 and C775, one or more deletions in EGFR exon 20, or one or more insertions in EGFR exon 20, or any combination thereof. Subjects with EGFR exon 20 mutations (insertion of one or more amino acids) are generally resistant to EGFR tyrosine kinase inhibitors (TKI) (see. e.g. Int. Pat. Publ. No. WO2018/094225).

In one embodiment, the cancer is lung cancer, gastric cancer, colorectal cancer, brain cancer, cancer derived from epithelial cells, breast cancer, ovarian cancer, colorectal cancer, anal cancer, prostate cancer, kidney cancer, bladder cancer, head and neck cancer, pharynx cancer, cancer of the nose, pancreatic cancer, skin cancer, oral cancer, cancer of the tongue, esophageal cancer, vaginal cancer, cervical cancer, cancer of the spleen, testicular cancer, gastric cancer, cancer of the thymus, colon cancer, thyroid cancer, liver cancer, hepatocellular carcinoma (HCC) or sporadic or hereditary papillary renal cell carcinoma (PRCC), or any combination thereof.

In one embodiment, the lung cancer is non-small cell lung cancer (NSCLC), small cell lung cancer (SCLC) or lung adenocarcinoma, pulmonary sarcomatoid carcinoma or any combination thereof.

In one embodiment, the method of the disclosure, comprises further administering one or more anti-cancer therapies to the subject.

In one embodiment, the one or more anti-cancer therapies comprises chemotherapy, radiation therapy, surgery, a targeted anti-cancer therapy, a kinase inhibitor, or any combination thereof.

In one embodiment, the kinase inhibitor is an inhibitor of EGFR, an inhibitor of c-Met, an inhibitor of HER2, an inhibitor of HER3, an inhibitor of HER4, an inhibitor of VEGFR or an inhibitor of AXL.

In one embodiment, the kinase inhibitor is erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib.

In one embodiment, the EGFR exon 20 mutation is a de novo mutation.

In one embodiment, the EGFR exon 20 mutation is an acquired mutation.

In one embodiment, the EGFR S768I, L861Q and/or G719X mutation is a de novo mutation. In one embodiment, the EGFR S768I, L861Q and/or G719X mutation is an acquired mutation. In one embodiment, the X is any amino acid other than G. In one embodiment, the G719X is G719A. In one embodiment, the G719X is G719S. In one embodiment, the G719X is G719C. In one embodiment, the G719X is G719D.

In one embodiment, the bispecific anti-EGFR/c-Met antibody is administered at a dose of between about 140 mg to about 1750 mg.

In one embodiment, the bispecific anti-EGFR/c-Met antibody is administered at a dose of about 700 mg, about 750 mg, about 800 mg, about 850 mg, 900 mg, 950 mg, 1000 mg, 1050 mg, 1100 mg, 1150 mg, 1200 mg, 1250 mg, 1300 mg, 1350 mg or 1400 mg.

In one embodiment, the bispecific anti-EGFR/c-Met antibody is administered at a dose of 1050 mg.

In one embodiment, the bispecific anti-EGFR/c-Met antibody is administered at a dose of 1400 mg.

In one embodiment, the bispecific anti-EGFR/c-Met antibody is administered twice a week, once a week, once in two weeks, once in three weeks or once in four weeks.

BRIEF DESCRIPTION OF THE DRAWINGS

FIG. 1A shows a schematic of the structure of amivantamab, an EGFR and cMet bispecific antibody; FIG. 1B shows a schematic of EGFR Exon20 insertions in stable Ba/F3 cells, PDC, PDO, and PDX models; FIG. 1C shows the viability of Ba/F3 cells, stably expressing EGFR Exon20ins (V769_D770insASV, D770delinsGY, H773_V774insH, Y764_V765insHH and D770 N771insSVD), treated with either amivantamab, gefitinib, or osimertinib; FIG. 1D shows protein levels in Ba/F3 cells overexpressing the indicated EGFR Exon20ins mutations following treatment with amivantamab for 72 hours at the indicated concentrations; FIG. 1E shows protein levels in Ba/F3 cells overexpressing the indicated EGFR Exon20ins mutations following treatment with osimetinib or gefitinib for 6 hours at the indicated concentrations; FIG. 1F shows the distribution of cell cycle phases in Ba/F3 cells expressing either the EGFR D770delinsGY or the H773_V774insH Exon20ins mutations, following treatment with amivantamab; FIG. 1G shows protein levels in Ba/F3 cells overexpressing the indicated EGFR Exon20ins mutantions, following treatment with amivantamab.

FIG. 2A shows protein levels in PDCs with the indicated EGFR Exon20ins mutations treated with amivantamab for 72 hours at the indicated concentrations; FIG. 2B shows cell viability of PDCs, determined via CellTiter-Glo, following amivantamab treatment for 72 hours; FIG. 2C shows the effects of amivantamab on the cell proliferation of PDCs, measured as % optical density (O.D.). *P<0.0001, **P<0.001; Student's t-test; FIG. 2D shows a dose-response curves of YUO-036 (A767_V769dup) PDOs treated with IgG1 control or amivantamab; FIG. 2E shows a dose-response curves of YUO-029 (S768_D770dup) PDOs treated with IgG1 control or amivantamab;

FIG. 3A shows PE-EGFR and FITC-cMet expression on the plasma membrane detected in DFCI-127 (P772_H773insPNP) cells; FIG. 3B shows PE-EGFR and FITC-cMet expression on the plasma membrane detected in DFCI-58 (H773_V774insNPH) cells; FIG. 3C shows the protein levels in Ba/F3 cell lines overexpressing D770delinsGY or H773_V774insH, following pre-treatment with the autophagy inhibitor bafilomycin (100 nM) for 30 min and then amivantamab (1 mg/mL).

FIG. 4A shows tumor volumes in Ba/F3 cells overexpressing D770delinsGY- or H773_V774insH-bearing NOG mice; FIG. 4B shows % change in tumor volumes in Ba/F3 cells overexpressing D770delinsGY- or H773_V774insH-bearing NOG mice, assessed on the last day of treatment in the xenograft mice; FIG. 4C shows protein levels in tumor lysates from Ba/F3 cells overexpressing D770delinsGY- or H773_V774insH-bearing NOG mice; FIG. 4D shows tumor volumes DFCI-127-bearing NOG mice; FIG. 4E shows % change in tumor volumes in DFCI-127-bearing NOG mice, assessed on the last day of treatment; FIG. 4F shows protein levels in tumor lysates from vehicle- or amivantamab-treated DFCI-127-bearing NOG mice; FIG. 4G shows tumor volumes in YU-1163-bearing BALB/c nude mice; FIG. 4H shows % change in tumor volumes in YU-1163-bearing BALB/c nude mice, assessed on the last day of treatment; FIG. 4I shows protein levels in tumor lysates from vehicle- or amivantamab-treated YU-1163-bearing BALB/c nude mice.

FIG. 5A shows amivantamab-mediated ADCC activity against NSCLC PDCs expressing EGFR Exon20ins mutations using PBMC, E:T (50:1) ratio; FIG. 5B shows quantitative analysis of amivantamab-mediated cytotoxicity against DFCI-127 and YU-1163 PDCs, treated with either IgG1, amivantamab (10 µg/ml) or cetuximab (10 µg/ml) for 24 hours in the presence or absence of PBMC, E:T (5:1) ratio; FIG. 5C shows the reduction of the amivantamab (10 µg/ml)-mediated ADCC effects, after pre-treatment with Fc receptor blocker with PBMC (E:T ratio=50:1); FIG. 5D shows IFN-γ (pg/ml) levels in the cell culture media of PDCs co-cultured with PBMCs in the presence of IgG1, amivantamab, or cetuximab, as detected by ELISA (*P<0.0001 vs. cetuximab at the same concentration); FIG. 5E shows that PBMCs pretreated with Fc receptor blocker reduced the IFN-γ level in the culture medium in the presence of amivantamab (10 µg/ml), *P<0.0001, **P<0.001.

FIG. 6A shows Sanger sequencing data depicting the D770_N771 insG mutations of the EGFR gene in a PDX model and discloses SEQ ID NO: 21; FIG. 6B shows group mean tumor volumes of patient-derived tumors implanted in BALB/c nude mice treated with either vehicle, amivantamab (10 mg/kg), or cetuximab (10 mg/kg), twice per week, i.p. injections or poziotinib (1 mg/kg), Q.D. (*P<0.0001); FIG. 6C shows protein levels in tumors obtained from YHIM-1029 PDX models treated with 10 mg/kg amivantamab; FIG. 6D shows protein levels in tumors obtained from YHIM-1029 PDX models treated with 10 mg/kg cetuximab, or 1 mg/kg poziotinib.

FIG. 12A shows radiologic response following amivantamab 1050 mg treatment in a 58-year old patient with the EGFR H773delinsNPY mutation; FIG. 12B shows radiologic response following amivantamab 1050 mg treatment in a 48-year old patient with the EGFR S768_D770dup mutation; FIG. 12C shows a proposed model of diverse antitumor mechanisms of amivantamab in NSCLC with EGFR Exon20ins.

DETAILED DESCRIPTION

Definitions

Figure 1A:
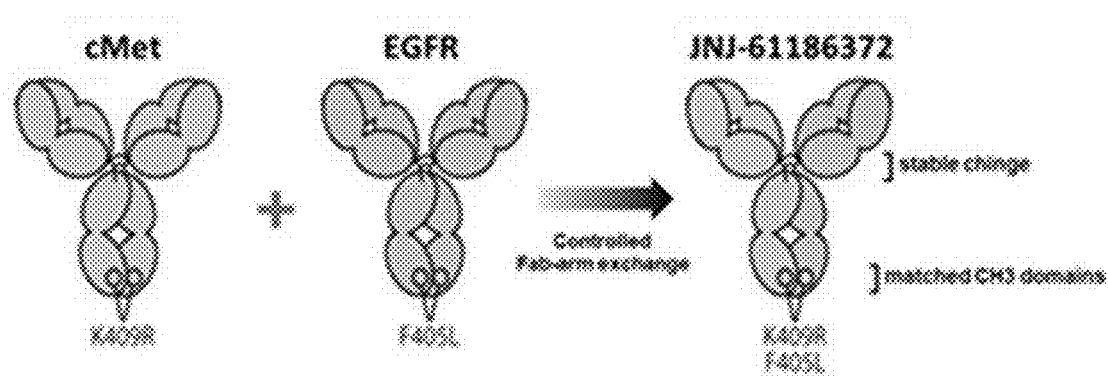
FIGS. 1A-1G show suppressesion of EGFR and c-Met signaling pathways in Ba/F3 cells with EGFR Exon20ins mutations by amivantamab.

All publications, including but not limited to patents and patent applications, cited in this specification are herein incorporated by reference as though fully set forth.

It is to be understood that the terminology used herein is for describing particular embodiments only and is not intended to be limiting. Unless defined otherwise, all technical and scientific terms used herein have the same meaning as commonly understood by one of ordinary skill in the art to which the invention pertains.

Although any methods and materials similar or equivalent to those described herein may be used in the practice for testing of the present invention, exemplary materials and methods are described herein. In describing and claiming the present invention, the following terminology will be used.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

As used in this specification and the appended claims, the singular forms "a," "an," and "the" include plural referents unless the content clearly dictates otherwise. Thus, for example, reference to "a cell" includes a combination of two or more cells, and the like.

The conjunctive term "and/or" between multiple recited elements is understood as encompassing both individual and combined options. For instance, where two elements are conjoined by "and/or," a first option refers to the applicability of the first element without the second. A second option refers to the applicability of the second element without the first. A third option refers to the applicability of the first and second elements together. Any one of these options is understood to fall within the meaning, and therefore satisfy the requirement of the term "and/or" as used herein. Concurrent applicability of more than one of the options is also understood to fall within the meaning, and therefore satisfy the requirement of the term "and/or."

The transitional terms "comprising," "consisting essentially of," and "consisting of" are intended to connote their generally accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents) also provide as embodiments those independently described in terms of "consisting of" and "consisting essentially of."

"Co-administration," "administration with," "administration in combination with," "in combination with" or the like, encompass administration of the selected therapeutics or drugs to a single patient, and are intended to include treatment regimens in which the therapeutics or drugs are administered by the same or different route of administration or at the same or different time.

"Isolated" refers to a homogenous population of molecules (such as synthetic polynucleotides, polypeptides vectors or viruses) which have been substantially separated and/or purified away from other components of the system the molecules are produced in, such as a recombinant cell, as well as a protein that has been subjected to at least one purification or isolation step. "Isolated" refers to a molecule that is substantially free of other cellular material and/or chemicals and encompasses molecules that are isolated to a higher purity, such as to 80%, 81%, 82%, 83%, 84%, 85%, 86%, 87%, 88%, 89%, 90%, 91%, 92%, 93%, 94%, 95%, 96%, 97%, 98%, 99% or 100% purity.

"Treat", "treating" or "treatment" of a disease or disorder such as cancer refers to accomplishing one or more of the following: reducing the severity and/or duration of the disorder, inhibiting worsening of symptoms characteristic of the disorder being treated, limiting or preventing recurrence of the disorder in subjects that have previously had the disorder, or limiting or preventing recurrence of symptoms in subjects that were previously symptomatic for the disorder.

"Prevent", "preventing", "prevention", or "prophylaxis" of a disease or disorder means preventing that a disorder occurs in subject.

"Diagnosing" or "diagnosis" refers to methods to determine if a subject is suffering from a given disease or condition or may develop a given disease or condition in the future or is likely to respond to treatment for a prior diagnosed disease or condition, i.e., stratifying a patient population on likelihood to respond to treatment. Diagnosis is typically performed by a physician based on the general guidelines for the disease to be diagnosed or other criteria that indicate a subject is likely to respond to a particular treatment.

"Responsive", "responsiveness" or "likely to respond" refers to any kind of improvement or positive response, such as alleviation or amelioration of one or more symptoms, diminishment of extent of disease, stabilized (i.e., not worsening) state of disease, preventing spread of disease, delay or slowing of disease progression, amelioration or palliation of the disease state, and remission (whether partial or total), whether detectable or undetectable.

"Newly diagnosed" refers to a subject who has been diagnosed with EGFR or c-Met expressing cancer but has not yet received treatment for multiple myeloma.

"Therapeutically effective amount" refers to an amount effective, at doses and for periods of time necessary, to achieve a desired therapeutic result. A therapeutically effective amount may vary depending on factors such as the disease state, age, sex, and weight of the individual, and the ability of a therapeutic or a combination of therapeutics to elicit a desired response in the individual. Exemplary indicators of an effective therapeutic or combination of therapeutics that include, for example, improved well-being of the patient.

"Refractory" refers to a disease that does not respond to a treatment. A refractory disease can be resistant to a treatment before or at the beginning of the treatment, or a refractory disease can become resistant during a treatment.

"Relapsed" refers to the return of a disease or the signs and symptoms of a disease after a period of improvement after prior treatment with a therapeutic.

"Subject" includes any human or nonhuman animal "Nonhuman animal" includes all vertebrates, e.g., mammals and non-mammals, such as nonhuman primates, sheep, dogs, cats, horses, cows, chickens, amphibians, reptiles, etc. The terms "subject" and "patient" are used interchangeably herein.

"About" means within an acceptable error range for the particular value as determined by one of ordinary skill in the art, which will depend in part on how the value is measured or determined, i.e., the limitations of the measurement system. Unless explicitly stated otherwise within the Examples or elsewhere in the Specification in the context of a particular assay, result or embodiment, "about" means within one standard deviation per the practice in the art, or a range of up to 5%, whichever is larger.

"Cancer" refers to an abnormal growth of cells which tend to proliferate in an uncontrolled way and, in some cases, to metastasize (spread) to other areas of a patient's body.

"EGFR or c-Met expressing cancer" refers to cancer that has detectable expression of EGFR or c-Met or has EGFR or c-Met mutation or amplification. EGFR or c-Met expression, amplification and mutation status can be detected using know methods, such as sequencing, fluorescent in situ hybridization, immunohistochemistry, flow cytometry or western blotting.

"Epidermal growth factor receptor" or "EGFR" refers to the human EGFR (also known as HER1 or ErbB1 (Ullrich et al., Nature 309:418-425, 1984) having the amino acid sequence shown in GenBank accession number NP_005219, as well as naturally-occurring variants thereof.

"EGFR exon 20 mutations" or "EGFR Exon20ins" or "Exon20ins" refer to the human EGFR gene encompassing at least one mutation in nucleotides that translate into amino acids at position 762-823, and include a C-helix (762-766) followed by a loop (767-775) (see Yasuda H et al., Science Translational Medicine 2013; 5(216):216ra177 doi 10.1126/scitranslmed.3007205). The insertion mutations of one to seven amino acids in exon 20 form a wedge at the end of the C-helix in EGFR that promotes active kinase conformation.

"Hepatocyte growth factor receptor" or "c-Met" as used herein refers to the human c-Met having the amino acid sequence shown in GenBank Accession No: NP_001120972 and natural variants thereof.

"Bispecific anti-EGFR/c-Met antibody" or "bispecific EGFR/c-Met antibody" refers to a bispecific antibody having a first domain that specifically binds EGFR and a second domain that specifically binds c-Met. The domains specifically binding EGFR and c-Met are typically VH/VL pairs, and the bispecific anti-EGFR/c-Met antibody is monovalent in terms of binding to EGFR and c-Met.

"Specific binding" or "specifically binds" or "specifically binding" or "binds" refer to an antibody binding to an antigen or an epitope within the antigen with greater affinity than for other antigens. Typically, the antibody binds to the antigen or the epitope within the antigen with an equilibrium dissociation constant ($K_D$) of about $5\times10^{-8}$M or less, for example about $1\times10^{-9}$ M or less, about $1\times10^{-10}$ M or less, about $1\times10^{-11}$ M or less, or about $1\times10^{-12}$ M or less, typically with the $K_D$ that is at least one hundred-fold less than its $K_D$ for binding to a non-specific antigen (e.g., BSA, casein). The dissociation constant may be measured using known protocols. Antibodies that bind to the antigen or the epitope within the antigen may, however, have cross-reactivity to other related antigens, for example to the same antigen from other species (homologs), such as human or monkey, for example Macaca fascicularis (cynomolgus, cyno) or Pan troglodytes (chimpanzee, chimp) While a monospecific antibody binds one antigen or one epitope, a bispecific antibody binds two distinct antigens or two distinct epitopes.

"Antibodies" is meant in a broad sense and includes immunoglobulin molecules including monoclonal antibodies including murine, human, humanized and chimeric monoclonal antibodies, antigen binding fragments, multispecific antibodies, such as bispecific, trispecific, tetraspecific etc., dimeric, tetrameric or multimeric antibodies, single chain antibodies, domain antibodies and any other modified configuration of the immunoglobulin molecule that comprises an antigen binding site of the required specificity. "Full length antibodies" are comprised of two heavy chains (HC) and two light chains (LC) inter-connected by disulfide bonds as well as multimers thereof (e.g. IgM). Each heavy chain is comprised of a heavy chain variable region (VH) and a heavy chain constant region (comprised of domains CH1, hinge, CH2 and CH3). Each light chain is comprised of a light chain variable region (VL) and a light chain constant region (CL). The VH and the VL regions may be further subdivided into regions of hypervariability, termed complementarity determining regions (CDR), interspersed with framework regions (FR). Each VH and VL is composed of three CDRs and four FR segments, arranged from amino-to-carboxy-terminus in the following order: FR1, CDR1, FR2, CDR2, FR3, CDR3 and FR4.

"Complementarity determining regions" (CDR) are antibody regions that bind an antigen. CDRs may be defined using various delineations such as Kabat (Wu et al. (1970) *J Exp Med* 132: 211-50) (Kabat et al., Sequences of Proteins of Immunological Interest, 5th Ed. Public Health Service, National Institutes of Health, Bethesda, Md., 1991), Chothia (Chothia et al. (1987) *J Mol Biol* 196: 901-17), IMGT (Lefranc et al. (2003) *Dev Comp Immunol* 27: 55-77) and AbM (Martin and Thornton (1996) *J Bmol Biol* 263: 800-15). The correspondence between the various delineations and variable region numbering are described (see e.g. Lefranc et al. (2003) *Dev Comp Immunol* 27: 55-77; Honegger and Pluckthun, (2001) *J Mol Biol* 309:657-70; International ImMunoGeneTics (IMGT) database; Web resources, http://www_imgt_org). Available programs such as abYsis by UCL Business PLC may be used to delineate CDRs. The term "CDR", "HCDR1", "HCDR2", "HCDR3", "LCDR1", "LCDR2" and "LCDR3" as used herein includes CDRs defined by any of the methods described supra, Kabat, Chothia, IMGT or AbM, unless otherwise explicitly stated in the specification Immunoglobulins may be assigned to five major classes, IgA, IgD, IgE, IgG and IgM, depending on the heavy chain constant domain amino acid sequence. IgA and IgG are further sub-classified as the isotypes IgA1, IgA2, IgG1, IgG2, IgG3 and IgG4. Antibody light chains of any vertebrate species may be assigned to one of two clearly distinct types, namely kappa (κ) and lambda (λ), based on the amino acid sequences of their constant domains.

"Antigen binding fragment" refers to a portion of an immunoglobulin molecule that binds an antigen. Antigen binding fragments may be synthetic, enzymatically obtainable or genetically engineered polypeptides and include the VH, the VL, the VH and the VL, Fab, F(ab')2, Fd and Fv fragments, domain antibodies (dAb) consisting of one VH domain or one VL domain, shark variable IgNAR domains, camelized VH domains, minimal recognition units consisting of the amino acid residues that mimic the CDRs of an antibody, such as FR3-CDR3-FR4 portions, the HCDR1, the HCDR2 and/or the HCDR3 and the LCDR1, the LCDR2 and/or the LCDR3. VH and VL domains may be linked together via a synthetic linker to form various types of single chain antibody designs where the VH/VL domains may pair intramolecularly, or intermolecularly in those cases when the VH and VL domains are expressed by separate single chain antibody constructs, to form a monovalent antigen binding site, such as single chain Fv (scFv) or diabody; described for example in Int. Patent Publ. Nos. WO1998/44001, WO1988/01649, WO1994/13804 and WO1992/01047.

"Monoclonal antibody" refers to an antibody obtained from a substantially homogenous population of antibody molecules, i.e., the individual antibodies comprising the population are identical except for possible well-known alterations such as removal of C-terminal lysine from the antibody heavy chain or post-translational modifications such as amino acid isomerization or deamidation, methionine oxidation or asparagine or glutamine deamidation. Monoclonal antibodies typically bind one antigenic epitope. A bispecific monoclonal antibody binds two distinct antigenic epitopes. Monoclonal antibodies may have heterogeneous glycosylation within the antibody population. Monoclonal antibody may be monospecific or multispecific such as bispecific, monovalent, bivalent or multivalent.

"Recombinant" refers to DNA, antibodies and other proteins that are prepared, expressed, created or isolated by recombinant means when segments from different sources are joined to produce recombinant DNA, antibodies or proteins.

"Bispecific" refers to an antibody that specifically binds two distinct antigens or two distinct epitopes within the same antigen. The bispecific antibody may have cross-reactivity to other related antigens, for example to the same antigen from other species (homologs), such as human or monkey, for example *Macaca cynomolgus* (cynomolgus, cyno) or *Pan troglodytes*, or may bind an epitope that is shared between two or more distinct antigens.

"Antagonist" or "inhibitor" refers to a molecule that, when bound to a cellular protein, suppresses at least one reaction or activity that is induced by a natural ligand of the protein. A molecule is an antagonist when the at least one reaction or activity is suppressed by at least about 20%, 30%, 40%, 45%, 50%, 55%, 60%, 65%, 70%, 75%, 80%, 85%, 90%, 95%, or 100% more than the at least one reaction or activity suppressed in the absence of the antagonist (e.g., negative control), or when the suppression is statistically significant when compared to the suppression in the absence of the antagonist.

"PD-(L)1 axis inhibitor" refers to a molecule that inhibits PD-1 downstream signaling PD-(L)1 axis inhibitor may be a molecule that binds PD-1, PD-L1 or PD-L2.

"Biological sample" refers to a collection of similar fluids, cells, or tissues isolated from a subject, as well as fluids, cells, or tissues present within a subject. Exemplary samples are biological fluids such as blood, serum and serosal fluids, plasma, lymph, urine, saliva, cystic fluid, tear drops, feces, sputum, mucosal secretions of the secretory tissues and organs, vaginal secretions, ascites fluids, fluids of the pleural, pericardial, peritoneal, abdominal and other body cavities, fluids collected by bronchial lavage, synovial fluid, liquid solutions contacted with a subject or biological source, for example, cell and organ culture medium including cell or organ conditioned medium, lavage fluids and the like, tissue biopsies, tumor tissue biopsies, tumor tissue samples, fine needle aspirations, surgically resected tissue, organ cultures or cell cultures.

"Low fucose" or "low fucose content" as used in the application refers to antibodies with fucose content of about between 1%-15%.

"Normal fucose" or 'normal fucose content" as used herein refers to antibodies with fucose content of about over 50%, typically about over 80% or over 85%.

Methods of the Disclosure

Amivantamab or JNJ-61186372 (JNJ-372) is an IgG1 anti-EGFR/c-Met bispecific antibody described in U.S. Pat. No. 9,593,164.

The disclosure is based, at least in part, on the finding that amivantamab is effective in treating subjects having EGFR exon 20 mutations.

EGFR exon 20 mutations comprise insertion mutations of one to seven amino acids in exon 20. Exon 20 of EGFR encompasses nucleotides that translate into amino acid at position 762 to 823. It contains a C-helix (residues 762-766) and the loop following C-helix (residues 767-774), where the insertions could induce ligand-independent EGFR pathway activation and give rise to tumorigenesis. In one embodiment, the EGFR exon 20 mutation is an insertion of one amino acid in exon 20. In one embodiment, the EGFR exon 20 mutation is an insertion of two amino acids in exon 20. In one embodiment, the EGFR exon 20 mutation is an insertion of three amino acids in exon 20. In one embodiment, the EGFR exon 20 mutation is an insertion of four amino acids in exon 20. In one embodiment, the EGFR exon 20 mutation is an insertion of five amino acids in exon 20. In one embodiment, the EGFR exon 20 mutation is an insertion of six amino acids in exon 20. In one embodiment, the EGFR exon 20 mutation is an insertion of seven amino acids in exon 20.

In one embodiment, the EGFR uncommon mutations comprise S768I, L861Q and/or G719X mutations. In one embodiment, the X is any amino acid other than G. In one embodiment, the G719X is G719A. In one embodiment, the G719X is G719C. In one embodiment, the G719X is G719S. In one embodiment, the G719X is G719D.

Certain embodiments of the present disclosure concern determining if a subject has one or more EGFR exon 20 mutations, such as an insertion mutation, or other uncommon mutations. Mutation detection methods are known the art, including PCR followed by nucleic acid sequencing, FISH, CGH, or next generation sequenceing (NGS). In some embodiments, the exon 20 mutations or other uncommon mutations are detected by DNA sequencing, such as next generation sequenceing (NGS), by using a tumor tissue sample or circulating free DNA from plasma.

The disclosure provides a method of treating a subject having cancer that is positive for a EGFR exon 20 mutation, comprising administering a therapeutically effective amount of an isolated bispecific anti-epidermal growth factor receptor (EGFR)/hepatocyte growth factor receptor (c-Met) antibody to the subject having cancer that is positive for a EGFR exon 20 mutation.

The disclosure also provides a method of treating a subject having lung cancer that is positive for a EGFR exon 20 mutation, comprising administering a therapeutically effective amount of an isolated bispecific anti-EGFR/c-Met antibody to the subject having lung cancer that is positive for a EGFR exon 20 mutation.

The disclosure also provides a method of treating a subject having non-small cell lung cancer (NSCLC) that is positive for a EGFR exon 20 mutation, comprising administering a therapeutically effective amount of an isolated bispecific anti-EGFR/c-Met antibody to the subject having NSCLC that is positive for a EGFR exon 20 mutation.

The disclosure also provides a method of treating a subject having small cell lung cancer (SCLC) that is positive for a EGFR exon 20 mutation, comprising administering a therapeutically effective amount of an isolated bispecific anti-EGFR/c-Met antibody to the subject having SCLC that is positive for a EGFR exon 20 mutation.

The disclosure also provides a method of treating a subject having lung adenocarcinoma that is positive for EGFR exon 20 mutation, comprising administering a therapeutically effective amount of an isolated bispecific anti-EGFR/c-Met antibody to the subject having lung adenocarcinoma that is positive for EGFR exon 20 mutation.

The disclosure also provides a method of treating a subject having cancer with a bispecific anti-EGFR/c-Met antibody, comprising:
  providing a biological sample from the subject;
  determining presence or absence of a EGFR exon 20 mutation in the sample;
  administering or providing for administration the bispecific anti-EGFR/c-Met antibody to the subject determined to have EGFR exon 20 mutation.

In some embodiments, the biological sample is a blood sample.

In some embodiments, the biological sample is a tumor tissue biopsy

In some embodiments, the bispecific anti-EGFR/c-Met antibody comprises a first domain that specifically binds EGFR and a second domain that specifically binds c-Met, wherein the first domain comprises a heavy chain complementarity determining region 1 (HCDR1) of SEQ ID NO: 1, a HCDR2 of SEQ ID NO: 2, a HCDR3 of SEQ ID NO: 3, a light chain complementarity determining region 1 (LCDR1) of SEQ ID NO: 4, a LCDR2 of SEQ ID NO: 5 and a LCDR3 of SEQ ID NO: 6; and the second domain comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

In some embodiments, the first domain that specifically binds EGFR comprises a heavy chain variable region (VH) of SEQ ID NO: 13 and a light chain variable region (VL) of SEQ ID NO: 14; and the second domain that specifically binds c-Met comprises the VH of SEQ ID NO: 15 and the VL of SEQ ID NO: 16.

In some embodiments, the bispecific anti-EGFR/c-Met antibody is an IgG1 isotype.

In some embodiments, the bispecific anti-EGFR/c-Met antibody comprises a first heavy chain (HC1) of SEQ ID NO: 17, a first light chain (LC1) of SEQ ID NO: 18, a second heavy chain (HC2) of SEQ ID NO: 19 and a second light chain (LC2) of SEQ ID NO: 20.

In some embodiments, the bispecific anti-EGFR/c-Met antibody comprises a biantennary glycan structure with a fucose content of between about 1% to about 15%.

Antibodies with reduced fucose content can be made using different methods reported to lead to the successful expression of relatively high defucosylated antibodies bearing the biantennary complex-type of Fc oligosaccharides such as control of culture osmolality (Konno et al., Cytotechnology 64(:249-65, 2012), application of a variant CHO line Lec13 as the host cell line (Shields et al., J Biol Chem 277:26733-26740, 2002), application of a variant CHO line EB66 as the host cell line (Olivier et al., MAbs; 2(4), 2010; Epub ahead of print; PMID:20562582), application of a rat hybridoma cell line YB2/0 as the host cell line (Shinkawa et al., J Biol Chem 278:3466-3473, 2003), introduction of small interfering RNA specifically against the cc 1,6-fucosyltrasferase (FUT8) gene (Mori et al., Biotechnol Bioeng 88:901-908, 2004), or coexpression of β-1,4-N-acetylglucosaminyltransferase III and Golgi α-mannosidase II or a potent alpha-mannosidase I inhibitor, kifunensine (Ferrara et al., J Biol Chem 281:5032-5036, 2006, Ferrara et al., Biotechnol Bioeng 93:851-861, 2006; Xhou et al., Biotechnol Bioeng 99:652-65, 2008). In general, lowering fucose content in the glycan of the antibodies potentiates antibody-meidated cellular cytotoxicity (ADCC).

The disclosure also provides a method of treating a subject having cancer that is positive for EGFR exon 20 mutation, comprising administering a therapeutically effective amount of an isolated bispecific anti-EGFR/c-Met antibody to the subject having cancer that is positive for EGFR exon 20 mutation, wherein the bispecific anti-EGFR/c-Met antibody comprises a first domain that specifically binds EGFR and a second domain that specifically binds c-Met, wherein the first domain comprises a HCDR1 of SEQ ID NO: 1, a HCDR2 of SEQ ID NO: 2, a HCDR3 of SEQ ID NO: 3, a LCDR1 of SEQ ID NO: 4, a LCDR2 of SEQ ID NO: 5 and a LCDR3 of SEQ ID NO: 6; and the second domain comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

The disclosure also provides a method of treating a subject having lung cancer that is positive for EGFR exon 20 mutation, comprising administering a therapeutically effective amount of an isolated bispecific anti-EGFR/c-Met antibody to the subject having lung cancer that is positive for EGFR exon 20 mutation, wherein the bispecific anti-EGFR/c-Met antibody comprises a first domain that specifically binds EGFR and a second domain that specifically binds c-Met, wherein the first domain comprises a HCDR1 of SEQ ID NO: 1, a HCDR2 of SEQ ID NO: 2, a HCDR3 of SEQ ID NO: 3, a LCDR1 of SEQ ID NO: 4, a LCDR2 of SEQ ID NO: 5 and a LCDR3 of SEQ ID NO: 6; and the second domain comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

The disclosure also provides a method of treating a subject having NSCLC that is positive for EGFR exon 20 mutation, comprising administering a therapeutically effective amount of an isolated bispecific anti-EGFR/c-Met antibody to the subject having NSCLC that is positive for a EGFR exon 20 mutation, wherein the bispecific anti-EGFR/c-Met antibody comprises a first domain that specifically binds EGFR and a second domain that specifically binds c-Met, wherein the first domain comprises a HCDR1 of SEQ ID NO: 1, a HCDR2 of SEQ ID NO: 2, a HCDR3 of SEQ ID NO: 3, a LCDR1 of SEQ ID NO: 4, a LCDR2 of SEQ ID NO: 5 and a LCDR3 of SEQ ID NO: 6; and the second domain comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

The disclosure also provides a method of treating a subject having SCLC that is positive for a EGFR exon 20 mutation, comprising administering a therapeutically effective amount of an isolated bispecific anti-EGFR/c-Met antibody to the subject having SCLC that is positive for the EGFR exon 20 mutation, wherein the bispecific anti-EGFR/c-Met antibody comprises a first domain that specifically binds EGFR and a second domain that specifically binds c-Met, wherein the first domain comprises a HCDR1 of SEQ ID NO: 1, a HCDR2 of SEQ ID NO: 2, a HCDR3 of SEQ ID NO: 3, a LCDR1 of SEQ ID NO: 4, a LCDR2 of SEQ ID NO: 5 and a LCDR3 of SEQ ID NO: 6; and the second domain comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

The disclosure also provides a method of treating a subject having lung adenocarcinoma that is positive for a EGFR exon 20 mutation, comprising administering a therapeutically effective amount of an isolated bispecific anti-EGFR/c-Met antibody to the subject having lung adenocarcinoma that is positive for EGFR exon 20 mutation, wherein the bispecific anti-EGFR/c-Met antibody comprises a first domain that specifically binds EGFR and a second domain that specifically binds c-Met, wherein the first domain comprises a HCDR1 of SEQ ID NO: 1, a HCDR2 of SEQ ID NO: 2, a HCDR3 of SEQ ID NO: 3, a LCDR1 of SEQ ID NO: 4, a LCDR2 of SEQ ID NO: 5 and a LCDR3 of SEQ ID NO: 6; and the second domain comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.

The disclosure provides a method of treating a subject having cancer that is positive for a EGFR exon 20 mutation, comprising administering a therapeutically effective amount of an isolated bispecific anti-EGFR/c-Met antibody to the subject having cancer that is positive for EGFR exon 20 mutation, wherein the bispecific anti-EGFR/c-Met antibody comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having lung cancer that is positive for a EGFR exon 20 mutation, comprising administering a therapeutically effective amount of an isolated bispecific anti-EGFR/c-Met antibody to the subject having lung cancer that is positive for EGFR exon 20 mutation, wherein the bispecific anti-EGFR/c-Met antibody comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having NSCLC that is positive for a EGFR exon 20 mutation, comprising administering a therapeutically effective amount of an isolated bispecific anti-EGFR/c-Met antibody to the subject having NSCLC that is positive for EGFR exon 20 mutation, wherein the bispecific anti-EGFR/c-Met antibody comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having SCLC that is positive for a EGFR exon 20 mutation, comprising administering a therapeutically effective amount of an isolated bispecific anti-EGFR/c-Met antibody to the subject having SCLC that is positive for EGFR exon 20 mutation, wherein the bispecific anti-EGFR/c-Met antibody comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having lung adenocarcinoma that is positive for a EGFR exon 20 mutation, comprising administering a therapeutically effective amount of an isolated bispecific anti-EGFR/c-Met antibody to the subject having lung adenocarcinoma that is positive for EGFR exon 20 mutation, wherein the bispecific anti-EGFR/c-Met antibody comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure provides a method of treating a subject having cancer that is positive for a EGFR exon 20 mutation, comprising administering a therapeutically effective amount of an isolated bispecific anti-EGFR/c-Met antibody to the subject having cancer that is positive for EGFR exon 20 mutation, wherein the bispecific anti-EGFR/c-Met antibody is an IgG1 isotype and comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having lung cancer that is positive for a EGFR exon 20 mutation, comprising administering a therapeutically effective amount of an isolated bispecific anti-EGFR/c-Met antibody to the subject having lung cancer that is positive for EGFR exon 20 mutation, wherein the bispecific anti-EGFR/c-Met antibody is an IgG1 isotype and comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having NSCLC that is positive for a EGFR exon 20 mutation, comprising administering a therapeutically effective amount of an isolated bispecific anti-EGFR/c-Met antibody to the subject having NSCLC that is positive for EGFR exon 20 mutation, wherein the bispecific anti-EGFR/c-Met antibody is an IgG1 isotype and comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having SCLC that is positive for a EGFR exon 20 mutation, comprising administering a therapeutically effective amount of an isolated bispecific anti-EGFR/c-Met antibody to the subject having SCLC that is positive for EGFR exon 20 mutation, wherein the bispecific anti-EGFR/c-Met antibody is an IgG1 isotype and comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

The disclosure also provides a method of treating a subject having lung adenocarcinoma that is positive for a EGFR exon 20 mutation, comprising administering a therapeutically effective amount of an isolated bispecific anti-EGFR/c-Met antibody to the subject having lung adenocarcinoma that is positive for EGFR exon 20 mutation, wherein the bispecific anti-EGFR/c-Met antibody is an IgG1 isotype and comprises a first domain that specifically binds EGFR and a second domain that specifically binds c-Met, wherein the first domain comprises a VH of SEQ ID NO: 13 and a VL of SEQ ID NO: 14; and the second domain comprises the VH of SEQ ID NO: 15 and the VL of SEQ ID NO: 16.

In some embodiments, the bispecific anti-EGFR/c-Met antibody is an IgG1 isotype. Some variation exists within the IgG1 constant domain (e.g. well-known allotypes), with variation at positions 214, 356, 358, 422, 431, 435 o 436 (residue numbering according to the EU numbering) (see e.g. IMGT Web resources; IMGT Repertoire (IG and TR); Proteins and alleles; allotypes). The bispecific anti-EGFR/c-Met antibody may be of any IgG1 allotype, such as G1m17, G1m3, G1m1, G1m2, G1m27 or G1m28.

The disclosure also provides a method of treating a subject having cancer that is positive for a EGFR exon 20 mutation, comprising administering a therapeutically effective amount of an isolated bispecific anti-EGFR/c-Met antibody to the subject having cancer that is positive for EGFR exon 20 mutation, wherein the bispecific anti-EGFR/c-Met antibody comprises a HC1 of SEQ ID NO: 17, a LC1 of SEQ ID NO: 18, a HC2 of SEQ ID NO: 19 and a LC2 of SEQ ID NO: 20.

The disclosure also provides a method of treating a subject having lung cancer that is positive for a EGFR exon 20 mutation, comprising administering a therapeutically effective amount of an isolated bispecific anti-EGFR/c-Met antibody to the subject having lung cancer that is positive for EGFR exon 20 mutation, wherein the bispecific anti-EGFR/c-Met antibody comprises a HC1 of SEQ ID NO: 17, a LC1 of SEQ ID NO: 18, a HC2 of SEQ ID NO: 19 and a LC2 of SEQ ID NO: 20.

The disclosure also provides a method of treating a subject having NSCLC that is positive for a EGFR exon 20 mutation, comprising administering a therapeutically effective amount of an isolated bispecific anti-EGFR/c-Met antibody to the subject having NSCLC that is positive for EGFR exon 20 mutation, wherein the bispecific anti-EGFR/c-Met antibody comprises a HC1 of SEQ ID NO: 17, a LC1 of SEQ ID NO: 18, a HC2 of SEQ ID NO: 19 and a LC2 of SEQ ID NO: 20.

The disclosure also provides a method of treating a subject having SCLC that is positive for a EGFR exon 20 mutation, comprising administering a therapeutically effective amount of an isolated bispecific anti-EGFR/c-Met antibody to the subject having SCLC that is positive for EGFR exon 20 mutation, wherein the bispecific anti-EGFR/c-Met antibody comprises a HC1 of SEQ ID NO: 17, a LC1 of SEQ ID NO: 18, a HC2 of SEQ ID NO: 19 and a LC2 of SEQ ID NO: 20.

The disclosure also provides a method of treating a subject having lung adenocarcinoma that is positive for a EGFR exon 20 mutation, comprising administering a therapeutically effective amount of an isolated bispecific anti-EGFR/c-Met antibody to the subject having lung adenocarcinoma that is positive for EGFR exon 20 mutation, wherein the bispecific anti-EGFR/c-Met antibody comprises a HC1 of SEQ ID NO: 17, a LC1 of SEQ ID NO: 18, a HC2 of SEQ ID NO: 19 and a LC2 of SEQ ID NO: 20.

In some embodiments, the subject is relapsed or resistant to treatment with one or more prior anti-cancer therapies.

In some embodiments, the subject has acquired the EGFR exon 20 mutation as a result of treatment with one or more prior anti-cancer therapies.

In some embodiments, the subject has acquired the EGFR exon 20 mutation as a result of treatment with a kinase inhibitor.

In some embodiments, the subject has acquired the EGFR exon 20 mutation as a result of treatment with an EGFR kinase inhibitor.

In some embodiments, the subject has acquired the EGFR exon 20 mutation as a result of treatment with a c-Met kinase inhibitor.

In some embodiments, the one or more prior anti-cancer therapies comprises one or more chemotherapeutic agents, checkpoint inhibitors, targeted anti-cancer therapies or kinase inhibitors, or any combination thereof.

In some embodiments, the kinase inhibitor is an inhibitor of EGFR, an inhibitor of c-Met, an inhibitor of HER2, an inhibitor of HER3, an inhibitor of HER4, an inhibitor of VEGFR or an inhibitor of AXL.

In some embodiments, the kinase inhibitor is erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib.

In some embodiments, the one or more prior anti-cancer therapies comprises carboplatin, paclitaxel, gemcitabine, cisplatin, vinorelbine, docetaxel, palbociclib, crizotinib, PD-(L)1 axis inhibitor, an inhibitor of EGFR, an inhibitor of c-Met, an inhibitor of HER2, an inhibitor of HER3, an inhibitor of HER4, an inhibitor of VEGFR, an inhibitor of AXL, erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib, or any combination thereof.

In some embodiments, the subject is resistant or has acquired resistance to an EGFR inhibitor. Exemplary EGFR inhibitors for which cancer may acquire resistance are anti-EGFR antibodies cetuximab (ERBITUX®), pantinumumab (VECTIBIX®), matuzumab, nimotuzumab, small molecule EGFR inhibitors erlotinib (TARCEVA®), gefitinib (IRESSA®), EKB-569 (pelitinib, irreversible EGFR TKI), pan-ErbB and other receptor tyrosine kinase inhibitors, lapatinib (EGFR and HER2 inhibitor), pelitinib (EGFR and HER2 inhibitor), vandetanib (ZD6474, ZACTIMA™, EGFR, VEGFR2 and RET TKI), PF00299804 (dacomitinib, irreversible pan-ErbB TKI), CI-1033 (irreversible pan-erbB TKI), afatinib (BIBW2992, irreversible pan-ErbB TKI), AV-412 (dual EGFR and ErbB2 inhibitor), EXEL-7647 (EGFR, ErbB2, GEVGR and EphB4 inhibitor), CO-1686 (irreversible mutant-selective EGFR TKI), AZD9291 (irreversible mutant-selective EGFR TKI), and HKI-272 (neratinib, irreversible EGFR/ErbB2 inhibitor).

Various qualitative and/or quantitative methods may be used to determine if a subject is resistant, has developed or is susceptible to developing a resistance to treatment with an anti-cancer therapy. Symptoms that may be associated with resistance to an anti-cancer therapy include a decline or plateau of the well-being of the patient, an increase in the size of a tumor, arrested or slowed decline in growth of a tumor, and/or the spread of cancerous cells in the body from one location to other organs, tissues or cells. Re-establishment or worsening of various symptoms associated with cancer may also be an indication that a subject has developed or is susceptible to developing resistance to an anti-cancer therapy, such as anorexia, cognitive dysfunction, depression, dyspnea, fatigue, hormonal disturbances, neutropenia, pain, peripheral neuropathy, and sexual dysfunction. The symptoms associated with cancer may vary according to the type of cancer. For example, symptoms associated with cervical cancer may include abnormal bleeding, unusual heavy vaginal discharge, pelvic pain that is not related to the normal menstrual cycle, bladder pain or pain during urination, and bleeding between regular menstrual periods, after sexual intercourse, douching, or pelvic exam Symptoms associated with lung cancer may include persistent cough, coughing up blood, shortness of breath, wheezing chest pain, loss of appetite, losing weight without trying and fatigue. Symptoms for liver cancer may include loss of appetite and weight, abdominal pain, especially in the upper right part of abdomen that may extend into the back and shoulder, nausea and vomiting, general weakness and fatigue, an enlarged liver, abdominal swelling (ascites), and a yellow discoloration of the skin and the whites of eyes (jaundice). One skilled in oncology may readily identify symptoms associated with a particular cancer type.

Exemplary PD-(L)1 axis inhibitors are antibodies that bind PD-1 such as nivolumab (OPDIVO®), pembrolizumab (KEYTRUDA®), sintilimab, cemiplimab (LIBTAYO®), tripolibamab, tislelizumab, spartalizumab, camrelizumab, dostralimab, genolimzumab or cetrelimab, or antibodies that bind PD-L1, such as PD-L1 antibodies are envafolimab, atezolizumab (TECENTRIQ®), durvalumab (IMFINZI®) and avelumab (BAVENCIO®).

Marketed antibodies may be purchased via authorized distributor or pharmacy. The amino acid sequences structures of the small molecules can be found from USAN and/or INN submissions by the companies of from CAS registry.

In some embodiments, the subject is treatment naïve.

In some embodiments, the EGFR exon 20 mutation is a de novo mutation.

EGFR activating mutations that may be associated with cancer include point mutations, deletion mutations, insertion mutations, inversions or gene amplifications that lead to an increase in at least one biological activity of EGFR, such as elevated tyrosine kinase activity, formation of receptor homodimers and heterodimers, enhanced ligand binding etc. Mutations can be located in any portion of an EGFR gene or regulatory region associated with an EGFR gene and include mutations in exon 18, 19, 20 or 21 or mutations in the kinase domain. Other examples of EGFR activating mutations are known in the art (see e.g., U.S. Pat. Publ. No. US2005/0272083). Information about EGFR and other ErbB receptors including receptor homo- and hetero-dimers, receptor ligands, autophosphorylation sites, and signaling molecules involved in ErbB mediated signaling is known in the art (see e.g., Hynes and Lane, Nature Reviews Cancer 5: 341-354, 2005).

In some embodiments, the EGFR activating mutation comprises L718Q, G719A, G719X (X being any amino acid), L861X (X being any amino acid), L858R, E746K, L747S, E749Q, A750P, A755V, V765M, C797S, L858P or T790M substitution, deletion of E746-A750, deletion of R748-P753, insertion of Ala (A) between M766 and A767, insertion of Ser, Val and Ala (SVA) between S768 and V769, insertion of Asn and Ser (NS) between P772 and H773, insertion of one or more amino acids between D761 and E762, A763 and Y764, Y764 and Y765, M766 and A767, A767 and V768, S768 and V769, V769 and D770, D770 and N771, N771 and P772, P772 and H773, H773 and V774, V774 and C775, one or more deletions in EGFR exon 20, or any combination thereof.

Exemplary c-Met activating mutations include point mutations, deletion mutations, insertion mutations, inversions or gene amplifications that lead to an increase in at least one biological activity of a c-Met protein, such as elevated tyrosine kinase activity, formation of receptor homodimers and heterodimers, enhanced ligand binding etc. Mutations can be located in any portion of the c-Met gene or regulatory regions associated with the gene, such as mutations in the kinase domain of c-Met. Exemplary c-Met activating mutations are mutations at residue positions N375, V13, V923, R175, V136, L229, S323, R988, S1058/T1010 and E168. Methods for detecting EGFR and c-Met mutations or gene amplifications are well known.

In some embodiments, cancer that is positive for a EGFR exon 20 mutation comprises lung cancer, gastric cancer, colorectal cancer, brain cancer, derived from epithelial cell cancer, breast cancer, ovarian cancer, colorectal cancer, anal cancer, prostate cancer, kidney cancer, bladder cancer, head and neck cancer, pharynx cancer, cancer of the nose, pancreatic cancer, skin cancer, oral cancer, cancer of the tongue, esophageal cancer, vaginal cancer, cervical cancer, cancer of the spleen, testicular cancer, gastric cancer, cancer of the thymus, colon cancer, thyroid cancer, liver cancer, hepatocellular carcinoma (HCC) or sporadic or hereditary papillary renal cell carcinoma (PRCC), or any combination thereof. In some embodiments, cancer that is positive for a EGFR exon 20 mutation comprises lung cancer. In some embodiments, cancer that is positive for a EGFR exon 20 mutation comprises gastric cancer. In some embodiments, cancer that is positive for a EGFR exon 20 mutation comprises colorectal cancer. In some embodiments, cancer that is positive for a EGFR exon 20 mutation comprises brain cancer. In some embodiments, cancer that is positive for a EGFR exon 20 mutation comprises epithelial cell cancer. In some embodiments, cancer that is positive for a EGFR exon 20 mutation comprises breast cancer. In some embodiments, cancer that is positive for a EGFR exon 20 mutation comprises ovarian cancer. In some embodiments, cancer that is positive for a EGFR exon 20 mutation comprises colorectal cancer. In some embodiments, cancer that is positive for a EGFR exon 20 mutation comprises anal cancer. In some embodiments, cancer that is positive for a EGFR exon 20 mutation comprises prostate cancer. In some embodiments, cancer that is positive for a EGFR exon 20 mutation comprises kidney cancer. In some embodiments, cancer that is positive for a EGFR exon 20 mutation comprises bladder cancer. In some embodiments, cancer that is positive for a EGFR exon 20 mutation comprises head and neck cancer. In some embodiments, cancer that is positive for a EGFR exon 20 mutation comprises pharynx cancer. In some embodiments, cancer that is positive for a EGFR exon 20 mutation comprises cancer of the nose. In some embodiments, cancer that is positive for a EGFR exon 20 mutation comprises pancreatic cancer. In some embodiments, cancer that is positive for a EGFR exon 20 mutation comprises skin cancer. In some embodiments, cancer that is positive for a EGFR exon 20 mutation comprises oral cancer. In some embodiments, cancer that is positive for a EGFR exon 20 mutation comprises cancer of the tongue. In some embodiments, cancer that is positive for a EGFR exon 20 mutation comprises esophageal cancer. In some embodiments, cancer that is positive for a EGFR exon 20 mutation comprises vaginal cancer. In some embodiments, cancer that is positive for a EGFR exon 20 mutation comprises cervical cancer. In some embodiments, cancer that is positive for a EGFR exon 20 mutation comprises cancer of the spleen. In some embodiments, cancer that is positive for a EGFR exon 20 mutation comprises testicular cancer. In some embodiments, cancer that is positive for a EGFR exon 20 mutation comprises gastric cancer. In some embodiments, cancer that is positive for a EGFR exon 20 mutation comprises cancer of the thymus. In some embodiments, cancer that is positive for a EGFR exon 20 mutation comprises colon cancer. In some embodiments, cancer that is positive for a EGFR exon 20 mutation comprises thyroid cancer. In some embodiments, cancer that is positive for a EGFR exon 20 mutation comprises liver cancer. In some embodiments, cancer that is positive for a EGFR exon 20 mutation comprises hepatocellular carcinoma (HCC). In some embodiments, cancer that is positive for a EGFR exon 20 mutation comprises sporadic or hereditary papillary renal cell carcinoma (PRCC).

In some embodiments, NSCLC includes squamous cell carcinoma, adenocarcinoma, and large cell carcinoma. In some embodiments, cells of the NSCLC have an epithelial phenotype. In some embodiments, the NSCLC has acquired resistance to treatment with one or more EGFR inhibitors.

In NSCLC, specific mutations in the EGFR gene are associated with high response rates (70-80%) to EGFR tyrosine kinase inhibitors (EGFR-TKIs). A 5 amino acid deletion in exon 19 or the point mutation L858R in EGFR are associated with EGFR-TKI sensitivity (Nakata and Gotoh, Expert Opin Ther Targets 16:771-781, 2012). These mutations result in a ligand-independent activation of the EGFR kinase activity. Activating EGFR mutations occur in 10-30% of NSCLC patients and are significantly more common in East Asians, women, never smokers, and patients with adenocarcinoma histology (Janne and Johnson Clin Cancer Res 12(14 Suppl): 4416s-4420s, 2006). EGFR gene amplification is also strongly correlated with response after EGFR-TKI treatment (Cappuzzo et al., J Natl Cancer Inst 97:643-55, 2005). EGFR exon 20 insertions have been associated with EGFR TKI resistance.

Although the majority of NSCLC patients with EGFR mutations initially respond to EGFR TKI therapy, virtually all acquire resistance that prevents a durable response. 50-60% of patients acquire resistance due to a second-site point mutation in the kinase domain of EGFR (T790M). Nearly 60% of all tumors that become resistant to EGFR tyrosine kinase inhibitors increase c-Met expression, amplify the c-Met gene, or increase its only known ligand, HGF (Turke et al., Cancer Cell, 17:77-88, 2010).

In some embodiments, the subject is further administering one or more anti-cancer therapies.

In some embodiments, the one or more anti-cancer therapies comprises chemotherapy, radiation therapy, surgery, a targeted anti-cancer therapy or a kinase inhibitor, or any combination thereof.

In some embodiments, the kinase inhibitor is an inhibitor of EGFR, an inhibitor of c-Met, an inhibitor of HER2, an inhibitor of HER3, an inhibitor of HER4, an inhibitor of VEGFR or an inhibitor of AXL. In some embodiments, the kinase inhibitor is an inhibitor of EGFR. In some embodiments, the kinase inhibitor is an inhibitor of c-Met. In some embodiments, the kinase inhibitor is an inhibitor of HER2. In some embodiments, the kinase inhibitor is an inhibitor of HER3. In some embodiments, the kinase inhibitor is an inhibitor of HER4. In some embodiments, the kinase inhibitor is an inhibitor of VEGFR. In some embodiments, the kinase inhibitor is an inhibitor of or AXL.

In some embodiments, the kinase inhibitor is erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib.

In some embodiments, the kinase inhibitor is erlotinib. In some embodiments, the kinase inhibitor is gefitinib. In some embodiments, the kinase inhibitor is lapatinib. In some embodiments, the kinase inhibitor is vandetanib. In some embodiments, the kinase inhibitor is afatinib. In some embodiments, the kinase inhibitor is osimertinib. In some embodiments, the kinase inhibitor is lazertinib. In some embodiments, the kinase inhibitor is poziotinib. In some embodiments, the kinase inhibitor is criotinib. In some embodiments, the kinase inhibitor is cabozantinib. In some embodiments, the kinase inhibitor is capmatinib. In some embodiments, the kinase inhibitor is axitinib. In some embodiments, the kinase inhibitor is lenvatinib. In some embodiments, the kinase inhibitor is nintedanib. In some embodiments, the kinase inhibitor is regorafenib. In some embodiments, the kinase inhibitor is pazopanib. In some embodiments, the kinase inhibitor is sorafenib. In some embodiments, the kinase inhibitor is sunitinib.

Anti-cancer therapies that may be administered in combination with the bispecific anti-EGFR/c-Met antibody in the methods of the disclosure include any one or more of the chemotherapeutic drugs or other anti-cancer therapeutics known to those of skill in the art. Chemotherapeutic agents are chemical compounds useful in the treatment of cancer and include growth inhibitory agents or other cytotoxic agents and include alkylating agents, anti-metabolite s, anti-microtubule inhibitors, topoisomerase inhibitors, receptor tyrosine kinase inhibitors, angiogenesis inhibitors and the like. Examples of chemotherapeutic agents include alkylating agents such as thiotepa and cyclosphosphamide (CYTOXAN®); alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamine; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, carminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-FU; folic acid analogues such as denopterin, methotrexate, pteropterin, trimetrexate; purine analogues such as fludarabine, 6-mercaptopurine, thiamiprine, thioguanine; pyrimidine analogues such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elfornithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK®; razoxane; sizofiran; spirogermanium; tenuazonic acid; triaziquone; 2,2',2"-trichlorotriethylamine; urethan; vindesine; dacarbazine; mannomustine; mitobronitol; mitolactol; pipobroman; gacytosine; arabinoside ("Ara-C"); cyclophosphamide; thiotepa; members of taxoid or taxane family, such as paclitaxel (TAXOL®docetaxel (TAXOTERE®) and analogues thereof; chlorambucil; gemcitabine; 6-thioguanine; mercaptopurine; methotrexate; platinum analogues such as cisplatin and carboplatin; vinblastine; platinum; etoposide (VP-16); ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RFS 2000; difluoromethylornithine (DMFO); retinoic acid; esperamicins; capecitabine; inhibitors of receptor tyrosine kinases and/or angiogenesis, including sorafenib (NEXAVAR®), sunitinib (SUTENT®), pazopanib (VOTRIENT™), toceranib (PALLADIA™), vandetanib (ZACTIMA™), cediranib (RECENTIN®), regorafenib (BAY 73-4506), axitinib (AG013736), lestaurtinib (CEP-701), erlotinib (TARCEVA®), gefitinib (IRESSA®), afatinib (BIBW 2992), lapatinib (TYKERB®), neratinib (HKI-272), and the like, and pharmaceutically acceptable salts, acids or derivatives of any of the above. Also included in this definition are anti-hormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY 117018, onapristone, and toremifene (FARESTON®); and anti-androgens such as flutamide, nilutamide, bicalutamide, leuprolide, and goserelin; and pharmaceutically acceptable salts, acids or derivatives of any of the above. Other conventional cytotoxic chemical compounds as those disclosed in Wiemann et al., 1985, in Medical Oncology (Calabresi et aL, eds.), Chapter 10, McMillan Publishing, are also applicable to the methods of the present invention.

Administration

The bispecific anti-EGFR/c-Met antibody may be administered in a pharmaceutically acceptable carrier. "Carrier" refers to a diluent, adjuvant, excipient, or vehicle with which the antibody of the invention is administered. Such vehicles may be liquids, such as water and oils, including those of petroleum, animal, vegetable or synthetic origin, such as peanut oil, soybean oil, mineral oil, sesame oil and the like. For example, 0.4% saline and 0.3% glycine may be used to formulate the bispecific anti-EGFR/c-Met antibody. These solutions are sterile and generally free of particulate matter. They may be sterilized by conventional, well-known sterilization techniques (e.g., filtration). For parenteral administration, the carrier may comprise sterile water and other excipients may be added to increase solubility or preservation. Injectable suspensions or solutions may also be prepared utilizing aqueous carriers along with appropriate additives. Suitable vehicles and formulations, inclusive of other human proteins, e.g., human serum albumin, are described, for example, in e.g. Remington: The Science and Practice of Pharmacy, 21$^{st}$ Edition, Troy, D. B. ed., Lipincott Williams and Wilkins, Philadelphia, Pa. 2006, Part 5, Pharmaceutical Manufacturing pp 691-1092, See especially pp. 958-989.

The mode of administration may be any suitable route that delivers the bispecific anti-EGFR-c-Met antibody to the host, such as parenteral administration, e.g., intradermal, intramuscular, intraperitoneal, intravenous or subcutaneous, pulmonary, transmucosal (oral, intranasal, intravaginal, rectal), using a formulation in a tablet, capsule, solution, powder, gel, particle; and contained in a syringe, an implanted device, osmotic pump, cartridge, micropump; or other means appreciated by the skilled artisan, as well known in the art. Site specific administration may be achieved by for example intratumoral, intrarticular, intrabronchial, intraabdominal, intracapsular, intracartilaginous, intracavitary, intracelial, intracerebellar, intracerebroventricular, intracolic, intracervical, intragastric, intrahepatic, intracardial, intraosteal, intrapelvic, intrapericardiac, intraperitoneal, intrapleural, intraprostatic, intrapulmonary, intrarectal, intrarenal, intraretinal, intraspinal, intrasynovial, intrathoracic, intrauterine, intravascular, intravesical, intralesional, vaginal, rectal, buccal, sublingual, intranasal, or transdermal delivery.

In some embodiments, the bispecific anti-EGFR/c-Met antibody is administered at a dose of between about 140 mg to about 1750 mg. In some embodiments, the bispecific anti-EGFR/c-Met antibody is administered at a dose of between about 140 mg to about 1750 mg.

In some embodiments, the bispecific anti-EGFR/c-Met antibody is administered at a dose of about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 510 mg, about 520 mg, about 530 mg, about 540 mg, about 550 mg, about 560 mg, about 570 mg, about 580 mg, about 590 mg, about 600 mg, about 610 mg, about 620 mg, about 630 mg, about 640 mg, about 650 mg, about 660 mg, about 670 mg, about 680 mg, about 690 mg, about 700 mg, about 710 mg, about 720 mg, about 730 mg, about 740 mg, about 750 mg, about 760 mg, about 770 mg, about 780 mg, about 790 mg, about 800 mg, about 810 mg, about 820 mg, about 830 mg, about 840 mg, about 850 mg, about 860 mg, about 870 mg, about 880 mg, about 890 mg, about 900 mg, about 910 mg, about 920 mg, about 930 mg, about 940 mg, about 950 mg, about 960 mg, about 970 mg, about 980 mg, about 990 mg, about 1000 mg, about 1010 mg, about 1020 mg, about 1030 mg, about 1040 mg, about 1050 mg, about 1060 mg, about 1070 mg, about 1080 mg, about 1090 mg, about 1100 mg, about 1110 mg, about 1120 mg, about 1130 mg, about 1140 mg, about 1150 mg, about 1160 mg, about 1170 mg, about 1180 mg, about 1190 mg, about 1200 mg, about 1210 mg, about 1220 mg, about 1230 mg, about 1240 mg, about 1250 mg, about 1260 mg, about 1270 mg, about 1280 mg, about 1290 mg, about 1300 mg, about 1310 mg, about 1320 mg, about 1330 mg, about 1340 mg, about 1350 mg, about 1360 mg, about 1370 mg, about 1380 mg, about 1390 mg, about 1400 mg, about 1410 mg, about 1420 mg, about 1430 mg, about 1440 mg, about 1450 mg, about 1460 mg, about 1470 mg, about 1480 mg, about 1490 mg, about 1500 mg, about 1510 mg, about 1520 mg, about 1530 mg, about 1540 mg, about 1550 mg, about 1560 mg, about 1570 mg, about 1580 mg, about 1590 mg, about 1600 mg, about 1610 mg, 1620 mg, about 1630 mg, about 1640 mg, about 1650 mg, about 1660 mg, about 1670 mg, about 1680 mg, about 1690 mg, about 1700 mg, about 1710 mg, about 1720 mg, about 1730 mg, about 1740 mg, about 1750 mg, about 1760 mg, about 1770 mg, about 1780 mg, about 1790 mg, about 1800 mg, about 1810 mg, about 1820 mg, about 1830 mg, about 1840 mg, about 1850 mg, about 1860 mg, about 1870 mg, about 1880 mg, 1890 mg, about 1900 mg, about 1910 mg, about 1920 mg, about 1930 mg, about 1940 mg, about 1950 mg, about 1960 mg, about 1970 mg, about 1980 mg, about 1990 mg or about 2000 mg.

In some embodiments, the bispecific anti-EGFR/c-Met antibody is administered at a dose of about 350 mg, about 700 mg, about 1050 mg or about 1400 mg. In some embodiments, the bispecific anti-EGFR/c-Met antibody is administered at a dose of about 350 mg. In some embodiments, the bispecific anti-EGFR/c-Met antibody is administered at a dose of about 700 mg. In some embodiments, the bispecific anti-EGFR/c-Met antibody is administered at a dose of about 750 mg. In some embodiments, the bispecific anti-EGFR/c-Met antibody is administered at a dose of about 800 mg. In some embodiments, the bispecific anti-EGFR/c-Met antibody is administered at a dose of about 850 mg. In some embodiments, the bispecific anti-EGFR/c-Met antibody is administered at a dose of about 900 mg. In some embodiments, the bispecific anti-EGFR/c-Met antibody is administered at a dose of about 950 mg. In some embodiments, the bispecific anti-EGFR/c-Met antibody is administered at a dose of about 1000 mg. In some embodiments, the bispecific anti-EGFR/c-Met antibody is administered at a dose of about 1050 mg. In some embodiments, the bispecific anti-EGFR/c-Met antibody is administered at a dose of about 1100 mg. In some embodiments, the bispecific anti-EGFR/c-Met antibody is administered at a dose of about 1150 mg. In some embodiments, the bispecific anti-EGFR/c-Met antibody is administered at a dose of about 1200 mg. In some embodiments, the bispecific anti-EGFR/c-Met antibody is administered at a dose of about 1250 mg. In some embodiments, the bispecific anti-EGFR/c-Met antibody is administered at a dose of about 1300 mg. In some embodiments, the bispecific anti-EGFR/c-Met antibody is administered at a dose of about 1350 mg. In some embodiments, the bispecific anti-EGFR/c-Met antibody is administered at a dose of about 1400 mg.

In some embodiments, the bispecific anti-EGFR/c-Met antibody is administered once a week. In some embodiments, the bispecific anti-EGFR/c-Met antibody is administered about 1050 mg once a week. In some embodiments, the bispecific anti-EGFR/c-Met antibody is administered about 1400 mg once a week.

In some embodiments, the bispecific anti-EGFR/c-Met antibody is administered once in two weeks. In some embodiments, the bispecific anti-EGFR/c-Met antibody is administered about 1050 mg once in two weeks. In some embodiments, the bispecific anti-EGFR/c-Met antibody is administered about 1400 mg once in two weeks.

In some embodiments, the bispecific anti-EGFR/c-Met antibody is administered twice a week. In some embodiments, the bispecific anti-EGFR/c-Met antibody is administered once a week. In some embodiments, the bispecific anti-EGFR/c-Met antibody is administered once in two weeks. In some embodiments, the bispecific anti-EGFR/c-Met antibody is administered once in three weeks. In some embodiments, the bispecific anti-EGFR/c-Met antibody is administered once in four weeks.

For combination therapies, the one or more anti-cancer agents may be administered using recommended doses and dosages of the anti-cancer agent.

Generation of Bispecific Anti-EGFR/c-Met Antibodies Used in the Methods of the Disclosure An exemplary bispecific anti-EGFR/c-Met antibody that can be used in the methods of the disclosures is amivantamab. Amivantamab is characterized by following amino acid sequences:

```
EGFR binding arm
>SEQ ID NO: 1 (HCDR1, EGFR binding arm)
TYGMH

>SEQ ID NO: 2 (HCDR2, EGFR binding arm)
VIWDDGSYKYYGDSVKG

>SEQ ID NO: 3 (HCDR3, EGFR binding arm)
DGITMVRGVMKDYFDY

>SEQ ID NO: 4 (LCDR1, EGFR binding arm)
RASQDISSALV

>SEQ ID NO: 5 (LCDR2, EGFR binding arm)
DASSLES

>SEQ ID NO: 6 (LCDR3, EGFR binding arm)
QQFNSYPLT

>SEQ ID NO: 7 (HCDR1, c-Met binding arm)
SYGIS

>SEQ ID NO: 8 (HCDR2, c-Met binding arm)
WISAYNGYTNYAQKLQG

>SEQ ID NO: 9 (HCDR3, c-Met binding arm)
DLRGTNYFDY

>SEQ ID NO: 10 (LCDR1, c-Met binding arm)
RASQGISNWLA

>SEQ ID NO: 11 (LCDR2, c-Met binding arm)
AASSLLS

>SEQ ID NO: 12 (LCDR3, c-Met binding arm)
QQANSFPIT
```

-continued

```
>SEQ ID NO: 13 (VH, EGFR binding arm)
QVQLVESGGGVVQPGRSLRLSCAASGFTFSTYGMHWVRQAPGKGLEWVA
VIWDDGSYKYYGDSVKGRFTISRDNSKNTLYLQMNSLRAEDTAVYYCAR
DGITMVRGVMKDYFDYWGQGTLVTVSS >SEQ ID NO: 14 (VL, EGFR binding arm)
AIQLTQSPSSLSASVGDRVTITCRASQDISSALVWYQQKPGKAPKLLIY
DASSLESGVPSRFSGSESGTDFTLTISSLQPEDFATYYCQQFNSYPLTF
GGGTKVEIK >SEQ ID NO: 15 (VH, c-Met binding arm)
QVQLVQSGAEVKKPGASVKVSCETSGYTFTSYGISWVRQAPGHGLEWMG
WISAYNGYTNYAQKLQGRVTMTTDTSTSTAYMELRSLRSDDTAVYYCAR
DLRGTNYFDYWGQGTLVTVSS >SEQ ID NO: 16 (VL, c-Met binding arm)
DIQMTQSPSSVSASVGDRVTITCRASQGISNWLAWFQHKPGKAPKLLIY
AASSLLSGVPSRFSGSGSGTDFTLTISSLQPEDFATYYCQQANSFPITF
GQGTRLEIK >SEQ ID NO: 17 HC1
QVQLVESGGGVVQPGRSLRLSCAASGFTFSTYGMHWVRQAPGKGLEWVA
VIWDDGSYKYYGDSVKGRFTISRDNSKNTLYLQMNSLRAEDTAVYYCAR
DGITMVRGVMKDYFDYWGQGTLVTVSSASTKGPSVFPLAPSSKSTSGGT
AALGCLVKDYFPEPVTVSWNSGALTSGVHTFPAVLQSSGLYSLSSVVTV
PSSSLGTQTYICNVNHKPSNTKVDKRVEPKSCDKTHTCPPCPAPELLGG
PSVFLFPPKPKDTLMISRTPEVTCVVVDVSHEDPEVKFNWYVDGVEVHN
AKTKPREEQYNSTYRVVSVLTVLHQDWLNGKEYKCKVSNKALPAPIEKT
ISKAKGQPREPQVYTLPPSREEMTKNQVSLTCLVKGFYPSDIAVEWESN
GQPENNYKTTPPVLDSDGSFLLYSKLTVDKSRWQQGNVFSCSVMHEALH
NHYTQKSLSLSPGK >SEQ ID NO: 18 LC1
AIQLTQSPSSLSASVGDRVTITCRASQDISSALVWYQQKPGKAPKLLIY
DASSLESGVPSRFSGSESGTDFTLTISSLQPEDFATYYCQQFNSYPLTF
GGGTKVEIKRTVAAPSVFIFPPSDEQLKSGTASVVCLLNNFYPREAKVQ
WKVDNALQSGNSQESVTEQDSKDSTYSLSSTLTLSKADYEKHKVYACEV
THQGLSSPVTKSFNRGEC >SEQ ID NO: 19 HC2
QVQLVQSGAEVKKPGASVKVSCETSGYTFTSYGISWVRQAPGHGLEWMG
WISAYNGYTNYAQKLQGRVTMTTDTSTSTAYMELRSLRSDDTAVYYCAR
DLRGTNYFDYWGQGTLVTVSSASTKGPSVFPLAPSSKSTSGGTAALGCL
VKDYFPEPVTVSWNSGALTSGVHTFPAVLQSSGLYSLSSVVTVPSSSLG
TQTYICNVNHKPSNTKVDKRVEPKSCDKTHTCPPCPAPELLGGPSVFLF
PPKPKDTLMISRTPEVTCVVVDVSHEDPEVKFNWYVDGVEVHNAKTKPR
EEQYNSTYRVVSVLTVLHQDWLNGKEYKCKVSNKALPAPIEKTISKAKG
QPREPQVYTLPPSREEMTKNQVSLTCLVKGFYPSDIAVEWESNGQPENN
YKTTPPVLDSDGSFFLYSRLTVDKSRWQQGNVFSCSVMHEALHNHYTQK
SLSLSPGK >SEQ ID NO: 20 LC2
DIQMTQSPSSVSASVGDRVTITCRASQGISNWLAWFQHKPGKAPKLLIY
AASSLLSGVPSRFSGSGSGTDFTLTISSLQPEDFATYYCQQANSFPITF
GQGTRLEIKRTVAAPSVFIFPPSDEQLKSGTASVVCLLNNFYPREAKVQ
WKVDNALQSGNSQESVTEQDSKDSTYSLSSTLTLSKADYEKHKVYACEV
THQGLSSPVTKSFNRGEC
```

Other bispecific anti-EGFR/c-Met antibodies publicly available may also be used in the methods of the disclosure as long as they demonstrate similar characteristics when compared to amivantamab as described in U.S. Pat. No. 9,593,164. Bispecific anti-EGFR/c-Met antibodies that may be used in the methods of the disclosure may also be generated by combining EGFR binding VH/VL domains and c-Met binding VH/VL domains that are publicly available and testing the resulting bispecific antibodies for their characteristics as described in U.S. Pat. No. 9,593,164.

Bispecific anti-EGFR/c-Met antibodies used in the methods of the disclosure may be generated for example using Fab arm exchange (or half molecule exchange) between two monospecific bivalent antibodies by introducing substitutions at the heavy chain CH3 interface in each half molecule to favor heterodimer formation of two antibody half molecules having distinct specificity either in vitro in cell-free environment or using co-expression. The Fab arm exchange reaction is the result of a disulfide-bond isomerization reaction and dissociation-association of CH3 domains. The heavy chain disulfide bonds in the hinge regions of the parental monospecific antibodies are reduced. The resulting free cysteines of one of the parental monospecific antibodies form an inter heavy-chain disulfide bond with cysteine residues of a second parental monospecific antibody molecule and simultaneously CH3 domains of the parental antibodies release and reform by dissociation-association. The CH3 domains of the Fab arms may be engineered to favor heterodimerization over homodimerization. The resulting product is a bispecific antibody having two Fab arms or half molecules which each bind a distinct epitope, i.e. an epitope on EGFR and an epitope on c-Met. For example, the bispecific antibodies of the invention may be generated using the technology described in Int. Pat. Publ. No. WO2011/131746. Mutations F405L in one heavy chain and K409R in the other heavy chain may be used in case of IgG1 antibodies. For IgG2 antibodies, a wild-type IgG2 and a IgG2 antibody with F405L and R409K substitutions may be used. For IgG4 antibodies, a wild-type IgG4 and a IgG4 antibody with F405L and R409K substitutions may be used. To generate bispecific antibodies, first monospecific bivalent antibody and the second monospecific bivalent antibody are engineered to have the aforementioned mutation in the Fc region, the antibodies are incubated together under reducing conditions sufficient to allow the cysteines in the hinge region to undergo disulfide bond isomerization; thereby generating the bispecific antibody by Fab arm exchange. The incubation conditions may optimally be restored to non-reducing. Exemplary reducing agents that may be used are 2-mercaptoethylamine (2-MEA), dithiothreitol (DTT), dithioerythritol (DTE), glutathione, tris(2-carboxyethyl)phosphine (TCEP), L-cysteine and beta-mercaptoethanol. For example, incubation for at least 90 min at a temperature of at least 20° C. in the presence of at least 25 mM 2-MEA or in the presence of at least 0.5 mM dithiothreitol at a pH of from 5-8, for example at pH of 7.0 or at pH of 7.4 may be used.

Bispecific anti-EGFR/c-Met antibodies used in the methods of the disclosure may also be generated using designs such as the Knob-in-Hole (Genentech), CrossMAbs (Roche) and the electrostatically-matched (Chugai, Amgen, NovoNordisk, Oncomed), the LUZ-Y (Genentech), the Strand Exchange Engineered Domain body (SEEDbody) (EMD Serono), and the Biclonic (Merus).

In the "knob-in-hole" strategy (see, e.g., Intl. Publ. No. WO 2006/028936) select amino acids forming the interface of the CH3 domains in human IgG can be mutated at positions affecting CH3 domain interactions to promote heterodimer formation. An amino acid with a small side chain (hole) is introduced into a heavy chain of an antibody specifically binding a first antigen and an amino acid with a large side chain (knob) is introduced into a heavy chain of an antibody specifically binding a second antigen. After co-expression of the two antibodies, a heterodimer is formed as a result of the preferential interaction of the heavy chain with a "hole" with the heavy chain with a "knob". Exemplary CH3 substitution pairs forming a knob and a hole are (expressed as modified position in the first CH3 domain of the first heavy chain/modified position in the second CH3 domain of the second heavy chain): T366Y/F405A, T366W/F405W, F405W/Y407A, T394W/Y407T, T394S/Y407A, T366W/T394S, F405W/T394S and T366W/T366S_L368A_Y407V.

CrossMAb technology, in addition to utilizing the "knob-in-hole" strategy to promoter Fab arm exchange utilizes CH1/CL domain swaps in one half arm to ensure correct light chain pairing of the resulting bispecific antibody (see e.g. U.S. Pat. No. 8,242,247).

Other cross-over strategies may be used to generate full length bispecific antibodies of the invention by exchanging variable or constant, or both domains between the heavy chain and the light chain or within the heavy chain in the bispecific antibodies, either in one or both arms. These exchanges include for example VH-CH1 with VL-CL, VH with VL, CH3 with CL and CH3 with CH1 as described in Int. Patent Publ. Nos. WO2009/080254, WO2009/080251, WO2009/018386 and WO2009/080252.

Other strategies such as promoting heavy chain heterodimerization using electrostatic interactions by substituting positively charged residues at one CH3 surface and negatively charged residues at a second CH3 surface may be used, as described in US Patent Publ. No. US2010/0015133; US Patent Publ. No. US2009/0182127; US Patent Publ. No. US2010/028637 or US Patent Publ. No. US2011/0123532. In other strategies, heterodimerization may be promoted by following substitutions (expressed as modified positions in the first CH3 domain of the first heavy chain/modified position in the second CH3 domain of the second heavy chain): L351Y_F405A_Y407V/T394W, T366I_K392M_T394W/F405A_Y407V, T366L_K392M_T394W/F405A_Y407V, L351Y_Y407A/T366A_K409F, L351Y_Y407A/T366V_K409F, Y407A/T366A_K409F, or T350V_L351Y_F405A_Y407V/T350V_T366L_K392L_T394W as described in U.S. Patent Publ. No. US2012/0149876 or U.S. Patent Publ. No. US2013/0195849.

SEEDbody technology may be utilized to generate bispecific antibodies of the invention. SEEDbodies have, in their constant domains, select IgG residues substituted with IgA residues to promote heterodimerization as described in U.S. Patent No. US20070287170.

Mutations are typically made at the DNA level to a molecule such as the constant domain of the antibody using standard methods.

ILLUSTRATIVE EMBODIMENTS

1) A method of treating a subject having cancer that is positive for an EGFR exon 20 mutation, comprising administering a therapeutically effective amount of an isolated bispecific anti-epidermal growth factor receptor (EGFR)/hepatocyte growth factor receptor (c-Met) antibody to the subject having cancer that is positive for the EGFR exon 20 mutation.
2) A method of treating a subject having cancer that is positive for an EGFR S768I, L861Q and/or G719X mutation, comprising administering a therapeutically effective amount of an isolated bispecific anti-epidermal growth factor receptor (EGFR)/hepatocyte growth factor receptor (c-Met) antibody to the subject having cancer that is positive for the mutation.
3) A method of treating a subject having cancer with a bispecific anti-EGFR/c-Met antibody, comprising:
   a) providing a biological sample from the subject;
   b) determining presence or absence of an EGFR exon 20 mutation in the sample; and
   c) administering or providing for administration the bispecific anti-EGFR/c-Met antibody to the subject determined to have the EGFR exon 20 mutation.
4) A method of treating a subject having cancer with a bispecific anti-EGFR/c-Met antibody, comprising:
   a) providing a biological sample from the subject;
   b) determining presence or absence of an EGFR S768I, L861Q and/or G719X mutation in the sample; and
   c) administering or providing for administration the bispecific anti-EGFR/c-Met antibody to the subject determined to have the mutation.
5) The method of any one of embodiments 1-4, wherein the bispecific anti-EGFR/c-Met antibody comprises a first domain that specifically binds EGFR and a second domain that specifically binds c-Met, wherein the first domain comprises a heavy chain complementarity determining region 1 (HCDR1) of SEQ ID NO: 1, a HCDR2 of SEQ ID NO: 2, a HCDR3 of SEQ ID NO: 3, a light chain complementarity determining region 1 (LCDR1) of SEQ ID NO: 4, a LCDR2 of SEQ ID NO: 5 and a LCDR3 of SEQ ID NO: 6, and wherein the second domain that binds c-Met comprises the HCDR1 of SEQ ID NO: 7, the HCDR2 of SEQ ID NO: 8, the HCDR3 of SEQ ID NO: 9, the LCDR1 of SEQ ID NO: 10, the LCDR2 of SEQ ID NO: 11 and the LCDR3 of SEQ ID NO: 12.
6) The method of embodiment 5, wherein the first domain that specifically binds EGFR comprises a heavy chain variable region (VH) of SEQ ID NO: 13 and a light chain variable region (VL) of SEQ ID NO: 14, and the second domain that specifically binds c-Met comprises the VH of SEQ ID NO: 15 and the VL of SEQ ID NO: 16.
7) The method of embodiment 1, wherein the bispecific anti-EGFR/c-Met antibody is an IgG1 isotype.
8) The method of embodiment 1, wherein the bispecific anti-EGFR/c-Met antibody comprises a first heavy chain (HC1) of SEQ ID NO: 17, a first light chain (LC1) of SEQ ID NO: 18, a second heavy chain (HC2) of SEQ ID NO: 19 and a second light chain (LC2) of SEQ ID NO: 20.
9) The method of any one of embodiment 1, wherein the bispecific anti-EGFR/c-Met antibody comprises a biantennary glycan structure with a fucose content of about between 1% to about 15%.
10) The method of any one of embodiments 1-4, wherein the subject is relapsed or resistant to treatment with one or more prior anti-cancer therapies.
11) The method of embodiment 10, wherein the one or more prior anti-cancer therapies comprises one or more chemotherapeutic agents, checkpoint inhibitors, targeted anti-cancer therapies or kinase inhibitors, or any combination thereof
12) The method of embodiment 10, wherein the one or more prior anti-cancer therapies comprises carboplatin, paclitaxel, gemcitabine, cisplatin, vinorelbine, docetaxel, palbociclib, crizotinib, PD-(L)1 axis inhibitor, an inhibitor of EGFR, an inhibitor of c-Met, an inhibitor of HER2, an inhibitor of HER3, an inhibitor of HER4, an inhibitor of VEGFR, an inhibitor of AXL, erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib, or any combination thereof
13) The method of any one of embodiments 1-4, wherein the subject is treatment naïve.
14) The method of any one of embodiments 1-4, wherein the cancer is lung cancer, gastric cancer, colorectal cancer, brain cancer, cancer derived from epithelial cells, breast cancer, ovarian cancer, colorectal cancer, anal cancer, prostate cancer, kidney cancer, bladder cancer, head and neck cancer, pharynx cancer, cancer of the nose, pancreatic cancer, skin cancer, oral cancer, cancer of the tongue, esophageal cancer, vaginal cancer, cervical cancer, cancer of the spleen, testicular cancer, gastric cancer, cancer of the thymus, colon cancer, thyroid cancer, liver cancer, hepatocellular carcinoma (HCC) or sporadic or hereditary papillary renal cell carcinoma (PRCC), or any combination thereof 15) The method of embodiment 14, wherein lung cancer is non-small cell lung cancer (NSCLC), small cell lung cancer (SCLC) or lung adenocarcinoma, pulmonary sarcomatoid carcinoma or any combination thereof 16) The method of any one of embodiments 1-4, comprising further administering one or more anti-cancer therapies to the subject.

17) The method of embodiment 16, wherein the one or more anti-cancer therapies comprises chemotherapy, radiation therapy, surgery, a targeted anti-cancer therapy, a kinase inhibitor, or any combination thereof 18) The method of embodiment 17, wherein the kinase inhibitor is an inhibitor of EGFR, an inhibitor of c-Met, an inhibitor of HER2, an inhibitor of HER3, an inhibitor of HER4, an inhibitor of VEGFR or an inhibitor of AXL.

19) The method of embodiment 18, wherein the kinase inhibitor is erlotinib, gefitinib, lapatinib, vandetanib, afatinib, osimertinib, lazertinib, poziotinib, criotinib, cabozantinib, capmatinib, axitinib, lenvatinib, nintedanib, regorafenib, pazopanib, sorafenib or sunitinib.

20) The method of any one of embodiments 1 or 3, wherein the EGFR exon 20 mutation is a de novo mutation.

21) The method of any one of embodiments 1 or 3, wherein the EGFR exon 20 mutation is an acquired mutation.

22) The method of any one of embodiments 1-4, wherein the bispecific anti-EGFR/c-Met antibody is administered at a dose of between about 140 mg to about 1750 mg.

23) The method of any one of embodiments 1-4, wherein the bispecific anti-EGFR/c-Met antibody is administered at a dose of about 700 mg, about 750 mg, about 800 mg, about 850 mg, 900 mg, 950 mg, 1000 mg, 1050 mg, 1100 mg, 1150 mg, 1200 mg, 1250 mg, 1300 mg, 1350 mg or 1400 mg.

24) The method of any one of embodiments 1-4, wherein the bispecific anti-EGFR/c-Met antibody is administered at a dose of 1050 mg.

25) The method of any one of embodiments 1-4, wherein the bispecific anti-EGFR/c-Met antibody is administered at a dose of 1400 mg.

26) The method of any one of embodiments 1-4, wherein the bispecific anti-EGFR/c-Met antibody is administered twice a week, once a week, once in two weeks, once in three weeks or once in four weeks.

The present invention will now be described with reference to the following specific, non-limiting examples.

Example 1. Materials and Methods

Ba/F3 Cell Lines and Drug Compounds

All mutant Ba/F3 cell lines were purchased from the German Collection of Microorganisms and Cell Cultures and were obtained from the Dana-Farber Cancer Institute, Harvard University, USA. All cells were maintained in RPMI 1640 medium supplemented with 10% fetal bovine serum (FBS) and puromycin in a humidified incubator with 5% $CO_2$. Amivantamab and IgG1 controls were provided by Janssen. Gefitinib, osimertinib, cetuximab, and poziotinib were purchased from SelleckChem (Houston, Tex., USA).

Antibodies

Primary antibodies specific for p-EGFR (2234), EGFR (4267), p-cMet (3077), cMet (8198), p-ERK (4370), ERK (9107), p-AKT (9271), AKT (9272), p-S6 (4858), S6 (2217), p27 (2252), cleaved PARP (5625S), cleaved caspase 3 (9661), and BIM (2933) were purchased from Cell Signaling Technologies; p21(sc-817) and p53 (sc-126) were purchased from Santa Cruz Biotechnology, Inc., GAPDH (PAB13195) purchased from Abnova (Taipei, Taiwan). For the IHC assay, mF4/80 (#70076) and mNKp46 (AF2225) were purchased from Cell Signaling Technologies and R&D systems, respectively.

Patient-Derived Cells

YU-1163 (S768_D770dup) cell lines were derived from malignant effusions from patients with NSCLC and cultured on collagen-coated plates in ACL-4 medium supplemented with 5% FBS. The cells maintained the driver oncogenes that were observed in the patients. Cells were enriched in an epithelial cell adhesion molecule (EpCAM)-positive cell population with a purity of over 95% before they were subjected to further assays. DFCI-58 (H773_V774insNPH) and DFCI-127 (P772_H773insPNP) cell lines were obtained from the Dana-Farber Cancer Institute, Harvard University, USA, and were cultured in ACL-4 medium and RPMI medium with 10% FBS, respectively. All patient samples were collected after written informed consent from the patients was obtained. The study protocols were approved by the respective institutional review boards.

Patient-Derived Organoid Culture

Patient-derived organoids (YUO-029 and YUO-036) were established as previously described (54). Briefly, malignant effusions from two patients with NSCLC were collected, centrifuged, and the cell pellets were mixed with growth-factor reduced Matrigel (Corning) and seeded into 48-well plates. Solidified gels were overlaid with advanced DMEM/F12 (Invitrogen) containing 1× Glutamax (Invitrogen), 10 mM HEPES (Invitrogen), 1× antibiotic-antimycotic (Invitrogen), 1× B-27 (Invitrogen), 20% R-spondin conditioned medium, 5 mM nicotinamide (Sigma), 1.25 mM N-acetylcysteine (Sigma), 500 nM SB-202190 (Sigma), 500 nM A83-01 (Tocris), 100 ng/mL mouse noggin (Peprotech), 100 ng/mL human FGF10 (Peprotech), 25 ng/mL human FGF7 (Peprotech), 50 µg/mL primocin (Invivogen), and 10 µM Y-27632 (Enzo). R-spondin-conditioned medium was produced from HA-R-SpondinI-Fc 293T cells (Amsbio, Abingdon, United Kingdom). For passaging, organoids were collected, mechanically sheared with a 25-gauge needle, and washed with cold PBS before the organoid pellets were resuspended in the Matrigel and seeded into 24-well plates at ratios of 1:2 to 1:4. The culture medium was replenished at least twice a week. Cell viability test were performed as previously described (55). Briefly, organoids were trypsinized into single cells and cultured for 5 to 10 days. Then, the organoids were collected, resuspended in the medium containing 5% matrigel, and plated in a 96-well plate (Corning) at a concentration of 2,000 organoids/µL. The medium with the IgG1 control or Amivantamab at diverse concentrations were added and incubated for 72 h. Cell viability was measured using CellTiter-Glo 3D culture reagent (Promega) on a microplate luminometer according to the manufacturer's instructions.

Patient-Derived Xenograft Models

PDXs were created using 6-8-week old female severe combined immunodeficient (NOG) and nude (nu/nu) mice obtained from OrientBio (Seoul, Korea). All methods complied with the guidelines of our Institutional Animal Research Committee (Yonsei University College of Medicine) and were approved by the Association for Assessment and Accreditation of Laboratory Animal Care (AAALAC). After removal of the necrotic and supporting tissues from core biopsy specimens, small specimens of the tumor tissue (3 mm×3 mm×3 mm) from each patient were implanted subcutaneously in 1-2 mice. After the tumor reached 1.5 cm in diameter, it was excised, dissected into small specimens (3 mm×3 mm×3 mm), and re-implanted into nude mice.

In Vivo Xenograft Studies

Female athymic BALB-c/nu mice were obtained from Orient Bio at 5-6 weeks of age. All mice were handled in accordance with the Animal Research Committee's Guidelines at Yonsei University College of Medicine, and all facilities were approved by AAALAC. Ba/F3 cells and PDCs ($1 \times 10^7$ cells) were injected subcutaneously into the NOG and BALB-c/nu mice, respectively, and growth was measured twice weekly; after establishment of palpable lesions, mice were assigned to testing. Once the tumor volume reached approximately 150-200 mm$^3$, mice were randomly allocated into groups of five animals to receive either vehicle, IgG1 control, or Amivantamab. The tumor size was measured every 2 days using calipers. The average tumor volume in each group was expressed in mm$^3$ and calculated according to the equation for a prolate spheroid: tumor volume=0.523×(large diameter)×(small diameter)$^2$.

Anti-Proliferation Assay

Ba/F3 cells or PDCs expressing EGFR Exon20ins mutations were seeded onto 96-well plates in 100 μL. After treatment with IgG1 control, amivantamab, gefitinib, or osimertinib for 72 hours, cell viability was measured by quantifying the total amount of ATP using the CellTiter-Glo® 2.0 assay kit (Promega) according to the manufacturer's instructions.

Colony Formation Assay

Cells were seeded onto 6-well culture plates and incubated for 12 days at 37° C. with amivantamab (0, 0.1, or 1 mg/mL). Cells were washed with phosphate-buffered saline (PBS), fixed, and stained with 4% paraformaldehyde in 5% crystal violet for 10 mins. Colonies were eluted with 1% sodium dodecyl sulfate, and the optical density value was determined using ELISA at 470 nm.

Antibody-Dependent Cellular Cytotoxicity Assays

The ADCC assay was conducted using the Lactase Dehydrogenase (LDH) Cytotoxicity Detection Kit (Roche) in accordance with manufacturer's instructions Human PBMC obtained from healthy volunteers were used as the effector cells. ADCC was conducted using an effector: target (E:T) cell ratio ranging from 50:1 to 5:1 and incubated for 4 to 24 hours at 37° C. in 5% $CO_2$. Amivantamab concentrations of 100 μg/mL to 0.01 μg/mL were tested. The lactate dehydrogenase activity of the cell culture supernatants was measured, and the percentage cytotoxicity was calculated as described in the manufacturer's protocol.

Immunofluorescence Analysis

PDCs were seeded on 0.01% poly-L-lysine (Sigma-Aldrich) coated coverslips. The following day, cells were treated with IgG1 control or Amivantamab at 0.1 mg/mL. After 72 hours, the coverslips were fixed in 4% formaldehyde for 15 minutes, permeabilized with 0.5% Triton X-100 for 5 minutes and incubated with primary antibody for 1 hour at room temperature. The primary antibodies used in the study were rabbit monoclonal anti-EGFR and anti-cMet (Santa Cruz Biotechnology) and ab992 (Millipore) at a dilution of 1:100. The coverslips were rinsed twice with PBS, followed by incubation with the appropriate fluorophore-conjugated secondary antibody (Invitrogen) for 1 hour at room temperature. The cells were counterstained with 4',6-diamidino-2-phenylindole (DAPI; 300 nmol/L; Invitrogen), and the coverslips were mounted on slides using Faramount aqueous mounting medium (DAKO).

Immunohistochemistry

Immunohistochemistry was performed using the automated staining system (BOND Rx, Leica Biosystems). Briefly, 4-mm paraffin-embedded tumor sections were deparaffinized and rehydrated. Slides then underwent heat-induced epitope retrieval with citrate buffer at 100° C. for 20 min. Antibodies were used at 1:100 dilution and hematoxylin solution was used for counterstaining Stained slides were visualized with a Vectra Polaris and the Phenochart program.

In Vivo Pharmacodynamic Study

Mice bearing tumor tissues were treated with vehicle, IgG1 control, or Amivantamab (10 or 30 mg/kg) twice per week intraperitoneally (i.p), or cetuximab (10 mg/kg), poziotinib (1 mg/kg) once daily. The tumor samples were collected 48 hours after 15 days of treatment, and EGFR and cMet downstream signaling was evaluated by immunoblotting.

Statistical Analysis

Data were collected from three independent experiments and presented either descriptively or analyzed by one-way ANOVA, followed by the Dunnett's test or Student's t-test. Dose-response curves were prepared using the GraphPad Prism (Ver. 5, GraphPad Software Inc.).

Figure 1B:
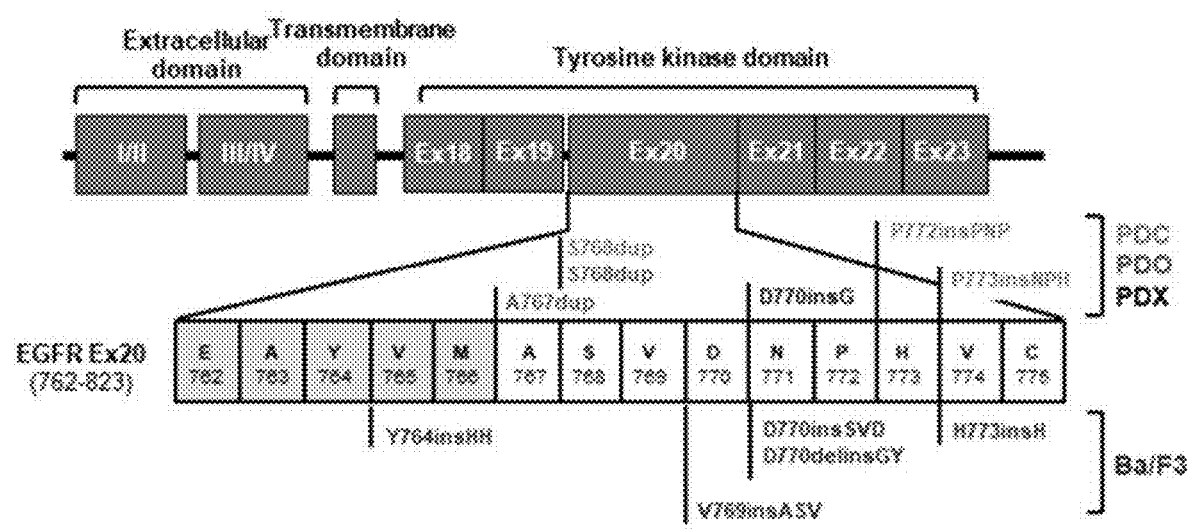
Figure 1C:
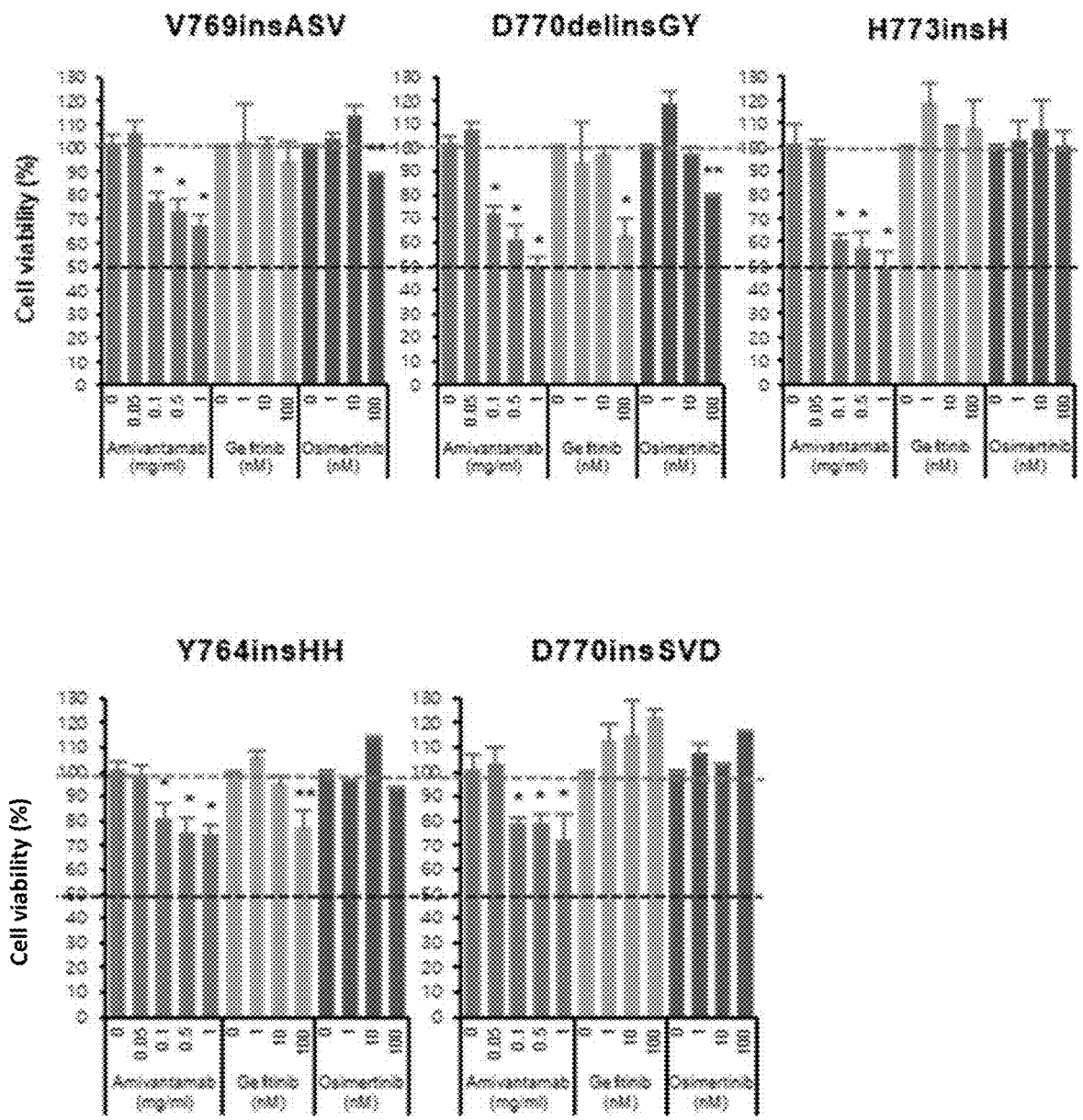
Figure 1D:
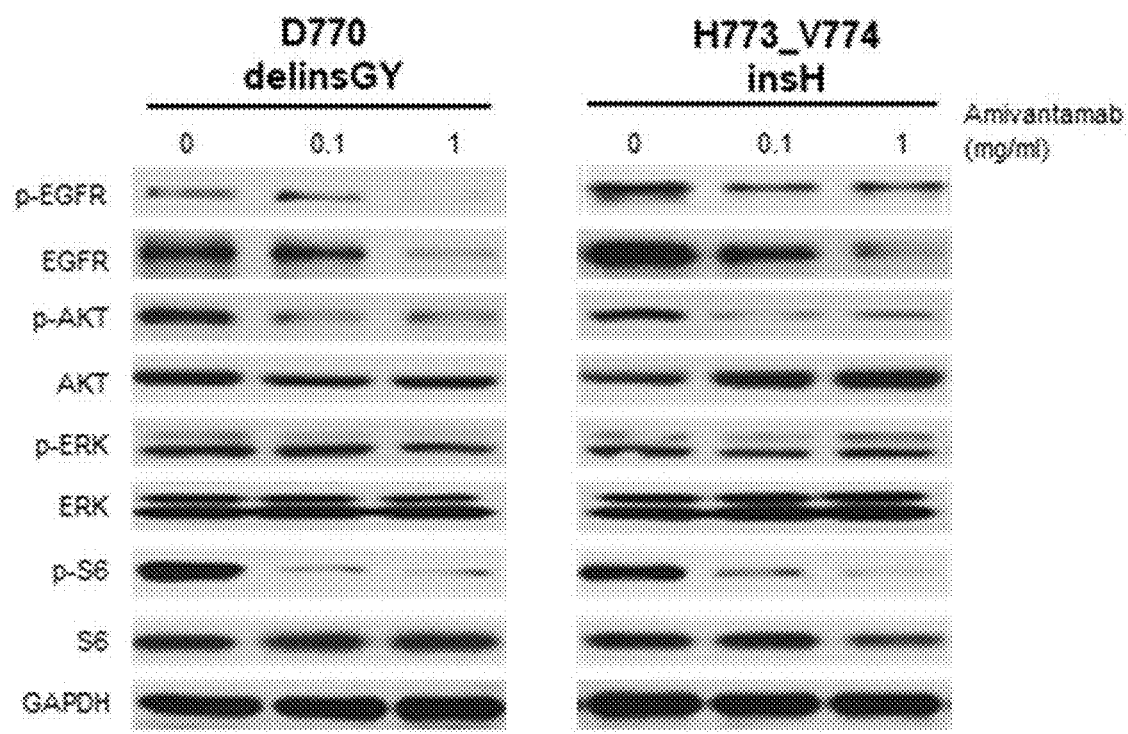

Example 2. Amivantamab Inhibits Proliferation of Ba/F3 Cells Harboring Diverse EGFR Exon20ins Mutations In order to demonstrate the antitumor activity of amivantamab in the context of Exon20ins, multiple Exon20ins were stably expressed in Ba/F3 cells. Five distinct Exon20ins were introduced (FIG. 1B), all of which have been observed in NSCLC patients (V769_D770insASV, D770delinsGY, H773_V774insH, Y764_V765insHH and D770_N771insSVD) (20,21). In Ba/F3 cells treated with amivantamab ranging from 0.05 to 1 mg/mL, a significant and dose-dependent decrease in Ba/F3 cell viability ($P<0.0001$) was observed in all five EGFR Exon20ins mutations (FIG. 1C). In contrast, treatment with the first and third-generation irreversible EGFR-TKI, gefitinib and osimertinib, respectively, showed limited antiproliferative activity compared to amivantamab (FIG. 1C), confirming the well-known resistance of Exon20ins to EGFR-TKIs. No effect on cell viability was observed when IgG1 control antibodies were used in the same Ba/F3 cell lines (data not shown). In tumor models driven by TKI-sensitive EGFR mutations such as L858R or Exon 19 deletions, amivantamab has several proposed mechanisms of action (MOAs) including blocking ligand binding, receptor downmodulation, downstream signaling inhibition and triggering immune-directed antitumor activity (22). To determine if these MOAs are also observed in the context of Exon20ins and contribute to the observed anti-proliferative activity in FIG. 1C, immunoblot analysis was performed in Ba/F3 cells overexpressing the D770delinsGY and H773_V774insH EGFR Exon20ins mutations. The total EGFR levels were reduced following treatment with amivantamab, compared to those of untreated cells (FIG. 1D) or cells treated with the IgG1 control antibody (data not shown). Consistent with the reduction in EGFR expression levels, the EGFR downstream signaling pathways phospho-EGFR (p-EGFR), phospho-AKT (p-AKT), phosho-ERK (p-ERK), and phospho-S6

Figure 1E:
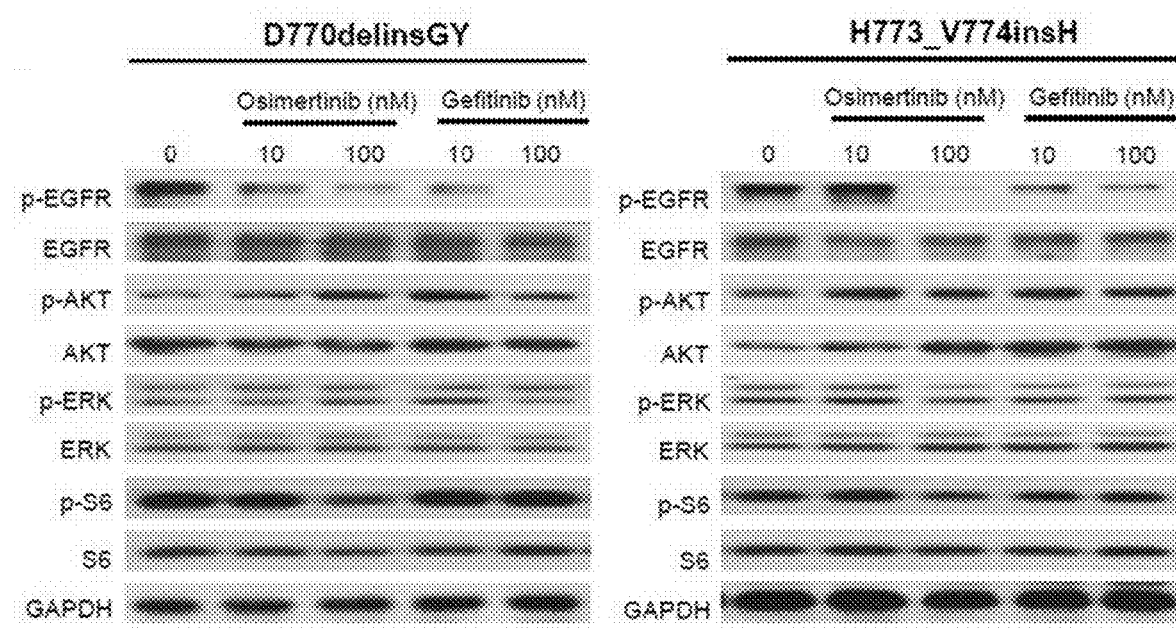
Figure 1F:
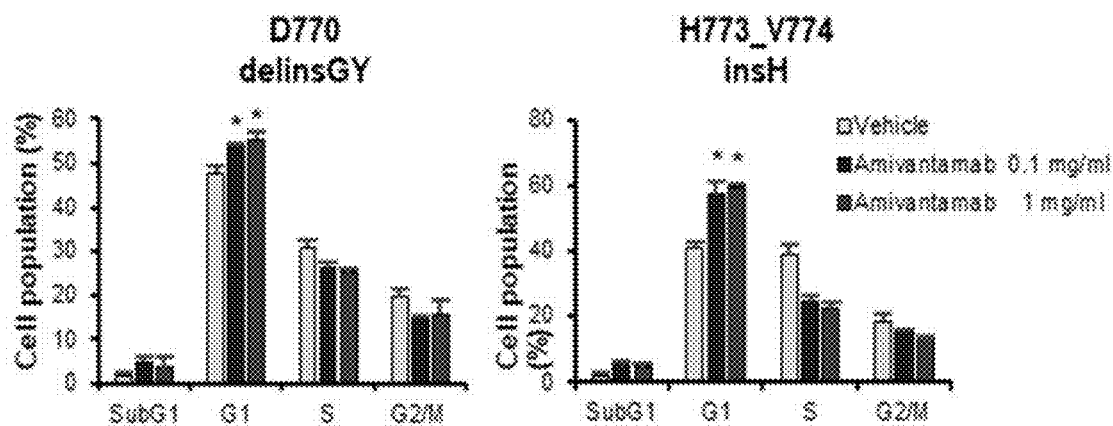
Figure 1G:
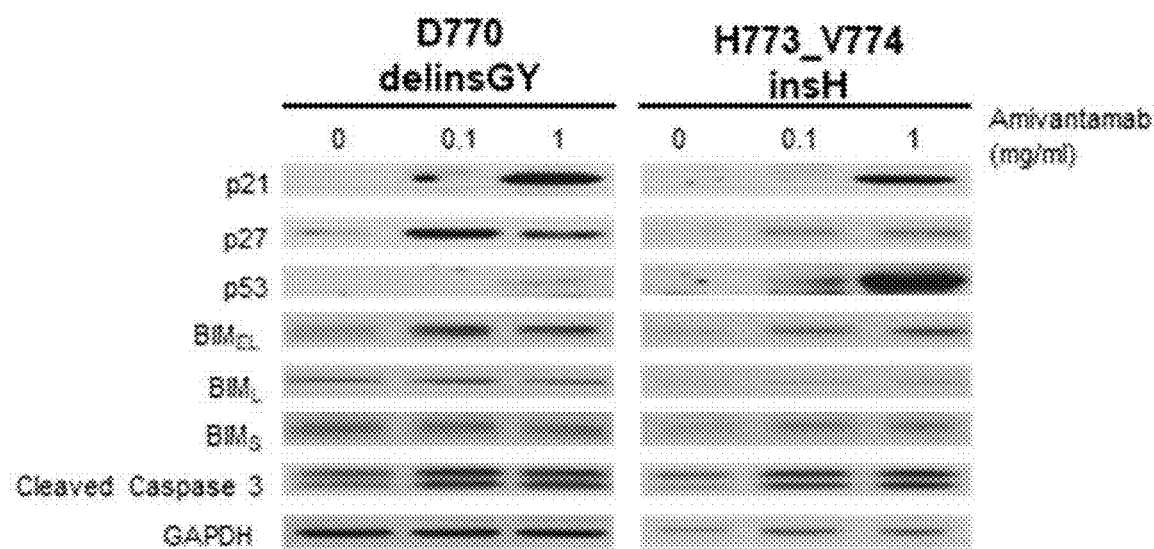

(p-S6) were also significantly reduced following amivantamab treatment (FIG. 1D), suggesting that amivantamab targeted EGFR and inhibited EGFR-related downstream signaling cascades. Similar results were observed in Ba/F3 cells expressing the V769insASV, Y764 insHH and D770_N771insSVD Exon20ins mutations (data not shown). Although 100 nM of gefitinib and osimertinib reduced p-EGFR in Ba/F3 cells overexpressing D770delinsGY and H773_V774insH, downstream EGFR signaling pathway components were not inhibited, which correlated with the lack of TKI effects on cell viability (FIG. 1E). In recent studies, poziotinib has shown antitumor activity in EGFR Exon20ins NSCLC (23,24). We further assessed the cell viability test for poziotinib in Ba/F3 overexpressing EGFR Exon20ins (data not shown). Consistent with a previous report (23), poziotinib strongly inhibited the cell viability in the mutant EGFR Exon20ins cells ($IC_{50}$ ranging from 0.8 to 10.9 nM). As was reported in a previous study (25), poziotinib also potently suppressed proliferation of Ba/F3 cells harboring WT EGFR ($IC_{50}$=0.8 nM). To present the selectivity for Exon20ins mutation in a more balanced manner, we compared antiproliferative potency between amivantamab and poziotinib in EGFR Exon20ins mutants over WT EGFR. Poziotinib exhibited lower EGFR Exon20ins mutant selectivity over WT EGFR, compared to amivantamab, suggesting that poziotinib may adversely affect normal tissues, thereby producing substantial toxicities, such skin rash and diarrhea (26). To better understand the mechanisms involved in amivantamab-mediated cellular cytotoxicity, we assessed the effect of amivantamab treatment on cell cycle progression and programmed cell death. In Ba/F3 cells expressing the EGFR D770delinsGY and H773_V774insH Exon20ins mutations, an accumulation of cells in G1 phase was observed in amivantamab-treated cells compared to vehicle-treated cells (FIG. 1F). As EGFR-TKIs have been reported to drive apoptosis in NSCSL cells harboring sensitizing EGFR mutations (27-29), we investigated whether treatment with amivantamab resulted in engagement of the apoptotic machinery. Amivantamab treatment resulted in the induction of pro-apoptotic proteins, including BIM and cleaved caspase 3 (FIG. 1G), suggesting that amivantamab, in addition to inhibition of downstream EGFR signaling cascade, also induced apoptosis in a BIM- and caspase-dependent manner.

Example 3. Amivantamab Displays Antitumor Activity in PDCs and Organoids

Figure 2A:
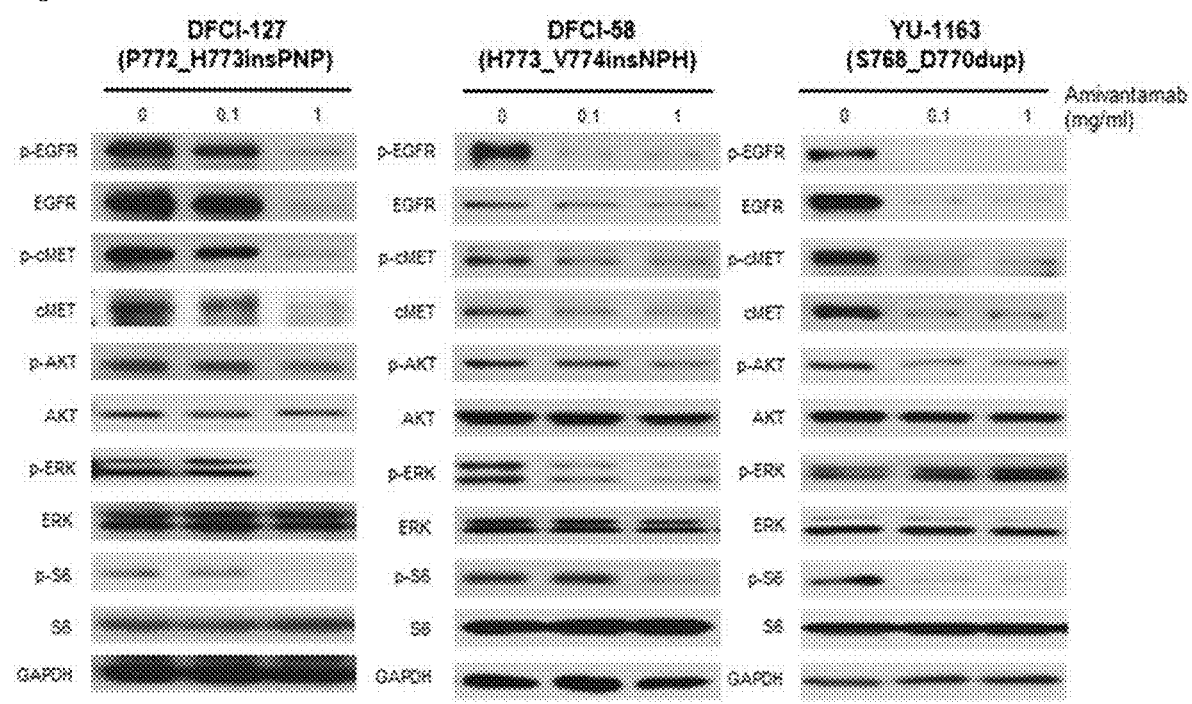
FIG. 2A-2E show the suppression of EGFR and cMet signaling pathways in Patient-Derived Cells (PDCs) and Organoids (PDOs) harboring EGFR Exon20ins mutations.
Figure 2B:
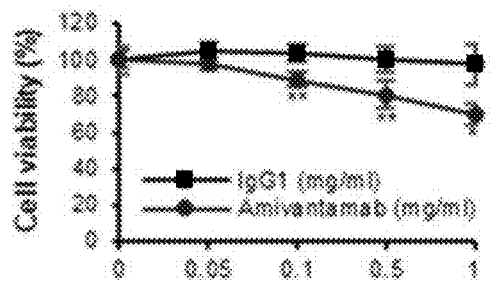
Figure 2B:
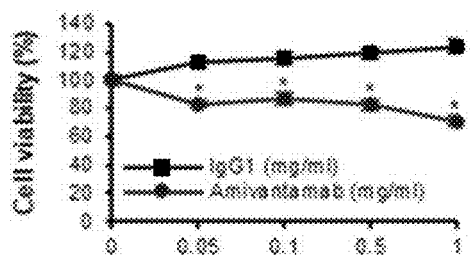
Figure 2B:
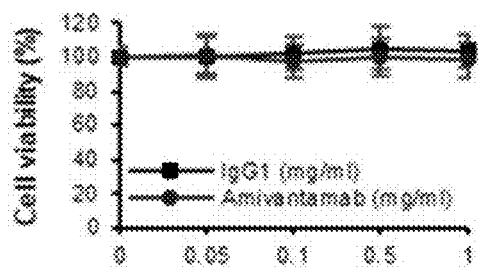
Figure 2C:
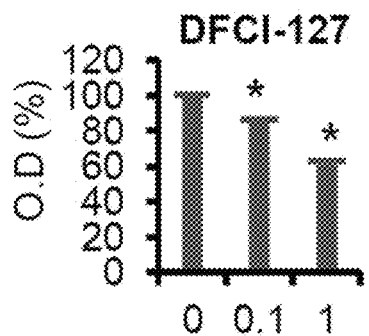
Figure 2C:
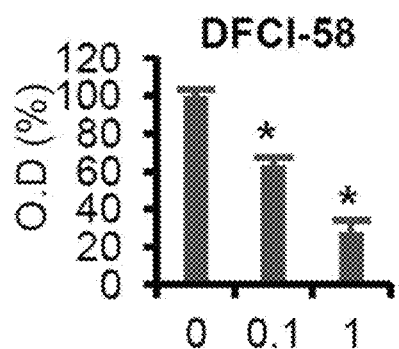
Figure 2C:
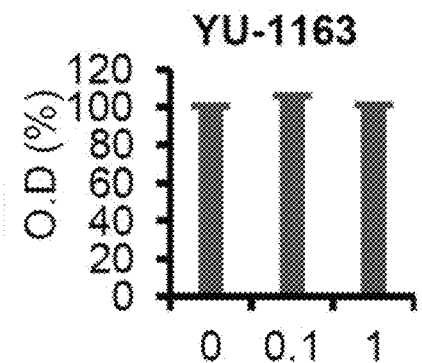
Figure 2D:
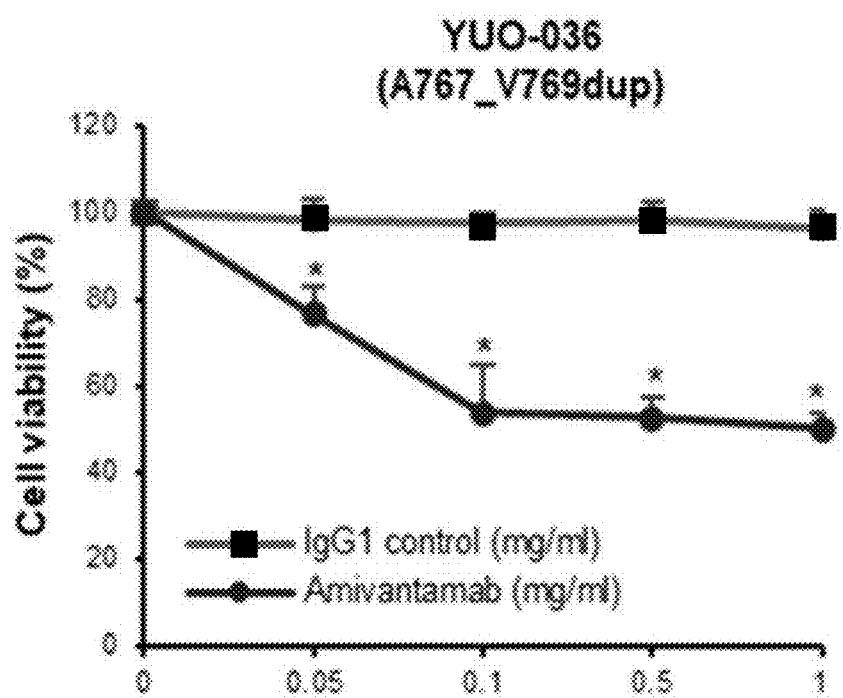
Figure 2E:
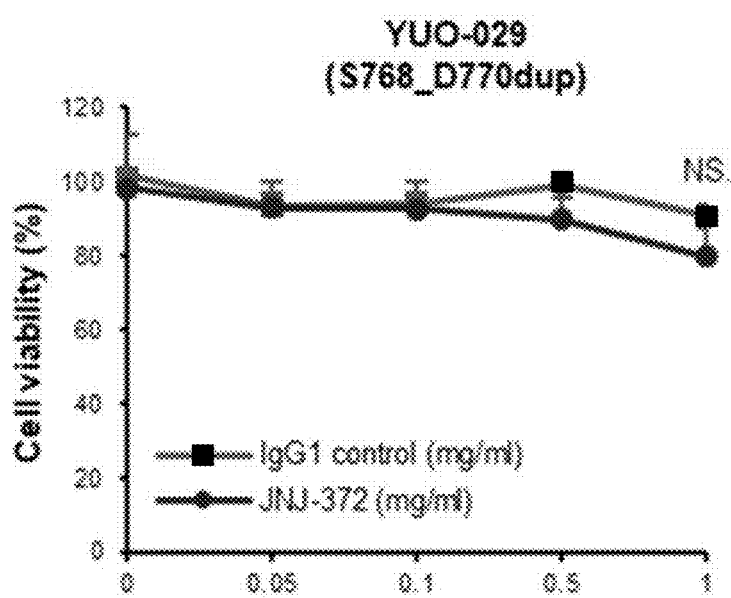

To extend our findings from Ba/F3 cells engineered to express the exogenous EGFR Exon20ins mutations, we evaluated the activity of amivantamab in several PDCs harboring the Exon20ins. The antitumor activity of amivantamab and associated mechanistic endpoints were evaluated in PDCs generated from patients harboring P772ins_H773insPNP (DFCI-127), H773_V774insNPH (DFCI-58), and S768_D770dup (YU-1163) Exon20ins mutations. In both DFCI-127 and DFCI-58 cells, amivantamab treatment resulted in decreased expression of total EGFR and cMet levels as well as inhibition of p-EGFR, p-cMet, p-AKT, p-ERK, and p-S6 (FIG. 2A), consistent with the results observed in Ba/F3 cell lines harboring EGFR Exon20ins mutations. Analysis of cell viability and colony formation revealed that amivantamab dose-dependently inhibited the cell growth and proliferation of PDCs, compared to IgG1 controls (FIGS. 2B and 2C). In contrast to the significant reduction in EGFR, cMet, p-EGFR, p-cMet, p-AKT, and p-S6 in DFCI-127 and DFCI-58 cells, YU-1163 treated with amivantamab unexpectedly revealed an induction of p-ERK (FIG. 2A). Consistent with this result, the growth of YU-1163 was not inhibited after amivantamab treatment for 72 hours or following long term treatment (FIGS. 2B and 2C). From the whole exome sequencing data of YU-1163, we observed a co-occurring mutation in the TP53 gene (R280T; 96% of mutant allele frequency). According to recent studies, mutations in TP53 commonly occurred with EGFR mutations in NSCLC. Particularly, TP53 mutations in exon 8 in NSCLC patients with EGFR mutations show lower responsiveness to EGFR-TKIs and worse prognosis than the patients with WT TP53 (30,31). Indeed, accumulated studies have revealed that the R280T mutation in TP53 plays crucial roles in the proliferation and survival of cancer cells and knockdown of the mutant TP53 causes G2 arrest and apoptosis in bladder cancer cells (32,33). Depletion of mutant TP53 by three different TP53-directed siRNAs significantly inhibited the cell proliferation with a reduction in activated ERK in YU-1163-pretreated with 1 mg/mL amivantamab (data not shown). Given that mutant TP53 is associated with EGFR-TKI resistance (34) and the depleted mutant TP53 restored the sensitivity of amivantamab by downregulation of p-ERK, induction of p-ERK following amivantamab treatment in YU-1163 cells might be a key regulator of cell survival potentially through the crosstalk between mutant TP53 and ERK signaling cascade (35-37). Additionally, we generated two PDO models from plural effusion of patients who had A767_V769dup (YUO-036) and S768_D770dup (YUO-029) to recapitulate the phenotypic and molecular landscape of the original NSCLC with EGFR Exon20ins (data not shown). YUO-029 was derived from the same patient from whom YU-1163 PDC (S768_D770dup) was derived. As shown in FIG. 2D, YUO-036 was sensitive to amivantamab in a dose dependent manner, whereas YUO-029 derived from the same patient with YU-1163 showed no significant decrease in cell viability following amivantamab treatment compared to IgG1 control (FIG. 2E). Taken together, these results indicate that amivantamab has potent antitumor activity in NSCLC patient-derived cancer cells with EGFR Exon20ins mutations by downmodulation of EGFR and cMet signaling pathways.

Example 4. EGFR and cMet are Internalized in Response to Amivantamab

Treatment with amivantamab results in downmodulation of EGFR and cMet, as observed in Ba/F3 cells (FIGS. 1A-1G) and PDCs (FIG. 2A-2E). According to many studies, anti-EGFR mAb induces internalization of EGFR leading to downregulation of its expression on the cell surface (38,39). To investigate whether amivantamab directly binds to EGFR on cells with EGFR Exon20ins mutation, Ba/F3 cells overexpressing D770delinsGY or H773_V774insH were incubated with 0.1 mg/mL IgG1 control and 0.1 mg/mL amivantamab. Fluorescence-activated cell sorting (FACS) was used to measure the level of plasma membrane-bound EGFR. EGFR expression on the plasma membrane began to dwindle by almost two-fold 30 min after amivantamab treatment. The % changes in median fluorescence intensity (MFI) of EGFR relative to IgG1 control treated cells at 30 min were 56% and 68% in D770delinsGY and H773_V774insH, respectively, and subsequently remained at 40% EGFR expression relative to IgG1 control-treated cells 72 hours after amivantamab treatment (Table 1). To explore the internalization of cMet as well as EGFR on PDCs harboring EGFR Exon20ins, DFCI-127 and DFCI-58

Figure 3A:
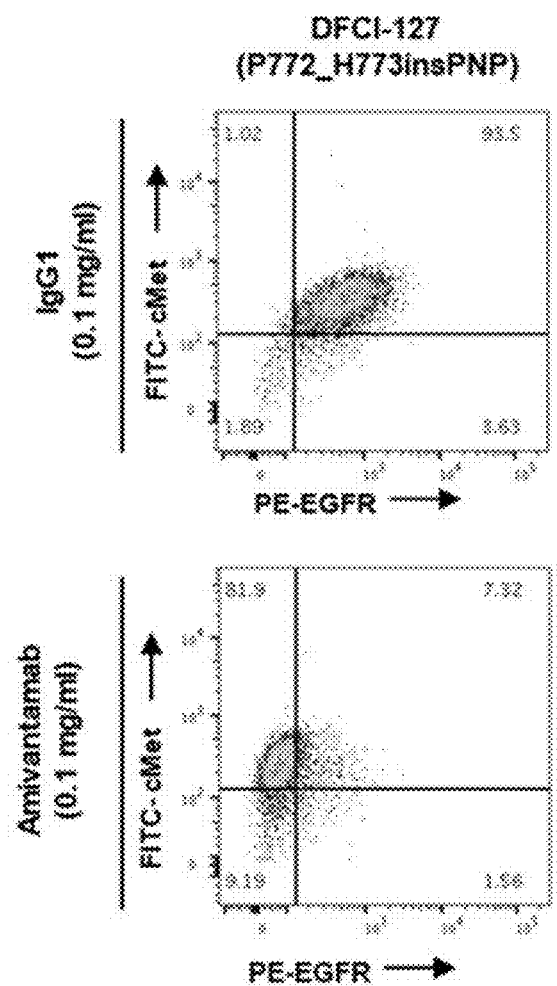
FIG. 3A-3C show internalization of EGFR and cMet in Ba/F3 and PDC cells expressing EGFR Exon20ins mutations, following treatment with amivantamab.
Figure 3B:
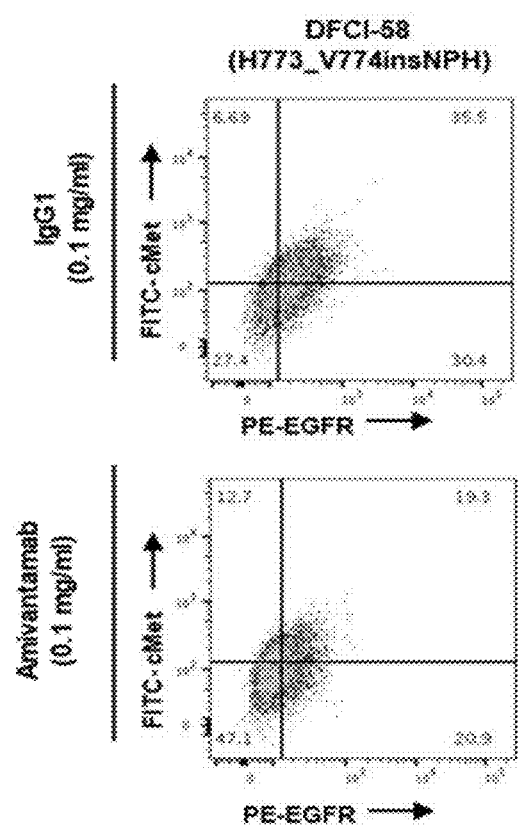
Figure 3C:
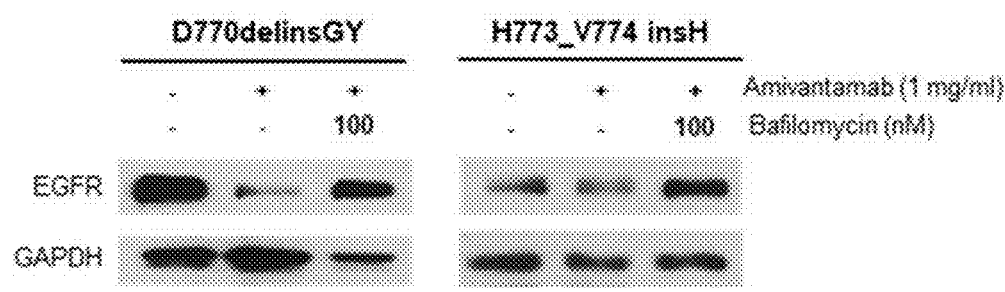

PDCs were treated with 0.1 mg/mL amivantamab and the plasma membrane-bound cMet and EGFR were measured 72 hours after amivantamab treatment (FIGS. 3A and 3B). The results showed that amivantamab reduced EGFR and cMet on PDCs compared to IgG1 control. Immunofluorescence (IF) staining was used to visualize the internalization of EGFR and cMet following amivantamab treatment. Treatment with 0.1 mg/mL amivantamab for 72 hours led to the redistribution of EGFR and cMet receptors into internal compartments whereas IgG-treated cells showed no change in the staining pattern for EGFR or cMet (data not shown). Internalization and subsequent downregulation of EGFR and cMet receptors by lysosomes could account for the decreased EGFR and cMet protein levels observed in the immunoblot, FACS and IF assays following amivantamab treatment. To determine if lysosomal degradation was involved in downregulating EGFR protein levels, Ba/F3 cells overexpressing D770delinsGY and H773_V774insH were treated with amivantamab in the absence and presence of the autophagy inhibitor bafilomycin. Bafilomycin treatment inhibited the degradation of EGFR (FIG. 3C), suggesting that downmodulation of the total EGFR protein level following amivantamab treatment may involve lysosomal degradation of internalized cell surface receptors. Taken together, these results suggest that treatment with amivantamab induces receptor internalization and may contribute to the observed antiproliferative effects of amivantamab by inhibiting EGFR and cMet-mediated signaling

TABLE 1

EGFR expression on the plasma membrane detected in Ba/F3 cells overexpressing D770delinsGY and H773_V774insH.

| | % MFI ratio | |
| --- | --- | --- |
| | D770delinsGY | H773_V774insH |
| 30 min | 66.9 | 68.0 |
| 6 h | 60.9 | 49.1 |
| 24 h | 47.6 | 49.3 |
| 48 h | 45.7 | 46.9 |
| 72 h | 44.4 | 42.9 |

*% MFI (Median Fluorescence Intensity)

Figure 4A:
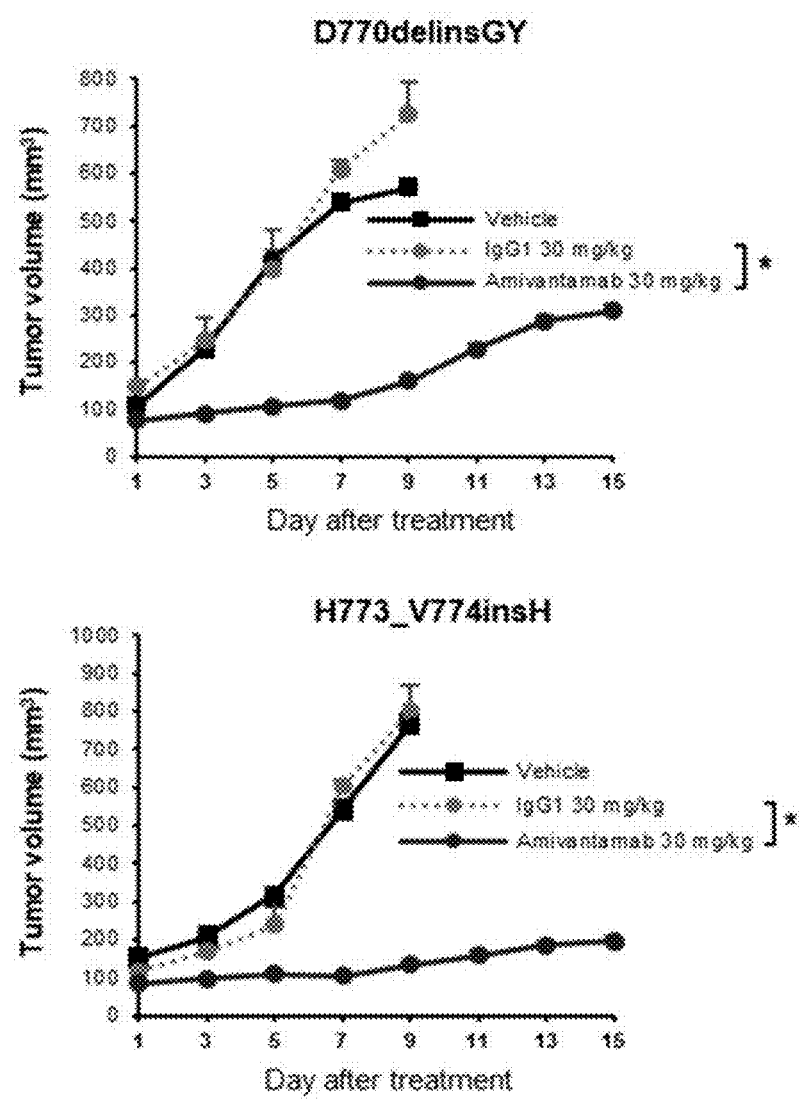
FIG. 4A-4I show reduction of tumor burden in Ba/F3 cells and PDCs with EGFR Exon20ins xenograft models, following treatment with either IgG1 control, or amivantamab twice per week i.p. injections dosing with 30 mg/kg; *P<0.0001 vs. vehicle or IgG1 control.
Figure 4B:
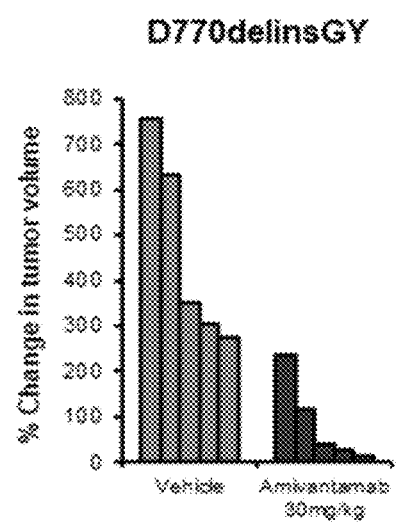
Figure 4B:
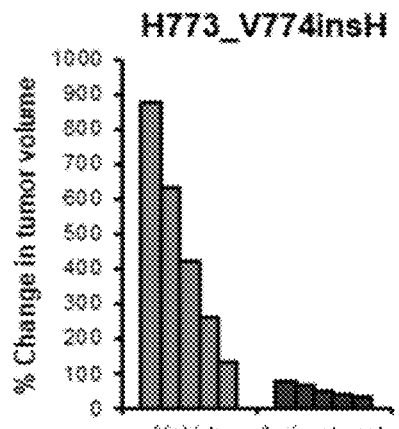
Figure 4C:
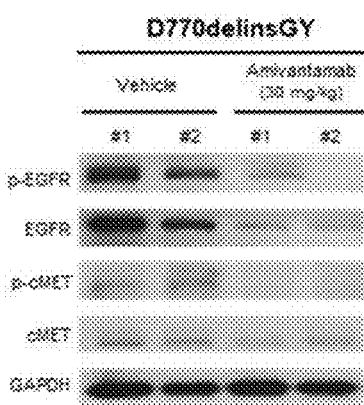
Figure 4C:
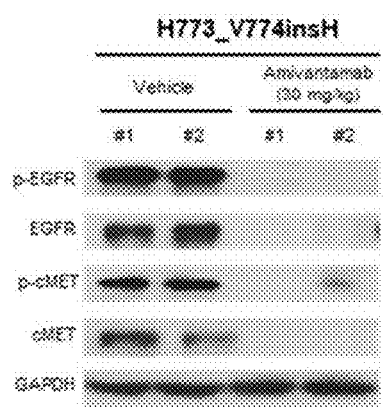
Figure 4D:
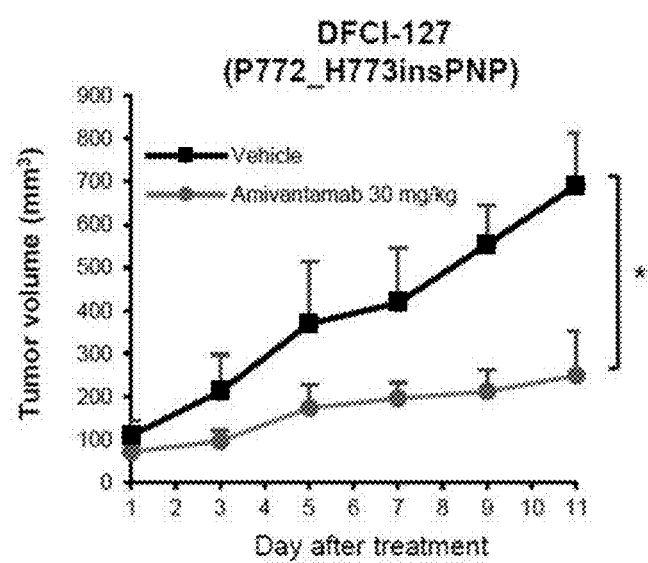
Figure 4E:
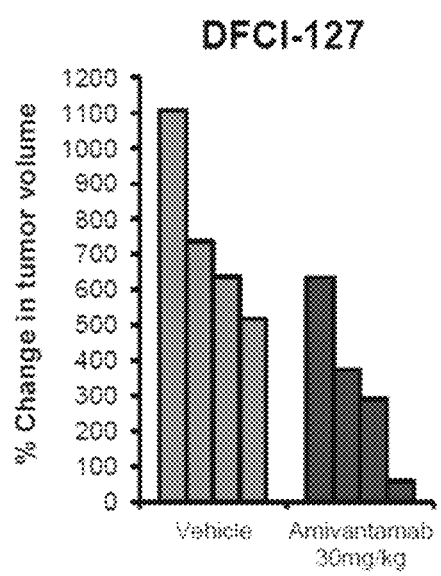
Figure 4F:
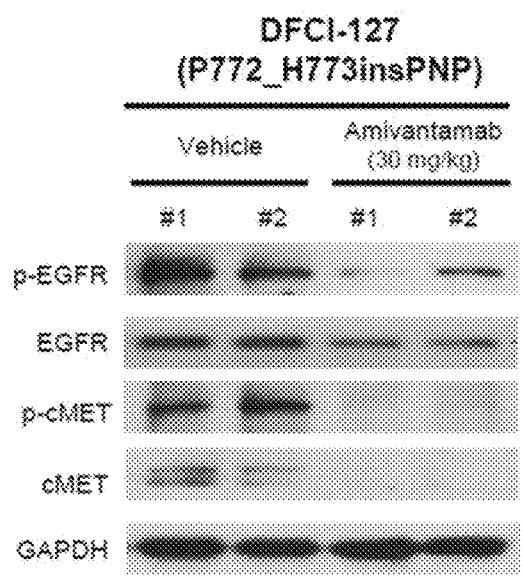
Figure 4G:
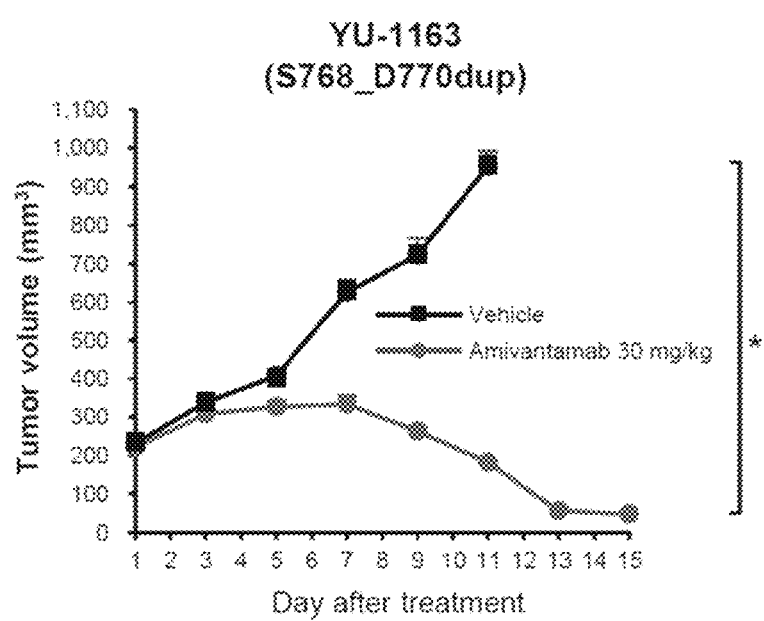
Figure 4H:
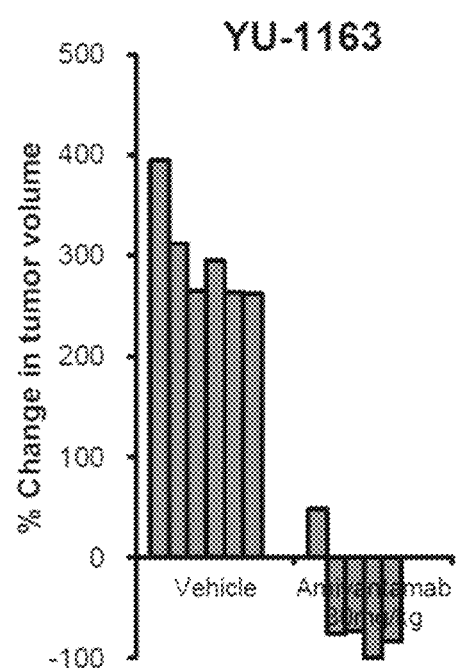
Figure 4I:
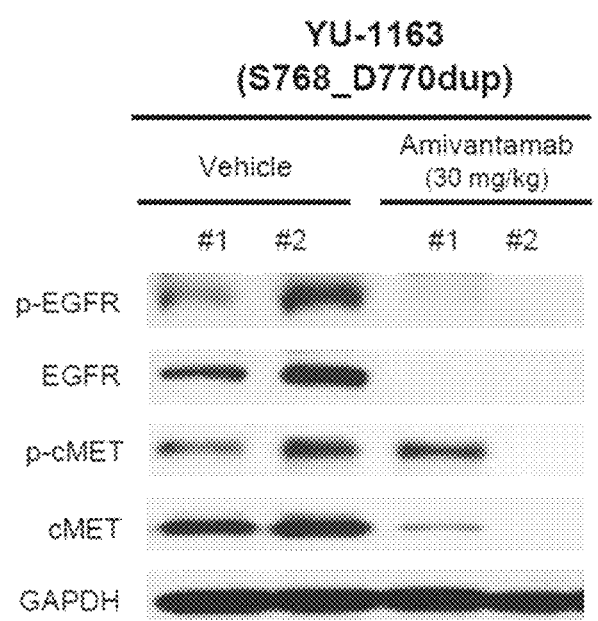

Example 5. Amivantamab Inhibits EGFR Exon20ins Mutation-Driven Growth of Ba/F3 and PDC Models In Vivo To determine if amivantamab is active against EGFR Exon20ins-derived tumors in vivo, xenograft models were generated using Ba/F3 cells harboring EGFR D770delinsGY and H773_V774insH Exon20ins mutations and PDCs (DFCI-127 and YU-1163) harboring EGFR P772insPNP and S768_D770dup Exon20ins mutations, respectively. Mice were treated with amivantamab, IgG1 control, or vehicle at 30 mg/kg twice per week i.p. Amivantamab-treated mice showed reduced tumor volumes compared to vehicle or IgG1 control-treated mice in the Ba/F3 cells-bearing NOG mice models (FIGS. 4A-4B). Inhibition of tumor growth occurred early and was sustained 15 days following treatment. As shown in Ba/F3 and PDC cells in vitro, protein expression of EGFR, cMet, p-EGFR, and p-cMet were significantly reduced following amivantamab treatment (FIG. 4C) in the Ba/F3-bearing NOG mice models. Similarly, in the PDC xenograft models, amivantamab-treated mice showed a reduction in tumor volume compared to vehicle-treated mice (FIGS. 4D-4E and 4G-4H), as well as a reduction in EGFR, cMet, p-EGFR, and p-cMet protein levels (FIGS. 4F and 4I). Intriguingly, although amivantamab could not inhibit the proliferation of YU-1163 PDC in vitro (FIG. 2A-2E), a dramatic tumor regression was observed in YU-1163-bearing BALB/c nude mice after amivantamab treatment, suggesting that additional factors might contribute to the in vivo antitumor effect of amivantamab (FIG. 4G). As mentioned above, poziotinib is a targeted agent that has shown preliminary clinical activity in EGFR Exon20ins disease (23,24). We compared the antitumor activity and safety of poziotinib with those of amivantamab in YU-1163 (5768_D770dup)-bearing BALB/c nude mice and Ba/F3 cells overexpressing D770_N771insSVD-bearing NOG mice. Using the previously reported dosing regimen of 5 mg/kg poziotinib, Q.D. (23), sudden death occurred within 6 days of treatment. Skin toxicity analyses with poziotinib and amivantamab revealed that poziotinib-treated mice showed severe skin toxicities on the face, abdomen, and back at dose of 5 mg/kg and 10 mg/kg, while 30 mg/kg amivantamab showed only minimal keratosis on the face. In addition to skin toxicity, a dramatic loss of body weight was observed in poziotinib-treated mice compared to amivantamab treated mice. The favorable toxicity profiles with amivantamab were consistent with those shown in an ongoing Phase I study (18).

Figure 5A:
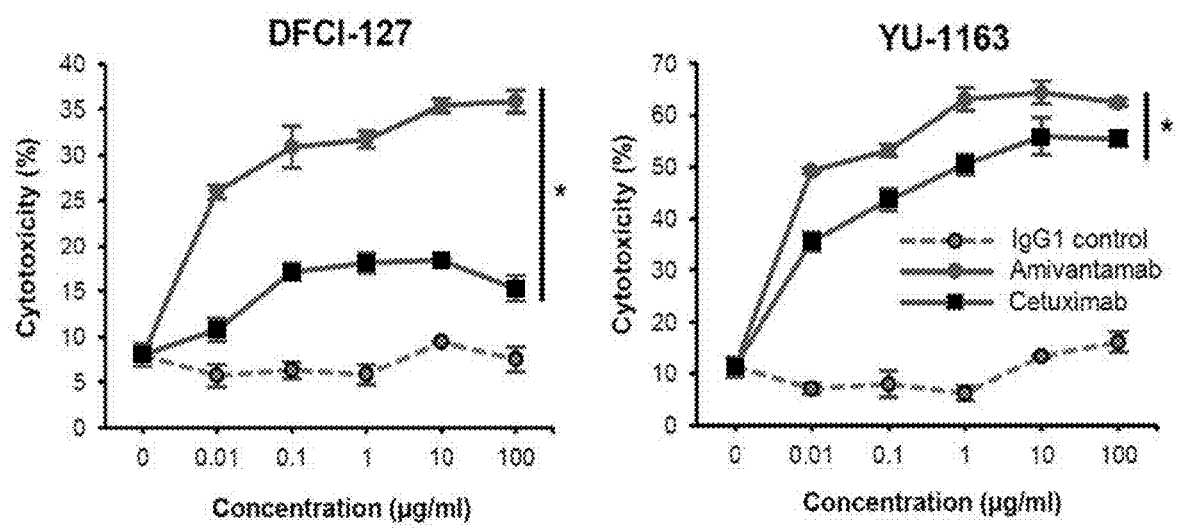
FIG. 5A-5E show superior ADCC activity of amivantamab as compared to cetuximab.
Figure 5B:
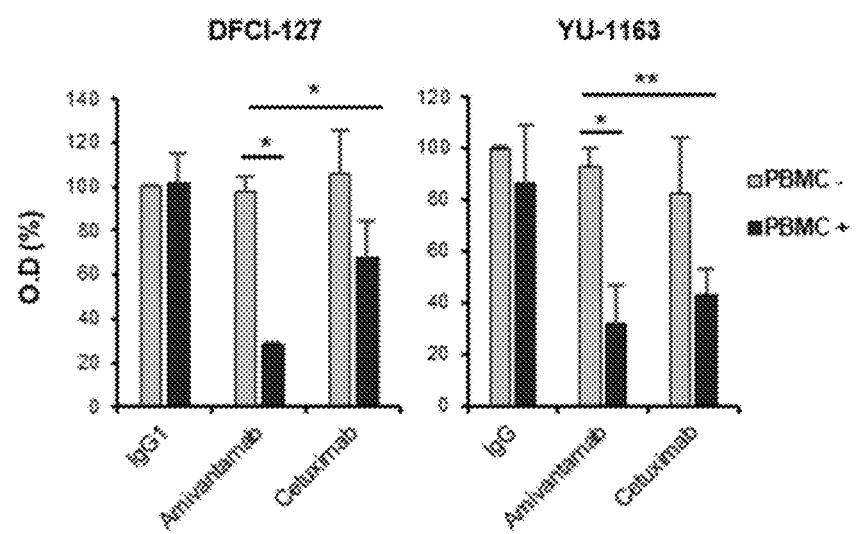
Figure 5C:
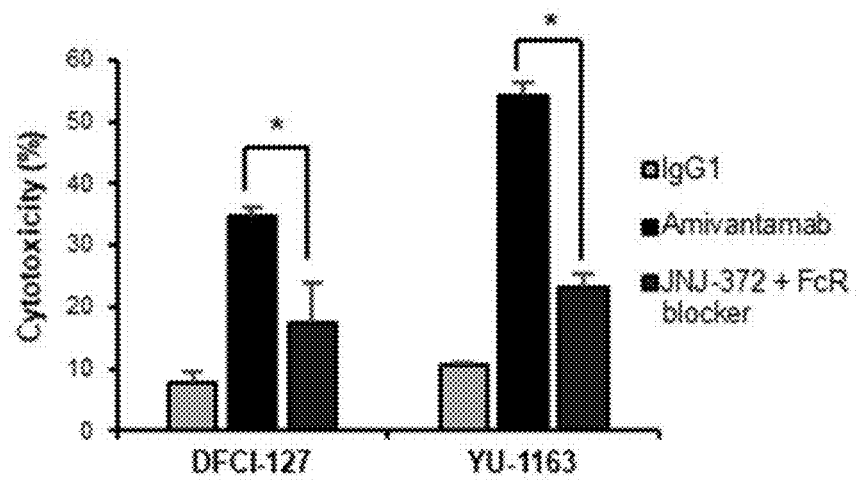
Figure 5D:
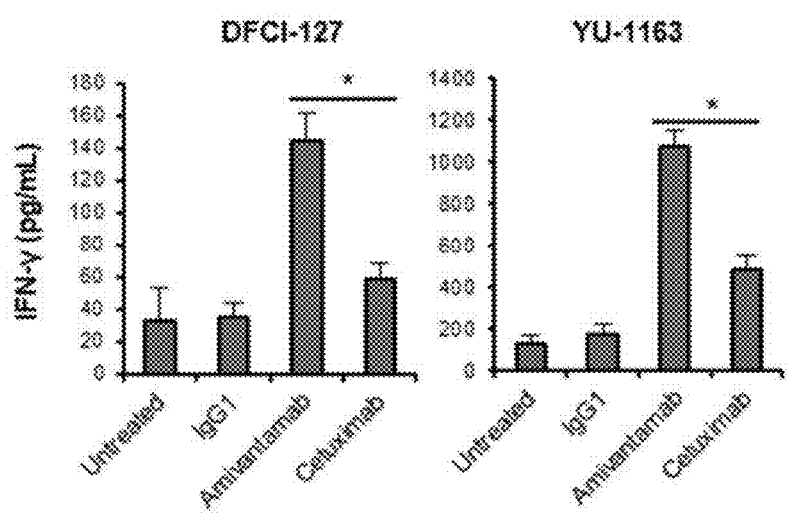
Figure 5E:
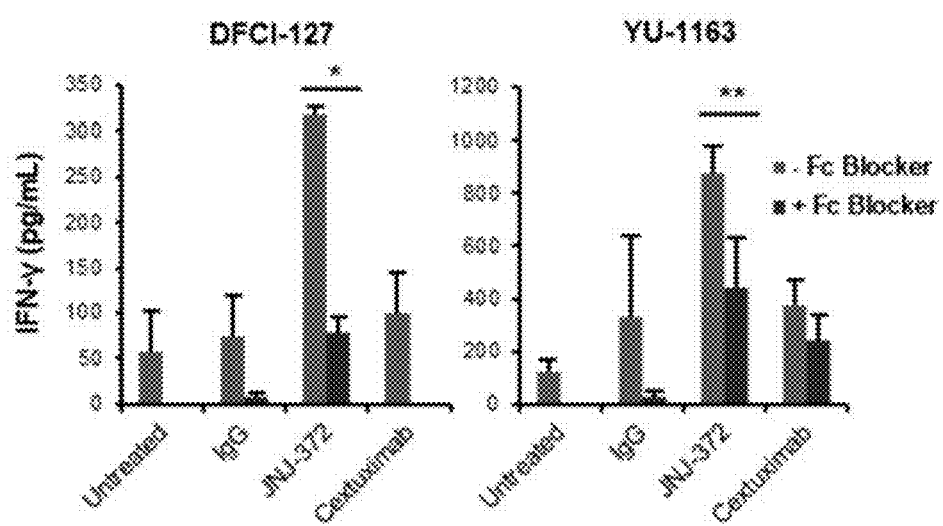
Figure 6A:
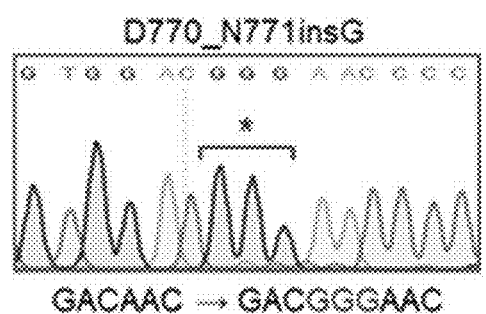
FIG. 6A-6D show the reduction of tumors in a PDX model with D770_N771insG EGFR mutantion by amivantamab.

Example 6. Amivantamab Induces Antibody-Dependent Cell-Mediated Cytotoxicity (ADCC) in Exon20ins Models The process of ADCC is known to be initiated when both the target cell antigen and an activated Fcγ receptor (FcγR) are engaged respectively by the Fab and Fc portions of an antibody. The effector cells, mainly natural killer (NK) cells, trigger degranulation and subsequent cytokine production, resulting in the elimination of the target cells (40). To determine whether ADCC plays a role in amivantamab-mediated antitumor activity, ADCC assays were performed using PDCs (DFCI-127 and YU-1163) expressing EGFR Exon20ins mutations co-cultured with peripheral blood mononuclear cells (PBMCs) as effector cells (E:T=50:1). Treatment with amivantamab resulted in cytotoxicity in both PDCs in a dose-dependent manner and to a greater extent than cetuximab, a monoclonal antibody targeting EGFR (FIGS. 5A-5B). By extension, cetuximab treatment led to a less pronounced reduction in tumor volume in YU-1163-bearing BALB/c nude mice models relative to that observed with amivantamab (data not shown). Amivantamab-mediated cellular cytotoxicity shown in FIG. 5A was significantly impaired by incubation with an Fc receptor (FcR) blocker in DFCI-127 and YU-1163 PDCs (FIG. 5C), suggesting that the amivantamab-mediated ADCC effect requires the interaction with FcRs on PBMCs. Similarly, the antitumor effect of amivantamab was abrogated in vivo when amivantamab was co-treated with anti-mouse CD16/CD32 antibodies to block FcγIII/FcγII on monocytes/macrophages and NK cells in YU-1163-bearing BALB/c nude mice (data not shown). It is known that inflammatory cytokines such as IFN-γ and TNFα are secreted from infected monocytes and activated NK cells during ADCC, encouraging antigen presentation and adaptive immune responses (41-43). To explore the correlation between amivantamab-dependent ADCC and secreted IFN-γ levels, we measured the level of IFN-γ in medium co-cultured with PDCs and PBMC after amivantamab treatment. Consistent with the degree of the ADCC effect, IFN-γ levels were significantly increased with amivantamab treatment compared to cetuximab treatment (FIG. 5D). Treatment with a FcR blocker reduced IFN-γ secretion, indicating that IFN-γ secretion was dependent on the interaction between the Fc domain of amivantamab and the FcR on immune cells (FIG. 5E). Induced inflammatory cytokines including IFN-γ secreted from NK cells activated by amivantamab bound to EGFR and cMet on EGFR Exon20ins-driven tumors may lead to the recruitment and activation of adjacent immune cells to tumor cells in vivo. To explore this, we analyzed the infiltration of macrophages and NK cells into the tumor in a PDX model (YHIM-1029)-, which was generated from a patient-derived tumor harboring the D770_N771insG Exon20ins mutation (FIG. 6A), and YU-1163-bearing BALB/c nude mice models treated with amivantamab at 10 mg/kg and 30 mg/kg dose, respectively. mF4/80 and mNKp46, markers of macrophages and NK cells in BALB/c nude mice, respectively, were elevated in tumors following treatment with amivantamab, suggesting that the mechanistic components of ADCC observed in vitro may translate to recruitment of key effector cells in tumors in vivo (data not shown). Additionally, these results suggest that amivantamab has greater ADCC and antitumor activity than cetuximab in the context of EGFR Exon20ins and that ADCC is an important mechanism in mediating the cytotoxic effects of amivantamab.

Figure 6B:
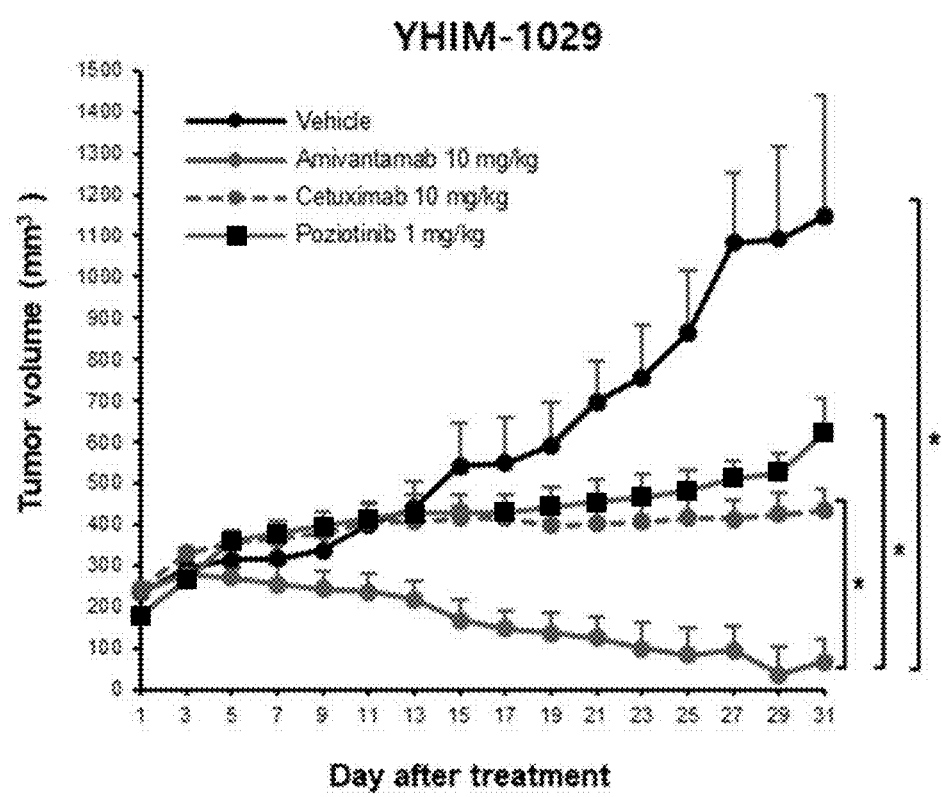
Figure 6C:
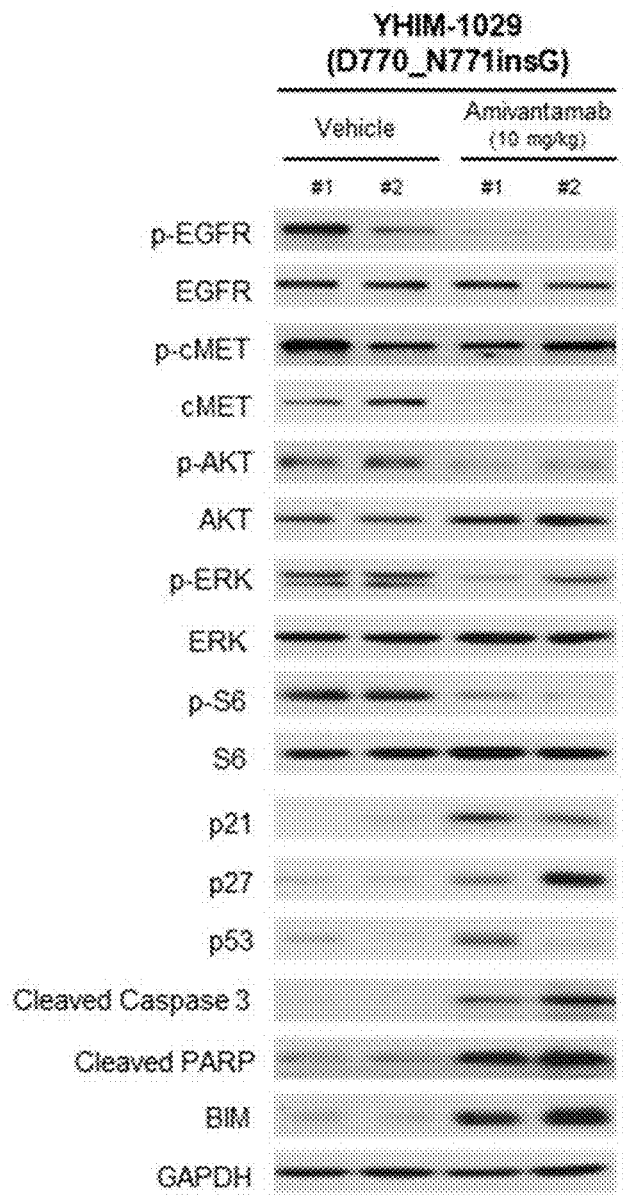
Figure 6D:
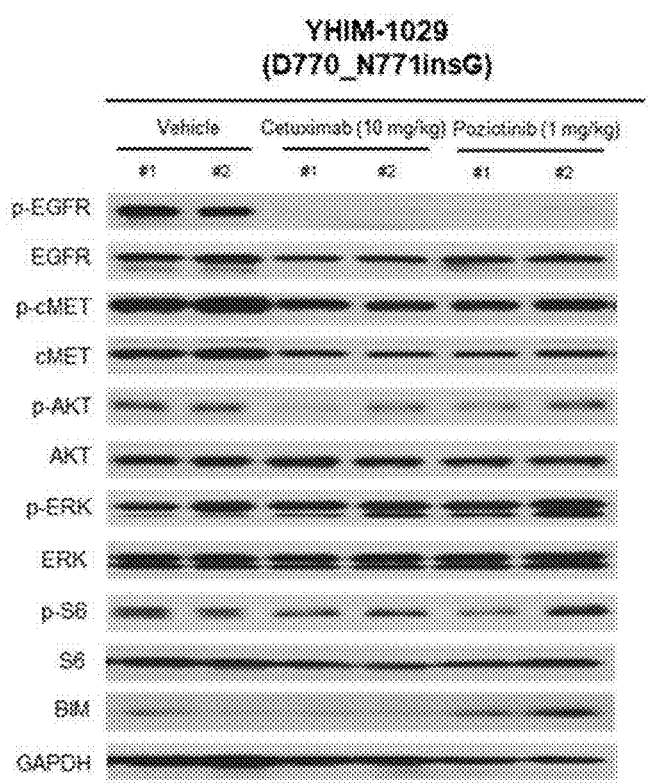

Example 7. Amivantamab Demonstrates Antitumor Activity in a PDX Model Harboring the D770_N771insG Exon20ins Mutation Treatment with amivantamab in a PDX model (YHIM-1029) resulted in a robust decrease in tumor volume, indicating that the antitumor activity observed in Ba/F3 and PDC models was preserved in a PDX model. In contrast, treatment with cetuximab (10 mg/kg) or poziotinib (1 mg/kg) only modestly reduced tumor volume (FIG. 6B). The dose of poziotinib was reduced to 1 mg/kg for this experiment due to the toxicity of poziotinib described above (data not shown). Pharmacodynamic analysis showed that amivantamab treatment resulted in EGFR and cMet downmodulation, inhibition of the downstream signaling pathways p-AKT, p-ERK, and p-S6, and increased markers of apoptosis (FIG. 6C). In contrast, tumors from mice treated with cetuximab or poziotinib maintained EGFR downstream signaling components p-ERK and p-S6 (FIG. 6D), which was consistent with the modest effects observed on tumor growth. Histopathological examination of tumor sections obtained following amivantamab or vehicle treatment with hematoxylin and eosin (H&E) staining, and immunohistochemical staining for EGFR, cMet, Ki-67, and TUNEL staining, further confirmed receptor inhibition and engagement of apoptotic machinery in EGFR Exon20ins-driven tumors in vivo (data not shown). To verify whether the antitumor effect of amivantamab was affected by innate immunity in the in vivo models, we blocked the mouse CD16/32 via administration of anti-CD16/CD32 antibodies. The antitumor effect of amivantamab shown in FIG. 6B was abrogated when the amivantamab-treated PDX bearing BALB/c nude mice were co-treated with anti-CD16/CD32 antibodies, indicating that the antitumor effects of amivantamab were partially mediated by immune cells in this condition (data not shown).

Figure 7:
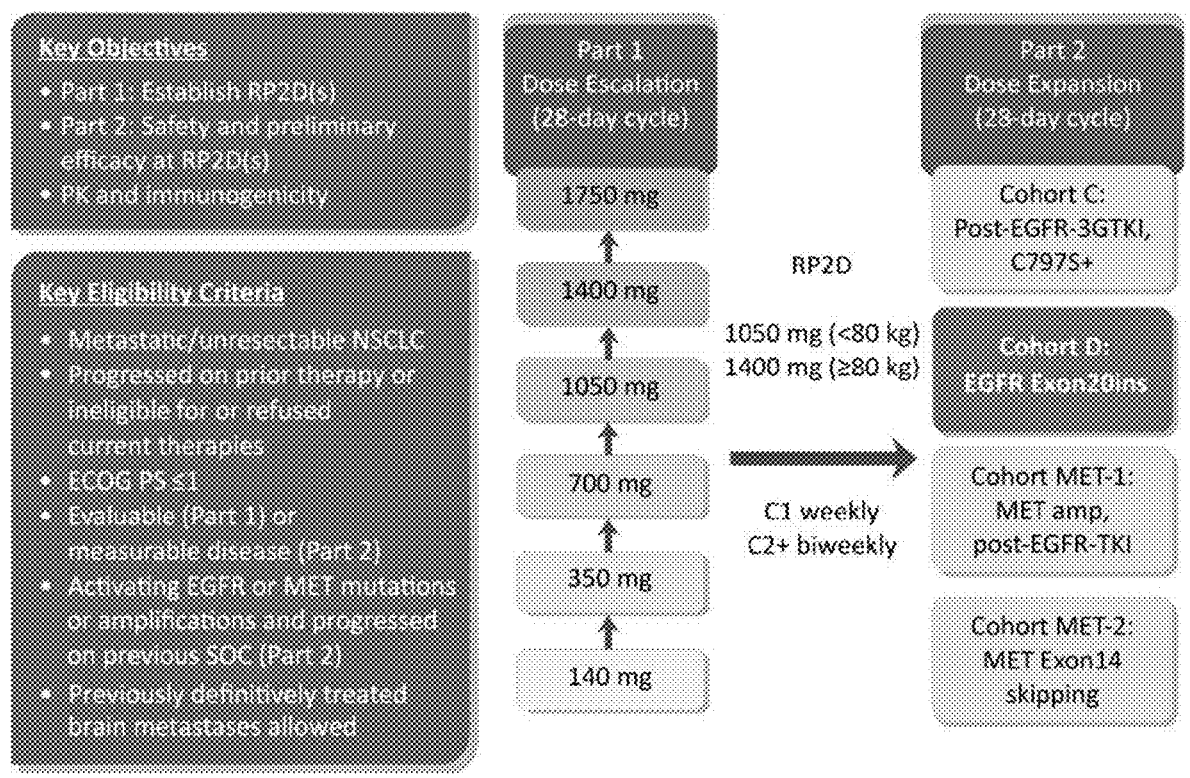
FIG. 7 shows the study design for two-part Phase 1 study of amivantamab in patients with advanced NSCLC (NCT02609776); Cohorts A (EGFR-dependent resistance) and B (EGFR-independent resistance) were closed. 3GTKI=3rd-generation tyrosine kinase inhibitor; amp=amplification; C=cycle; ECOG PS=Eastern Cooperative Oncology Group performance status; PK=pharmacokinetics; RP2D=recommended phase 2 dose; SOC=standard of care.

Example 8. Antitumor Activity of Amivantamab in Patients with EGFR Exon20ins Disease The potential clinical benefit of amivantamab was evaluated in an ongoing two-part Phase 1 study of amivantamab in patients with advanced NSCLC (NCT02609776). FIG. 7 shows the study design.

The analysis presented here includes all enrolled patients with Exon20ins mutations who received the recommended phase 2 dose (RP2D) of 1050 mg (1400 mg for patients ≥80 kg) amivantamab intravenously once weekly for the first cycle; biweekly thereafter. The safety population (N=50) included all patients who received amivantamab at the RP2D, and the response-evaluable population (n=39) included patients who had at least 2 disease assessments or had discontinued therapy. Adverse events (AEs) were graded as per Common Terminology Criteria for Adverse Events v4.03. Response was assessed by the investigator as per Response Criteria in Solid Tumors v1.1.

Patients. Across Parts 1 and 2 of the clinical study, 50 patients with EGFR Exon20ins-mutated NSCLC had received at least one dose of amivantamab at the RP2D; among these patients, 39 were response-evaluable with 13 distinct EGFR Exon20ins alterations identified (Table 2).

TABLE 2

Demographics and Disease Characteristics of Response-Evaluable Patients.

| | Total (N = 39) |
|---|---|
| Median age, years (range) | 61 (40-78) |
| Male/Female, n (%) | 19 (49)/20 (51) |
| Race, n (%) | |
| Asian | 25 (64) |
| Black | 1 (3) |
| White | 11 (28) |
| Not reported | 2 (5) |
| ECOG PS, n (%) | |
| 0 | 14 (36) |
| 1 | 24 (62) |
| 2 | 1 (3) |
| Median time from initial diagnosis, months | 12 (1-56) |
| Adenocarcinoma, n (%) | 39 (100) |
| Exon20ins mutation, n (%) | 39 (100) |
| Median prior lines, n (range) | 1 (0-7) |
| Prior systemic therapies, n (%) | 33 (85) |
| Platinum-based chemotherapy[a] | 29 (74) |
| Immuno-oncology therapy[b] | 13 (33) |
| EGFR TKI | 9 (23) |
| Bevacizumab | 4 (10) |
| No prior therapy | 6 (15) |

[a]In the metastatic setting,
[b]nivolumab, atezolizumab, pembrolizumab, durvalumab;
ECOG PS = Eastern Cooperative Oncology Group performance status;
EGFR = epidermal growth factor receptor;
TKI = tyrosine kinase inhibitor Safety. AEs were reported in 96% of patients at the RP2D and were mostly grade 1 to 2 (60%; Table 3). Dose reduction (5 [10%]) and discontinuation (3 [6%]) due to AEs were infrequent; no consistent pattern of severe toxicity was associated dose interruption or modification. Most common all-grade AEs were rash, infusion related reaction, and paronychia (Table 3). IRR occurred predominantly on the first infusion and did not prevent subsequent treatments. No grade ≥3 rash was reported, and 1 patient reported grade 3 diarrhea (3 [6%] patients had diarrhea of any grade). 3 (6%) patients had treatment-related grade ≥3 AEs of hyperamylasemia, hypokalemia, increased lipase, and shoulder/chest pain. Treatment-related serious AEs of cellulitis, interstitial lung disease, and shoulder/chest pain were reported in 3 (6%) patients.

AEs leading to death were not considered treatment-related.

TABLE 3

Adverse Events (AE) in Patients Treated at the RP2D (Safety Population).

| AEs in Safety Population, n (%) | Total (N = 50) |
| --- | --- |
| Any AE | 48 (96) |
| Serious AE | 14 (28) |
| Grade ≥3 AE | 18 (36) |
| AEs leading to death (all unrelated to amivantamab) | 4 (8) |
| AEs leading to discontinuation | 3 (6) |
| AEs leading to dose reduction | 5 (10) |
| AEs leading to dose interruption[a] | 15 (30) |

| All-grade AEs (≥15%), n (%) | Total (N = 50) |
| --- | --- |
| Rash[b] | 36 (72) |
| Infusion related reaction | 30 (60) |
| Paronychia | 17 (34) |
| Constipation | 13 (26) |
| Hypoalbuminemia | 11 (22) |
| Dyspnea | 10 (20) |
| Fatigue | 9 (18) |
| Back pain | 8 (16) |
| Stomatitis | 8 (16) |

[a]Excludes infusion related reaction,
[b]Includes dermatitis acneiform, rash, rash generalized, rash maculo-papular, rash pustular, rash papular, erythema, generalized erythema, rash erythematous, macule, perineal rash, rash pruritic, dermatitis;
AE = adverse event;
RP2D = recommended phase 2 dose.

Figure 8:
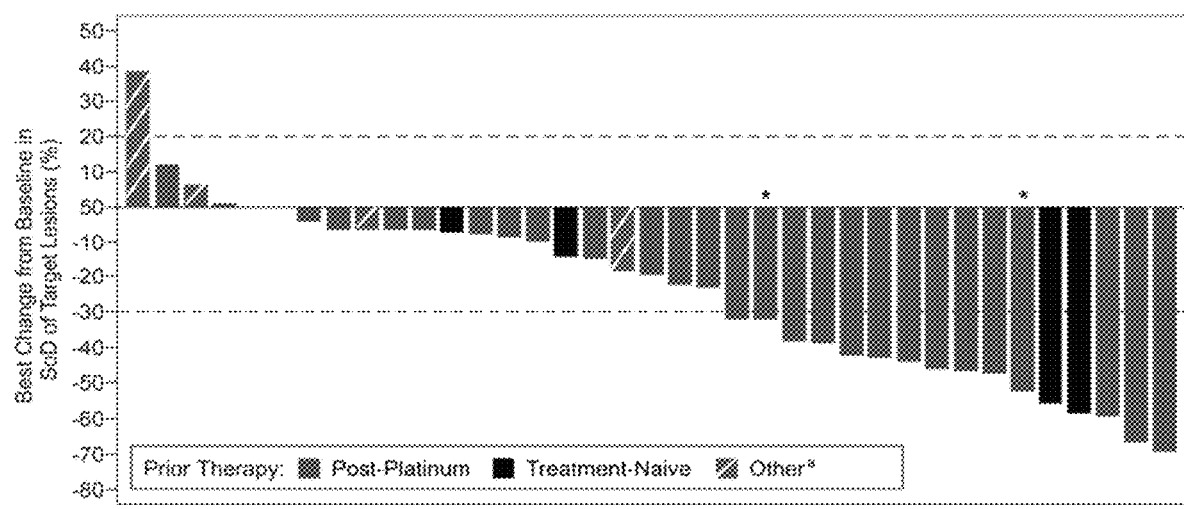
FIG. 8 shows best percentage change from baseline in sum of target lesion diameters. *Unconfirmed partial response, a—2 patients treated with EGFR TKI, 1 patient with bevacizumab plus radiation therapy, 1 patient with adjuvant immuno-oncology chemotherapy. 2 patients did not have post-baseline disease assessments and are not included in the plot. SoD=sum of diameters.
Figure 9:
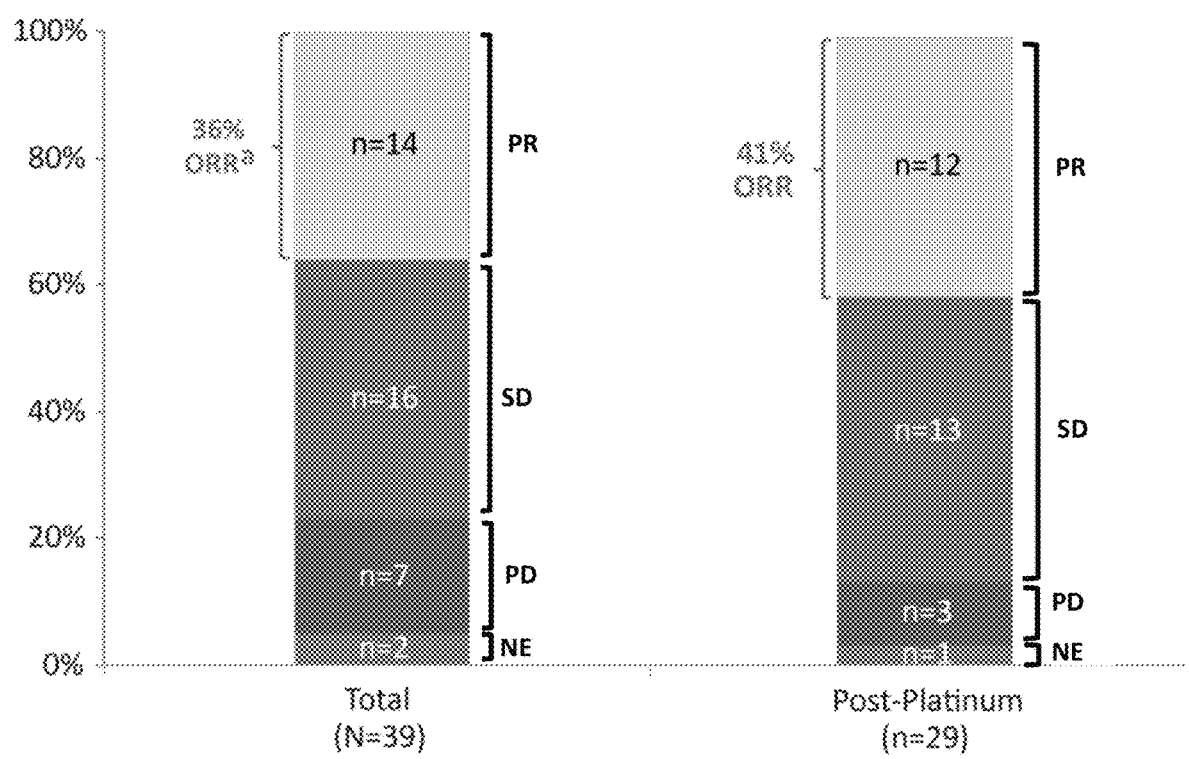
FIG. 9 shows best response; a—Partial response or better, b—Partial response or better or stable disease of at least 12 weeks (2 disease assessments). NE=not evaluable; ORR=overall response rate; PD=progressive disease; PR=partial response; SD=stable disease.
Figure 10:
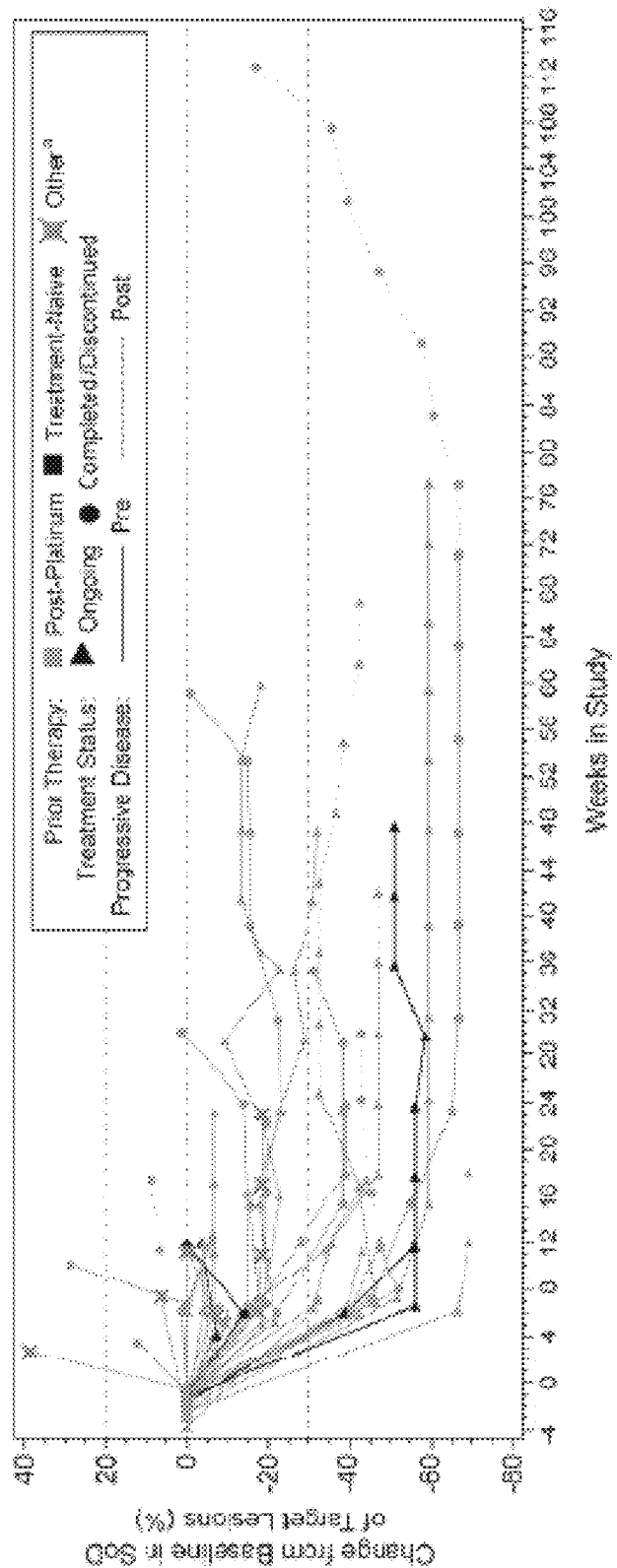
FIG. 10 shows change from baseline in sum of target lesion diameters over time; a—2 patients treated with EGFR TKI, 1 patient with bevacizumab plus radiation therapy, 1 patient with adjuvant immuno-oncology chemotherapy.
Figure 11:
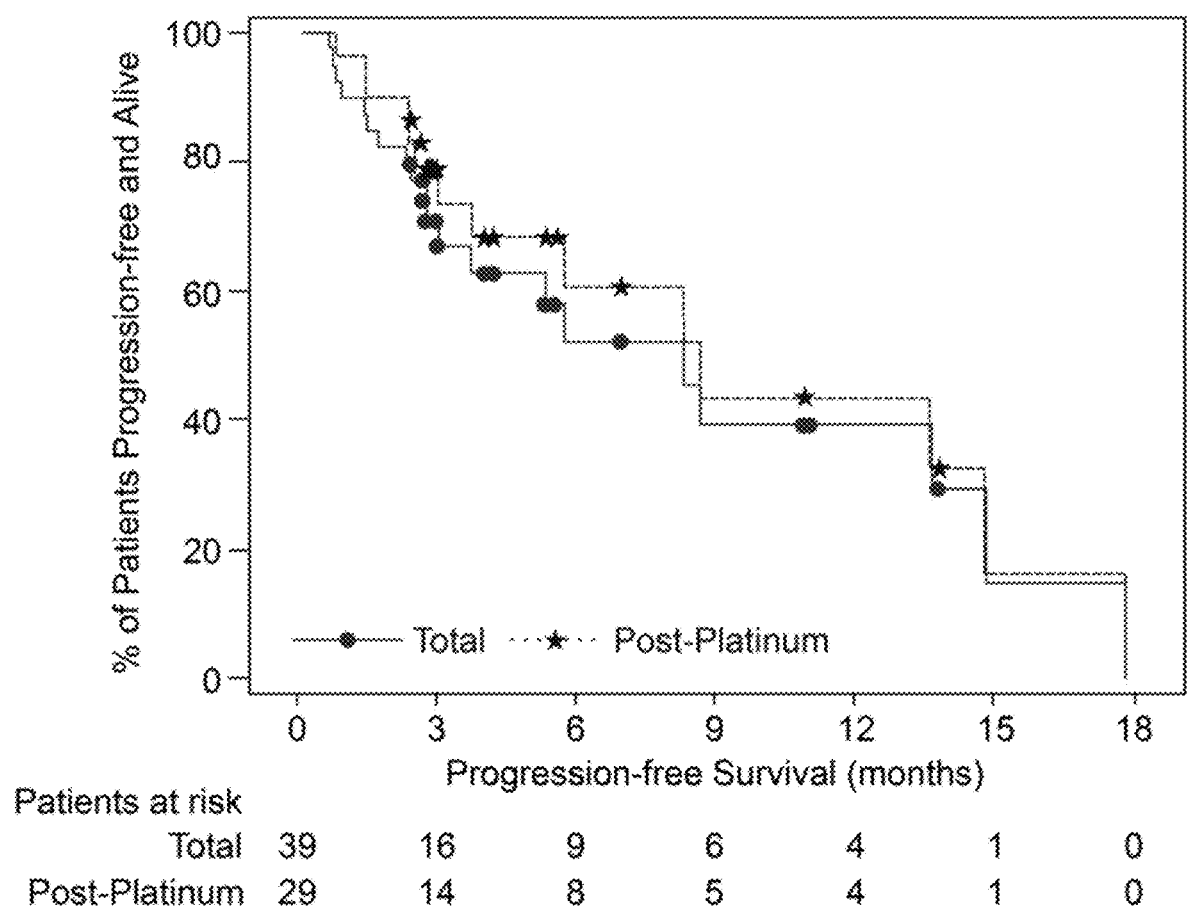
FIG. 11 shows progression-free survival.

Efficacy. Reduction in target lesions was observed in post-platinum patients as well as in treatment-naive patients (FIG. 8). Activity was observed across all 13 distinct EGFR Exon20ins alterations identified. The overall response rate (ORR), confirmed responses only, was 36% (95% confidence interval [CI], 21-53), with 14/39 patients achieving a partial response (FIG. 9). The ORR in post-platinum patients was 41% [95% CI, 24-61]) (FIG. 9). The clinical benefit rate (partial response or better or stable disease of at least 12 weeks [2 disease assessments]) was 67% (95% CI, 50-81) for all patients and 72% (95% CI, 53-87) for post-platinum patients. Responses primarily occurred within 2 months of treatment (FIG. 10). At median 4-month (range, 1-26) follow-up, the median duration of response (mDOR) for all evaluable patients was 10 months (range, 1-16; FIG. 10). mDOR was 7 months (range, 1-16) for post-platinum patients (FIG. 10). At the time of data cut-off, 9/14 (64%) patients had ongoing responses; 7/12 (58%) patients who had progressed on platinum-based chemotherapy remain on treatment with ongoing response. Median progression-free survival (mPFS) was 8.3 months (95% CI, 3.0-14.8) among all patients, with significant early censoring (FIG. 11). Post-platinum patients had mPFS of 8.6 months (95% CI, 3.7-14.8; FIG. 11).

Figure 12A:
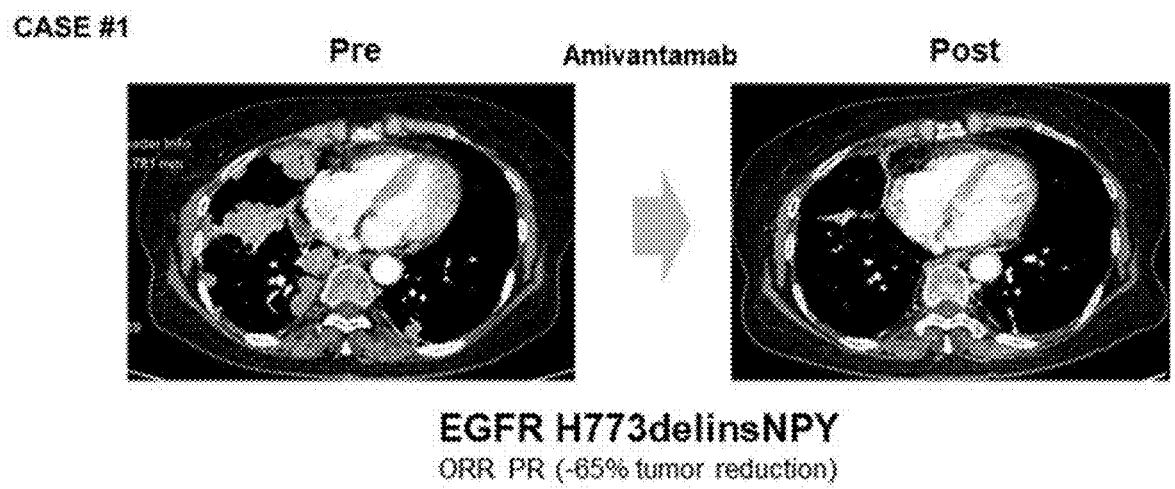
FIG. 12A-12C show the reduction of tumors in NSCLC patients with EGFR Exon20ins mutations following treatment with amivantamab.
Figure 12B:
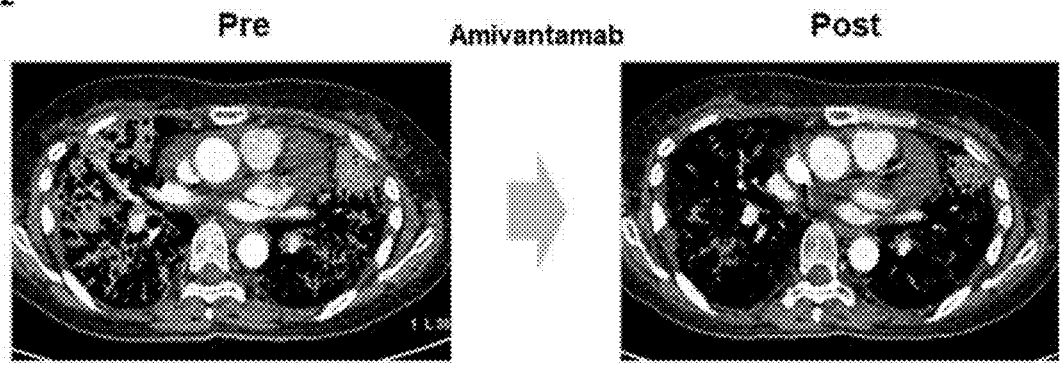

Clinical activity of amivantamab has been observed in patients with EGFR Exon20ins disease. A 58-year-old patient harboring the EGFR H773delinsNPY Exon20ins mutation achieved a partial response with a 65% tumor reduction (FIG. 12A), and a 48-year-old patient with the EGFR S768_D770dup Exon20ins mutation achieved a partial response with a 38.9% tumor reduction (FIG. 12B). These patients were progression-free for 92 and 32 weeks, respectively, on amivantamab with manageable toxicities.

Figure 12C:
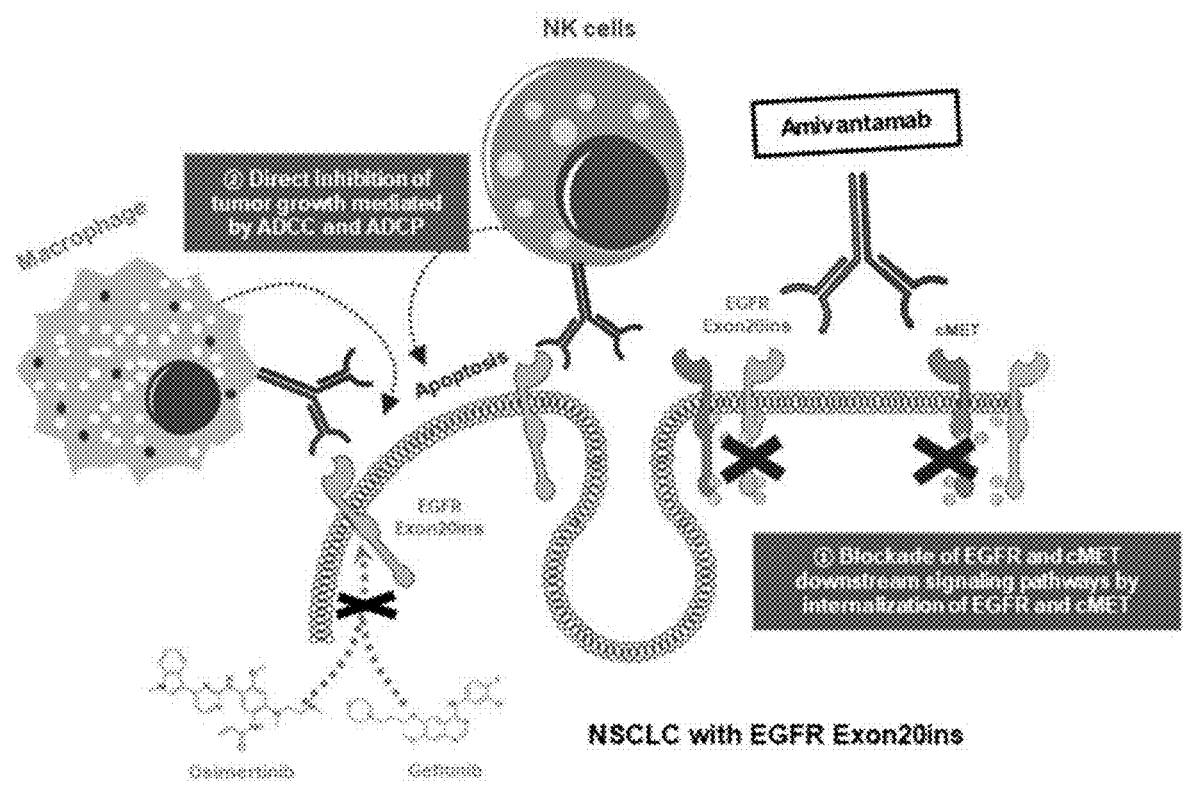

It has been observed that EGFR and tumor suppressor TP53 genes are commonly mutated in patients with NSCLC with independent prognostic implications. Furthermore, in patients with concomitant mutations in EGFR and TP53, there have been reports of decreased responsiveness to EGFR-TKIs (53). A similar effect was observed in our study when the YU-1163 PDC and YUO-029 PDO following treatment with amivantamab. On the other hand, amivantamab exhibited a potent in vivo activity in YU-1163-bearing BALB/c nude mice, suggesting that ADCC activity of amivantamab shown in FIGS. 5A-5E was believed to be involved in the in vivo antitumor activity. These results suggest that the combination of effector cell-dependent and -independent MOAs elicited by amivantamab (FIG. 12C) may result in antitumor activity in tumors harboring a coalescence of intractable mutations, for example in EGFR Exon20ins disease, and concomitant deleterious mutations such as the TP53 mutation present in our preclinical model and reported in the broader patient population.

Conclusions. Amivantamab has a manageable safety profile in patients with Exon20ins disease treated at the RP2D. Toxicities were mostly grade 1-2 and consistent with inhibition of EGFR activity. No grade ≥3 rash events were reported and only 1 grade 3 diarrhea was reported. Responses were observed in treatment-naïve patients and post-platinum patients. The ORR was 36% for all patients and 41% for post-platinum patients. Responses were durable with mDOR of 10 months for all patients and 7 months for post-platinum patients. Amivantamab therapy resulted in mPFS of 8.3 months for all patients and 8.6 months for post-platinum patients. On the basis of these data, amivantamab received FDA Breakthrough Therapy Designation for the treatment of patients with EGFR Exon20ins NSCLC whose disease had progressed on or after platinum-based chemotherapy.

Additional data from this clinical trial, involving 114 patients (safety group) and 81 patients (efficacy group), were consistent with the data disclosed above. Specifically, amivantamab showed robust efficacy with ORR of 40% and median duration of response of 11.1 months. Median progression-free survival (mPFS) was 8.3 months. The safety profile was tolerable in these patients, with treatment-related adverse events being primarily grade 1-2 (16% grade ≥3).

We claim:

1. A method of treating a subject having cancer that is positive for an EGFR exon 20 mutation, the method comprising:
   administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1050 mg or about 1400 mg of the bispecific antibody is administered weekly for 4 weeks, followed by one or more 28-day cycles wherein about 1050 mg or about 1400 mg of the bispecific antibody is administered biweekly, the one or more 28-day cycles beginning after the first 28-day cycle to thereby treat the cancer,
   wherein the cancer has progressed on or after platinum-based chemotherapy and is a locally advanced or metastatic non-small cell lung cancer (NSCLC), and wherein the bispecific anti-EGFR/c-Met antibody comprises:
   a first domain that specifically binds EGFR and comprises a heavy chain complementarity determining region 1 (HCDR1) comprising the amino acid sequence of SEQ ID NO: 1, a HCDR2 comprising the amino acid sequence of SEQ ID NO: 2, a HCDR3 comprising the amino acid sequence of SEQ ID NO: 3, a light chain complementarity determining region 1 (LCDR1) comprising the amino acid sequence of SEQ ID NO: 4, a LCDR2 comprising the amino acid sequence of SEQ ID NO: 5, and a LCDR3 comprising the amino acid sequence of SEQ ID NO: 6; and
   a second domain that specifically binds c-Met and comprises a HCDR1 comprising the amino acid sequence of SEQ ID NO: 7, a HCDR2 comprising the amino acid sequence of SEQ ID NO: 8, a HCDR3 comprising the amino acid sequence of SEQ ID NO: 9, a LCDR1 comprising the amino acid sequence of SEQ ID NO: 10, a LCDR2 comprising the amino acid sequence of SEQ ID NO: 11, and a LCDR3 comprising the amino acid sequence of SEQ ID NO: 12.

2. The method of claim 1, comprising, prior to the administering, determining a presence or an absence of the EGFR exon 20 mutation in a sample from the subject.

3. The method of claim 1, wherein the first domain comprises a heavy chain variable region (VH) comprising the amino acid sequence of SEQ ID NO: 13 and a light chain variable region (VL) comprising the amino acid sequence of SEQ ID NO: 14, and the second domain comprises a VH comprising the amino acid sequence of SEQ ID NO: 15 and a VL comprising the amino acid sequence of SEQ ID NO: 16.

4. The method of claim 1, wherein the bispecific anti-EGFR/c-Met antibody is an IgG1 isotype.

5. The method of claim 3, wherein the bispecific anti-EGFR/c-Met antibody comprises a first heavy chain (HC1) comprising the amino acid sequence of SEQ ID NO: 17, a first light chain (LC1) comprising the amino acid sequence of SEQ ID NO: 18, a second heavy chain (HC2) comprising the amino acid sequence of SEQ ID NO: 19, and a second light chain (LC2) comprising the amino acid sequence of SEQ ID NO: 20.

6. The method of claim 1, wherein the bispecific anti-EGFR/c-Met antibody comprises a biantennary glycan structure with a fucose content of about 1% to about 15%.

7. The method of claim 1, comprising further administering one or more anti-cancer therapies to the subject.

8. The method of claim 7, wherein the one or more anti-cancer therapies comprise chemotherapy, radiation therapy, surgery, a targeted anti-cancer therapy, a kinase inhibitor, or any combination thereof.

9. The method of claim 8, wherein the kinase inhibitor is an inhibitor of EGFR, an inhibitor of c-Met, an inhibitor of HER2, an inhibitor of HER3, an inhibitor of HER4, an inhibitor of VEGFR, or an inhibitor of AXL.

10. The method of claim 9, wherein the kinase inhibitor is lazertinib, poziotinib, erlotinib, gefitinib, lapatinib, vandetanib, afatinib, osimertinib, criotinib, cabozantinib, capmatinib, axitinib, lenvatinib, nintedanib, regorafenib, pazopanib, sorafenibi, or sunitinib.

11. The method of claim 1, wherein the EGFR exon 20 mutation is a de novo mutation.

12. The method of claim 1, wherein the EGFR exon 20 insertion mutation is selected from: an insertion of Ala (A) between M766 and A767, an insertion of Ser, Val and Ala (SVA) between S768 and V769, an insertion of Asn and Ser (NS) between P772 and H773, an insertion of one or more amino acids between D761 and E762, A763 and Y764, Y764 and Y765, M766 and A767, A767 and V768, S768 and V769, V769 and D770, D770 and N771, N771 and P772, P772 and H773, H773 and V774, V774 and C775, or any combination thereof an acquired mutation.

13. The method of claim 1, wherein the administering provides an improvement in overall response rate, partial response rate, or a combination thereof.

14. A method of treating a subject having locally advanced or metastatic non-small cell lung cancer (NSCLC) that is positive for an EGFR exon 20 insertion mutation, the method comprising:
administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1050 mg of the bispecific antibody is administered weekly for 4 weeks, followed by one or more 28-day cycles, wherein about 1050 mg of the bispecific antibody is administered biweekly, the one or more 28-day cycles begining after the first 28-day cycle to thereby treat the NSCLC,
wherein the subject weighs less than 80 kg and the NSCLC has progressed on or after platinum-based chemotherapy, and
the bispecific anti-EGFR/c-Met antibody comprises:
a first domain that specifically binds EGFR and comprises a heavy chain complementarity determining region 1 (HCDR1) comprising the amino acid sequence of SEQ ID NO: 1, a HCDR2 comprising the amino acid sequence of SEQ ID NO: 2, a HCDR3 comprising the amino acid sequence of SEQ ID NO: 3, a light chain complementarity determining region 1 (LCDR1) comprising the amino acid sequence of SEQ ID NO: 4, a LCDR2 comprising the amino acid sequence of SEQ ID NO: 5, and a LCDR3 comprising the amino acid sequence of SEQ ID NO: 6; and
a second domain that specifically binds c-Met and comprises a HCDR1 comprising the amino acid sequence of SEQ ID NO: 7, a HCDR2 comprising the amino acid sequence of SEQ ID NO: 8, a HCDR3 comprising the amino acid sequence of SEQ ID NO: 9, a LCDR1 comprising the amino acid sequence of SEQ ID NO: 10, a LCDR2 comprising the amino acid sequence of SEQ ID NO: 11, and a LCDR3 comprising the amino acid sequence of SEQ ID NO: 12.

15. A method of treating a subject having locally advanced or metastatic non-small cell lung cancer (NSCLC) that is positive for an EGFR exon 20 insertion mutation, the method comprising:
administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1400 mg of the bispecific antibody is administered weekly for 4 weeks, followed by one or more 28-day cycles wherein about 1400 mg of the bispecific antibody is administered biweekly, the one or more 28-day cycles begining after the first 28-day cycle to thereby treat the NSCLC,
wherein the subject weighs greater than or equal to 80 kg and the NSCLC has progressed on or after platinum-based chemotherapy, and
the bispecific anti-EGFR/c-Met antibody comprises:
a first domain that specifically binds EGFR and comprises a heavy chain complementarity determining region 1 (HCDR1) comprising the amino acid sequence of SEQ ID NO: 1, a HCDR2 comprising the amino acid sequence of SEQ ID NO: 2, a HCDR3 comprising the amino acid sequence of SEQ ID NO: 3, a light chain complementarity determining region 1 (LCDR1) comprising the amino acid sequence of SEQ ID NO: 4, a LCDR2 comprising the amino acid sequence of SEQ ID NO: 5, and a LCDR3 comprising the amino acid sequence of SEQ ID NO: 6; and
a second domain that specifically binds c-Met and comprises a HCDR1 comprising the amino acid sequence of SEQ ID NO: 7, a HCDR2 comprising the amino acid sequence of SEQ ID NO: 8, a HCDR3 comprising the amino acid sequence of SEQ ID NO: 9, a LCDR1 comprising the amino acid sequence of SEQ ID NO: 10, a LCDR2 comprising the amino acid sequence of SEQ ID NO: 11, and a LCDR3 comprising the amino acid sequence of SEQ ID NO: 12.

16. A method of treating a subject having locally advanced or metastatic non-small cell lung cancer (NSCLC) that is positive for an EGFR exon 20 insertion mutation, the method comprising:
administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1050 mg of the bispecific antibody is administered weekly for 4 weeks, followed by one or more 28-day cycles wherein about 1050 mg of the bispecific antibody is administered biweekly, the one or more 28-day cycles beginning after the first 28-day cycle to thereby treat the NSCLC,
wherein the subject weighs less than 80 kg and the NSCLC has progressed on or after platinum-based chemotherapy, and
wherein the bispecific anti-EGFR/c-Met antibody comprises:
a first domain that specifically binds EGFR and comprises a heavy chain variable region (VH) comprising the amino acid sequence of SEQ ID NO: 13 and a light chain variable region (VL) comprising the amino acid sequence of SEQ ID NO: 14, and
a second domain that specifically binds c-Met and comprises a VH comprising the amino acid sequence of SEQ ID NO: 15 and a VL comprising the amino acid sequence of SEQ ID NO: 16.

17. A method of treating a subject having locally advanced or metastatic non-small cell lung cancer (NSCLC) that is positive for an EGFR exon 20 insertion mutation, the method comprising:
  administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1050 mg of the bispecific antibody is administered weekly for 4 weeks, followed by one or more 28-day cycles wherein about 1050 mg of the bispecific antibody is administered biweekly, the one or more 28-day cycles beginning after the first 28-day cycle to thereby treat the NSCLC,
  wherein the subject weighs less than 80 kg and the NSCLC has progressed on or after platinum-based chemotherapy, and
  wherein the bispecific anti-EGFR/c-Met antibody comprises a first heavy chain (HC1) comprising the amino acid sequence of SEQ ID NO: 17, a first light chain (LC1) comprising the amino acid sequence of SEQ ID NO: 18, a second heavy chain (HC2) comprising the amino acid sequence of SEQ ID NO: 19, and a second light chain (LC2) comprising the amino acid sequence of SEQ ID NO: 20.

18. A method of treating a subject having locally advanced or metastatic non-small cell lung cancer (NSCLC) that is positive for an EGFR exon 20 insertion mutation, the method comprising:
  administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1400 mg of the bispecific antibody is administered weekly for 4 weeks, followed by one or more 28-day cycles wherein about 1400 mg of the bispecific antibody is administered biweekly, the one or more 28-day cycles beginning after the first 28-day cycle to thereby treat the NSCLC,
  wherein the subject weighs greater than or equal to 80 kg and the NSCLC has progressed on or after platinum-based chemotherapy, and
  wherein the bispecific anti-EGFR/c-Met antibody comprises:
  a first domain that specifically binds EGFR and comprises a heavy chain variable region (VH) comprising the amino acid sequence of SEQ ID NO: 13 and a light chain variable region (VL) comprising the amino acid sequence of SEQ ID NO: 14, and
  a second domain that specifically binds c-Met and comprises a VH comprising the amino acid sequence of SEQ ID NO: 15 and a VL comprising the amino acid sequence of SEQ ID NO: 16.

19. A method of treating a subject having locally advanced or metastatic non-small cell lung cancer (NSCLC) that is positive for an EGFR exon 20 insertion mutation, the method comprising:
  administering a therapeutically effective amount of an isolated bispecific anti-epidermal growth factor receptor (EGFR)/hepatocyte growth factor receptor (c-Met) antibody to the subject, the administering comprising a first 28-day cycle wherein about 1400 mg of the bispecific antibody is administered weekly for 4 weeks, followed by one or more 28-day cycles wherein about 1400 mg of the bispecific antibody is administered biweekly, the one or more 28-day cycles beginning after the first 28-day cycle to thereby treat the NSCLC,
  wherein the subject weighs greater than or equal to 80 kg and the NSCLC has progressed on or after platinum-based chemotherapy, and
  wherein the bispecific anti-EGFR/c-Met antibody comprises a first heavy chain (HC1) comprising the amino acid sequence of SEQ ID NO: 17, a first light chain (LC1) comprising the amino acid sequence of SEQ ID NO: 18, a second heavy chain (HC2) comprising the amino acid sequence of SEQ ID NO: 19, and a second light chain (LC2) comprising the amino acid sequence of SEQ ID NO: 20.

\* \* \* \* \*